United States Patent
Okamoto et al.

(10) Patent No.: US 12,437,793 B2
(45) Date of Patent: Oct. 7, 2025

(54) DRIVING METHOD OF SEMICONDUCTOR DEVICE

(71) Applicant: SEMICONDUCTOR ENERGY LABORATORY CO., LTD., Atsugi (JP)

(72) Inventors: Yuki Okamoto, Kanagawa (JP); Tatsuya Onuki, Kanagawa (JP); Takanori Matsuzaki, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 128 days.

(21) Appl. No.: 18/245,784

(22) PCT Filed: Sep. 9, 2021

(86) PCT No.: PCT/IB2021/058181
§ 371 (c)(1),
(2) Date: Mar. 17, 2023

(87) PCT Pub. No.: WO2022/064308
PCT Pub. Date: Mar. 31, 2022

(65) Prior Publication Data
US 2024/0029773 A1     Jan. 25, 2024

(30) Foreign Application Priority Data
Sep. 22, 2020  (JP) ................................ 2020-158038

(51) Int. Cl.
*G11C 11/22*      (2006.01)

(52) U.S. Cl.
CPC ...... *G11C 11/2257* (2013.01); *G11C 11/2273* (2013.01); *G11C 11/2293* (2013.01)

(58) Field of Classification Search
CPC ............ G11C 11/2257; G11C 11/2273; G11C 11/2293
See application file for complete search history.

(56) References Cited

U.S. PATENT DOCUMENTS

| | | | |
|---|---|---|---|
| 5,519,234 | A | 5/1996 | Paz de Araujo et al. |
| 5,546,342 | A | 8/1996 | Nakane et al. |

(Continued)

FOREIGN PATENT DOCUMENTS

| | | |
|---|---|---|
| CN | 001117192 A | 2/1996 |
| EP | 0667621 A | 8/1995 |

(Continued)

OTHER PUBLICATIONS

International Search Report (Application No. PCT/IB2021/058181) Dated Nov. 16, 2021.

(Continued)

*Primary Examiner* — Han Yang
(74) *Attorney, Agent, or Firm* — Fish & Richardson P.C.

(57) ABSTRACT

A semiconductor device with high reliability is provided. The semiconductor device includes a memory cell including a first ferroelectric capacitor and a reference memory cell including a second ferroelectric capacitor. In a first period, first binary data is written to the memory cell, and first reference binary data is written to the reference memory cell. In a second period, the first binary data is read from the memory cell, and the first reference binary data is read from the reference memory cell. In a third period, logic operation of the first binary data and the first reference binary data is performed. In a fourth period, second binary data is written to the memory cell, and second reference binary data is written to the reference memory cell. A value of the first binary data and a value of the second binary data are (Continued)

different from each other, and a value of the first reference binary data and a value of the second reference binary data are different from each other.

18 Claims, 22 Drawing Sheets

(56) References Cited

U.S. PATENT DOCUMENTS

| | | | |
|---|---|---|---|
| 5,768,176 | A | 6/1998 | Katoh |
| 5,851,841 | A | 12/1998 | Ushikubo et al. |
| 7,446,361 | B2 | 11/2008 | Maruyama |
| 7,643,325 | B2 | 1/2010 | Hagiwara et al. |
| 7,675,795 | B2 | 3/2010 | Koyama |
| 7,928,910 | B2 | 4/2011 | Suzuki et al. |
| 10,121,705 | B2 | 11/2018 | Shinohara et al. |
| 11,296,708 | B2 | 4/2022 | Manipatruni et al. |
| 11,521,953 | B1 | 12/2022 | Manipatruni et al. |
| 2006/0114740 | A1* | 6/2006 | Watanabe ............... G11C 11/22 365/230.06 |
| 2007/0171693 | A1 | 7/2007 | Koyama |
| 2008/0174494 | A1 | 7/2008 | Suzuki et al. |
| 2008/0175034 | A1 | 7/2008 | Hagiwara et al. |
| 2011/0176348 | A1 | 7/2011 | Yamazaki et al. |
| 2015/0137239 | A1 | 5/2015 | Shinohara et al. |
| 2016/0358639 | A1* | 12/2016 | Jiang ..................... H10B 69/00 |
| 2019/0148390 | A1* | 5/2019 | Frank .................... H10D 1/682 257/295 |
| 2023/0215481 | A1* | 7/2023 | Ocker ................... G11C 11/223 365/203 |

FOREIGN PATENT DOCUMENTS

| | | |
|---|---|---|
| EP | 0811981 A | 12/1997 |
| JP | 07-226086 A | 8/1995 |
| JP | 08-097386 A | 4/1996 |
| JP | 08-273373 A | 10/1996 |
| JP | 09-326196 A | 12/1997 |
| JP | 2008-135136 A | 6/2008 |
| JP | 2015-103555 A | 6/2015 |

OTHER PUBLICATIONS

Written Opinion (Application No. PCT/IB2021/058181) Dated Nov. 16, 2021.

Yamazaki.S et al., "Properties of crystalline In—Ga—Zn-oxide semiconductor and its transistor characteristics", Jpn. J. Appl. Phys. (Japanese Journal of Applied Physics), Mar. 31, 2014, vol. 53, No. 4S, pp. 04ED18-1-04ED18-10, the Japan Society of Applied Physics.

Kato.K et al., "Evaluation of Off-State Current Characteristics of Transistor Using Oxide Semiconductor Material, Indium-Gallium-Zinc Oxide", Jpn. J. Appl. Phys. (Japanese Journal of Applied Physics), 2012, vol. 51, pp. 021201-1-021201-7, the Japan Society of Applied Physics.

Harada.H et al., "Low Power LC Display Using In—Ga—Zn-Oxide TFTs Based on Variable Frame Frequency and Partial Scan", AM-FPD '10 Digest of Technical Papers, Jul. 5, 2010, pp. 199-202.

Ishizu.T et al., "Embedded Oxide Semiconductor Memories: A Key Enabler for Low-Power ULSI", ECS Transactions, May 21, 2017, vol. 79, No. 1, pp. 149-156, the Electrochemical Society.

Slesazeck.S et al., "Uniting The Trinity of Ferroelectric HfO2 Memory Devices in a Single Memory Cell", IMW 2019 (11th IEEE International Memory Workshop), May 12, 2019, pp. 20-23.

Okuno.J et al., "SoC compatible 1T1C FeRAM memory array based on ferroelectric Hf0.5Zr0.5O2", 2020 Symposium on Vlsi Technology : Digest of Technical Papers, Jun. 16, 2020, p. 2pages.

Boscke.T et al., "Ferroelectricity in hafnium oxide thin films", Appl. Phys. Lett. (Applied Physics Letters), Sep. 8, 2011, vol. 99, No. 10, pp. 102903-1-102903-3.

Fan.Z et al., "Ferroelectric HfO2-based materials for next-generation ferroelectric memories", Journal of Advanced Dielectrics, May 3, 2016, vol. 6, No. 2, pp. 1630003-1-1630003-11.

Toriumi.A, "Ferroelectricity of HfO2 thin film", Oyobuturi , Sep. 10, 2019, vol. 88, No. 9, pp. 586-596, JSAP(The Japan Society of Applied Physics).

* cited by examiner

FIG. 3A
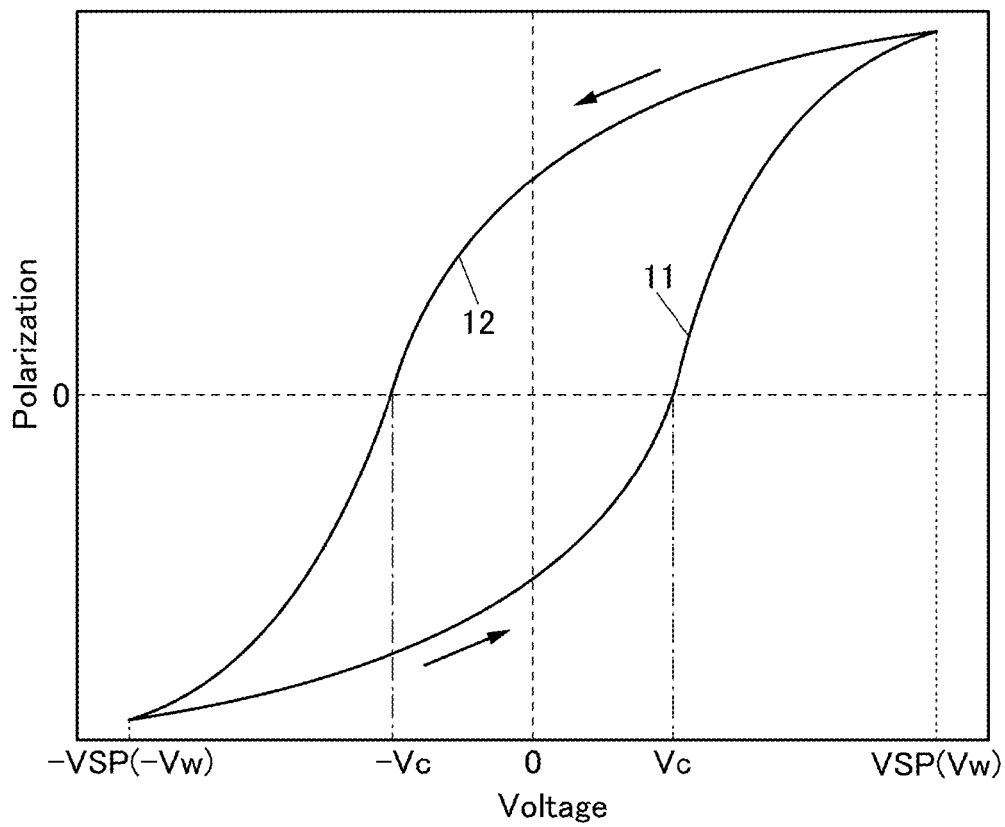
FIG. 3B1
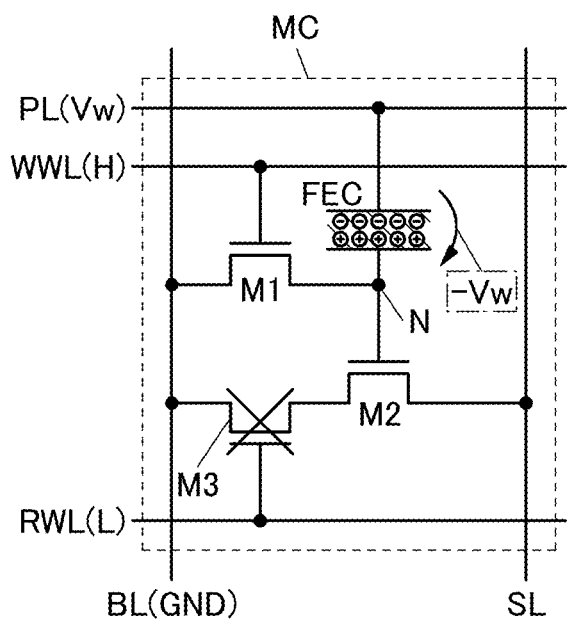
FIG. 3B2
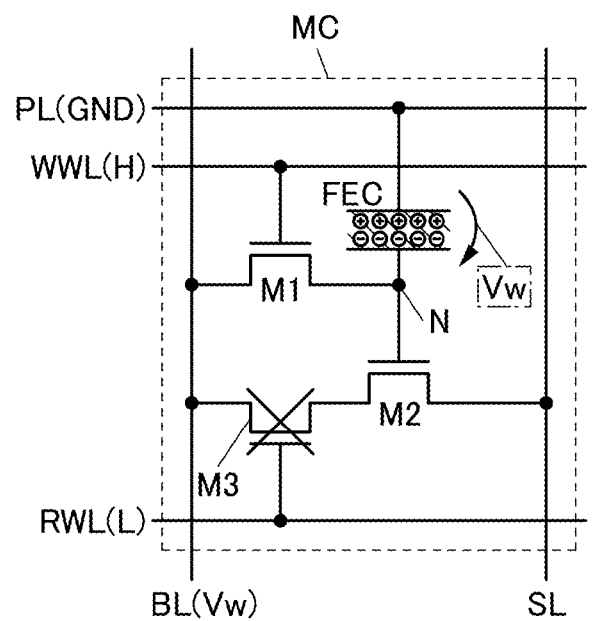

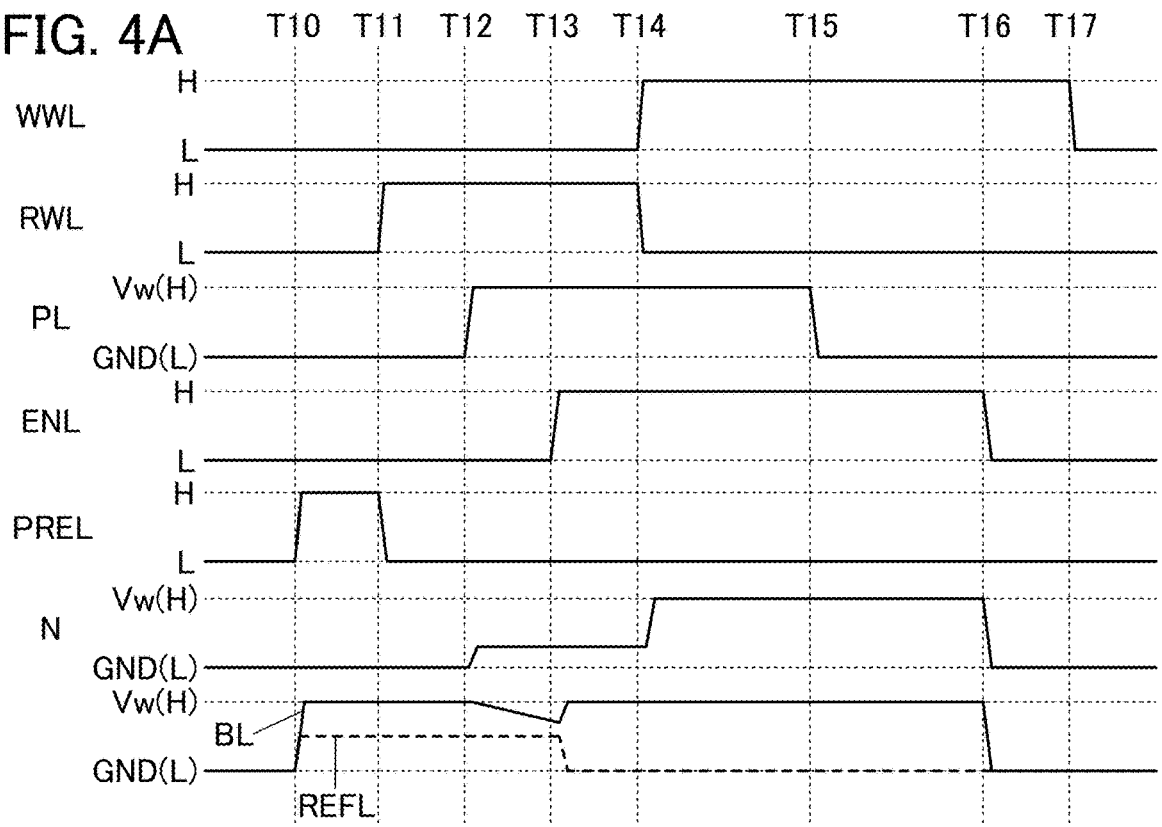
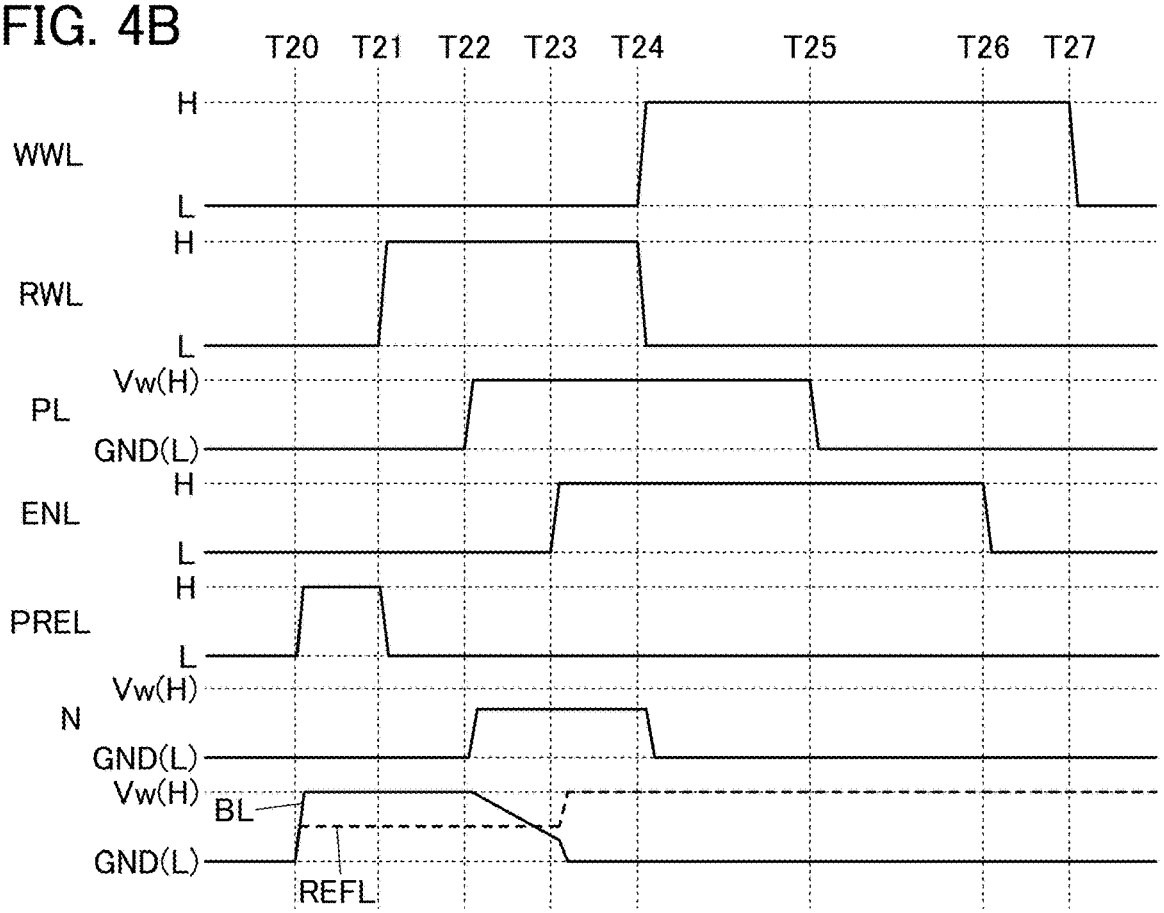

FIG. 5A
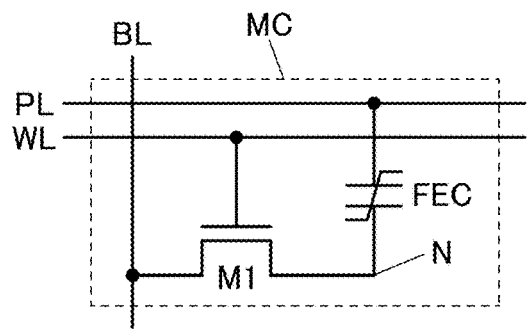
FIG. 5B1
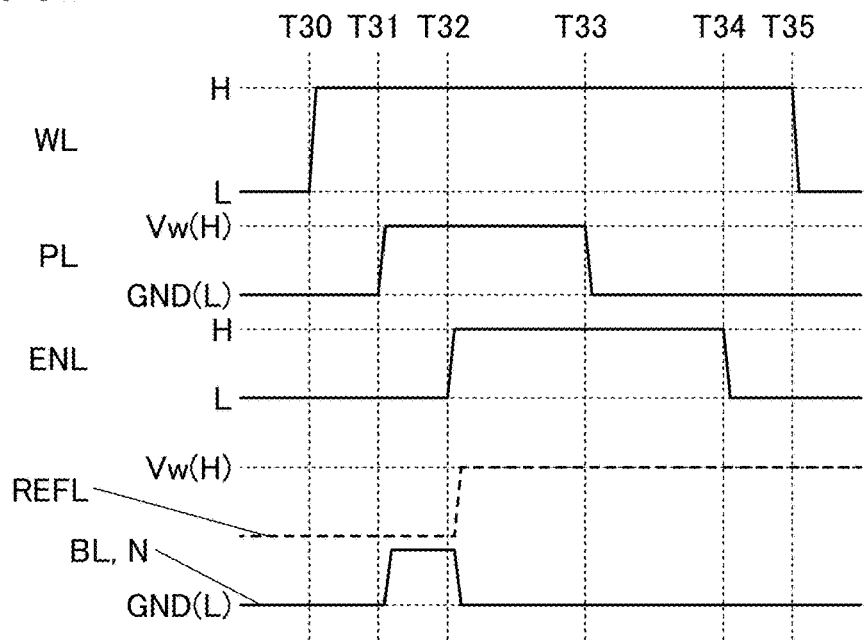
FIG. 5B2
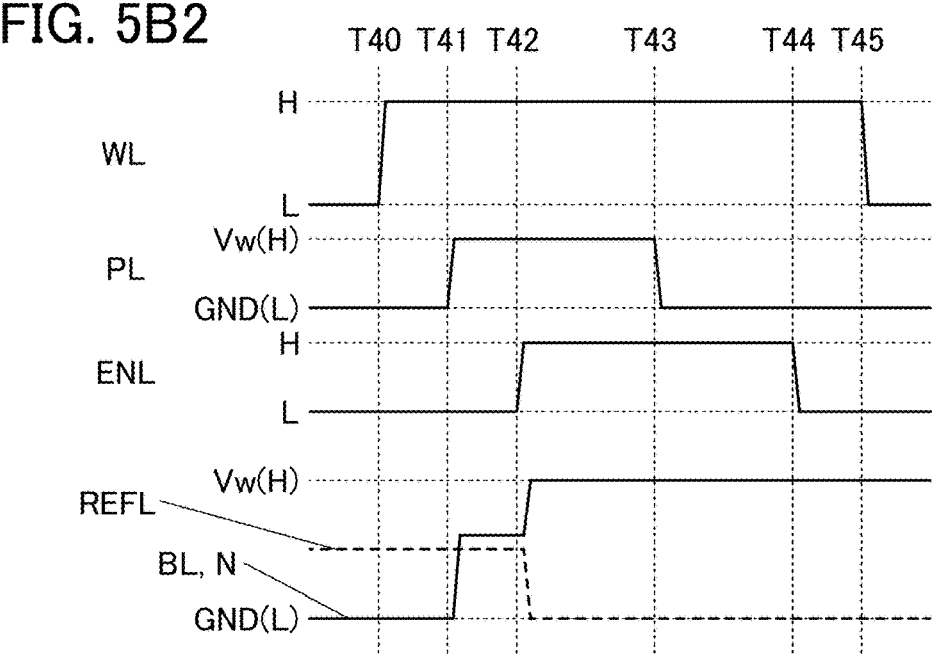

FIG. 18A
| Intermediate state New crystalline phase | | |
|---|---|---|
| Amorphous | Crystalline | Crystal |
| •completely amorphous | •CAAC<br>•nc<br>•CAC<br><br>excluding single crystal and poly crystal | •single crystal<br>•poly crystal |
FIG. 18B
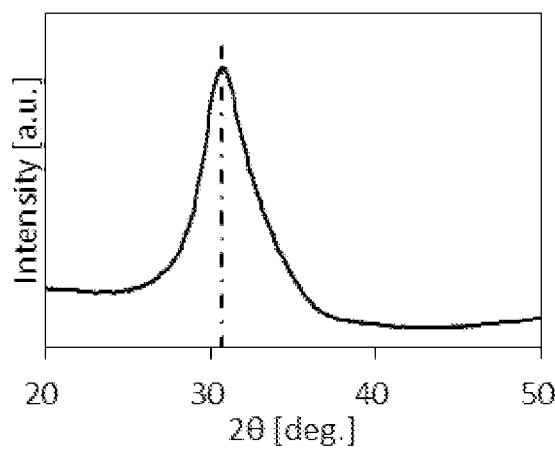
FIG. 18C
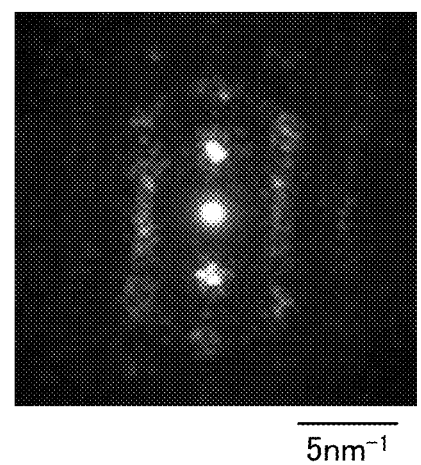

DRIVING METHOD OF SEMICONDUCTOR DEVICE

CROSS REFERENCE TO RELATED APPLICATIONS

This application is a U.S. National Phase Application under 35 U.S.C. § 371 of International Application PCT/IB2021/058181, filed on Sep. 9, 2021, which is incorporated by reference and claims the benefit of a foreign priority application filed in Japan on Sep. 22, 2020, as Application No. 2020-158038.

TECHNICAL FIELD

One embodiment of the present invention relates to a semiconductor device and a driving method thereof.

Note that one embodiment of the present invention is not limited to the above technical field. The technical field of the invention disclosed in this specification and the like relates to an object, a driving method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an image capturing device, a memory device, a signal processing device, a sensor, a processor, an electronic device, a system, a driving method thereof, a manufacturing method thereof, and a testing method thereof.

BACKGROUND ART

In recent years, semiconductor devices have been developed, and LSIs, CPUs, memories, and the like are mainly used as the semiconductor devices. A CPU is an assembly of semiconductor elements each of which include a chip of a semiconductor integrated circuit (including at least a transistor and a memory) processed from a semiconductor wafer and an electrode serving as a connection terminal.

A semiconductor circuit (IC chip) of an LSI, a CPU, a memory, or the like is mounted on a circuit board, for example, a printed wiring board, to be used as one of components of a variety of electronic devices.

A technique by which a transistor is formed using a semiconductor thin film formed over a substrate having an insulating surface has been attracting attention. The transistor is used in a wide range of electronic devices such as an integrated circuit (IC) and an image display device (also simply referred to as a display device). A silicon-based semiconductor material, an oxide semiconductor, and the like are known to be used for semiconductor thin films which can be used for transistors.

Memory cells using ferroelectrics have been actively researched and developed as shown in Non-Patent Document 1. In addition, active ongoing research on hafnium oxide for next-generation ferroelectric memories includes research on $HfO_2$-based materials with ferroelectricity (Non-Patent Document 2), research on ferroelectricity of hafnium oxide thin films (Non-Patent Document 3), research on ferroelectric properties of thin $HfO_2$ films (Non-Patent Document 4), and the like.

REFERENCE

Non-Patent Document

[Non-Patent Document 1] T. S. Boescke, et al, "Ferroelectricity in hafnium oxide thin films", APL99, 2011

[Non-Patent Document 2] Zhen Fan, et al, "Ferroelectric $HfO_2$-based materials for next-generation ferroelectric memories", JOURNAL OF ADVANCED DIELECTRICS, Vol. 6, No. 2, 2016

[Non-Patent Document 3] Jun Okuno, et al, "SoC compatible 1T1C FeRAM memory array based on ferroelectric $Hf_{0.5}Zr_{0.5}O_2$", VLSI 2020

[Non-Patent Document 4] Akira Toriumi, "Ferroelectric properties of thin $HfO_2$ films", the Japan Society of Applied Physics, Vol. 88, No. 9, 2019

SUMMARY OF THE INVENTION

Problems to be Solved by the Invention

When data written to memory cells using ferroelectrics is read out repeatedly, the reversal of polarization of the ferroelectrics is repeated in some cases. Accordingly, fatigue damage is caused, and the ferroelectric polarization at the time of writing data to the memory cells is reduced, in some cases. In such a case, the reliability of the semiconductor device may be decreased.

An object of one embodiment of the present invention is to provide a highly reliable semiconductor device and a driving method thereof. Another object of one embodiment of the present invention is to provide a novel semiconductor device and a driving method thereof.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to achieve at least one of the objects listed above and the other objects. Note that one embodiment of the present invention does not necessarily achieve all the objects listed above and the other objects.

Means for Solving the Problems

One embodiment of the present invention is a method for driving a semiconductor device provided with a memory cell including a ferroelectric capacitor; in a first period, binary data is written to the memory cell; in a second period, the binary data is read from the memory cell; and in a third period, a polarization reversal is generated in the ferroelectric capacitor, so that the binary data is returned to the memory cell.

In the above embodiment, the polarization reversal may be generated in the ferroelectric capacitor regardless of a value of the binary data, in the third period.

Furthermore, in the above embodiment, the semiconductor device may include a reference memory cell; in the first period, reference binary data may be written to the reference memory cell; in the second period, the reference binary data may be read from the reference memory cell; and in the second period, logic operation of the binary data read from the memory cell and the reference binary data read from the reference memory cell may be performed.

Furthermore, in the above embodiment, the logic operation may be exclusive disjunction.

Furthermore, in the above embodiment, the memory cell may include a first transistor, a second transistor, and a third transistor; one of a source and a drain of the first transistor may be electrically connected to a gate of the second transistor and one electrode of the ferroelectric capacitor; one of a source and a drain of the second transistor may be electrically connected to one of a source and a drain of the third transistor; the other of the source and the drain of the third transistor may be electrically connected to the other of the source and the drain of the first transistor; in the first period and the third period, the first transistor may be in an on state, and the third transistor may be in an off state; and in the second period, the first transistor may be in an off state, and the third transistor may be in an on state.

Furthermore, in the above embodiment, the ferroelectric capacitor may include a dielectric, and the dielectric may contain hafnium oxide and/or zirconium oxide.

Another embodiment of the present invention is a method for driving a semiconductor device including a memory cell including a first ferroelectric capacitor and a reference memory cell including a second ferroelectric capacitor; in a first period, first binary data is written to the memory cell, and first reference binary data is written to the reference memory cell; in a second period, the first binary data is read from the memory cell, and the first reference binary data is read from the reference memory cell; in a third period, logic operation of the first binary data and the first reference binary data is performed; in a fourth period, second binary data is written to the memory cell, and second reference binary data is written to the reference memory cell; a value of the first binary data and a value of the second binary data are different from each other; and a value of the first reference binary data and a value of the second reference binary data are different from each other.

In the above embodiment, the semiconductor device may include a first sense amplifier circuit and a second sense amplifier circuit; the first sense amplifier circuit may be electrically connected to the memory cell; the second sense amplifier circuit may be electrically connected to the reference memory cell; and in the third period, the first sense amplifier circuit and the second sense amplifier circuit may be in an activation state.

Furthermore, in the above embodiment, the memory cell may include a first transistor, a second transistor, and a third transistor; one of a source and a drain of the first transistor may be electrically connected to a gate of the second transistor and one electrode of the first ferroelectric capacitor; one of a source and a drain of the second transistor may be electrically connected to one of a source and a drain of the third transistor; the other of the source and the drain of the first transistor and the other of the source and the drain of the third transistor may be electrically connected to the first sense amplifier circuit; in the first period and the fourth period, the first transistor may be in an on state, and the third transistor may be in an off state; and in the second period and the third period, the first transistor may be in an off state, and the third transistor may be in an on state.

Furthermore, in the above embodiment, the first ferroelectric capacitor may include a first dielectric; the second ferroelectric capacitor may include a second dielectric; and the first dielectric and the second dielectric may contain hafnium oxide and/or zirconium oxide.

Furthermore, in the above embodiment, the logic operation may be exclusive disjunction.

Effect of the Invention

According to one embodiment of the present invention, a highly reliable semiconductor device and a driving method thereof can be provided. Alternatively, according to one embodiment of the present invention, a novel semiconductor device and a driving method thereof can be provided.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted from the description by those skilled in the art. Note that one embodiment of the present invention has at least one of the effects listed above and the other effects. Accordingly, depending on the case, one embodiment of the present invention does not have the effects listed above in some cases.

BRIEF DESCRIPTION OF THE DRAWINGS

FIG. 3A is a graph showing one example of hysteresis characteristics of a dielectric. FIG. 3B1 and FIG. 3B2 are circuit diagrams each illustrating an example of a driving method of a memory cell.

FIG. 4A and FIG. 4B are timing charts showing an example of a driving method of a memory cell.

FIG. 5A is a circuit diagram illustrating a structure example of the memory cell. FIG. 5B1 and FIG. 5B2 are timing charts showing an example of a driving method of a memory cell.

FIG. 18A is a diagram showing classification of crystal structures of IGZO, FIG. 18B is a diagram showing an XRD spectrum of crystalline IGZO, and FIG. 18C is a diagram showing a nanobeam electron diffraction pattern of the crystalline IGZO.

MODE FOR CARRYING OUT THE INVENTION

Figure 1:
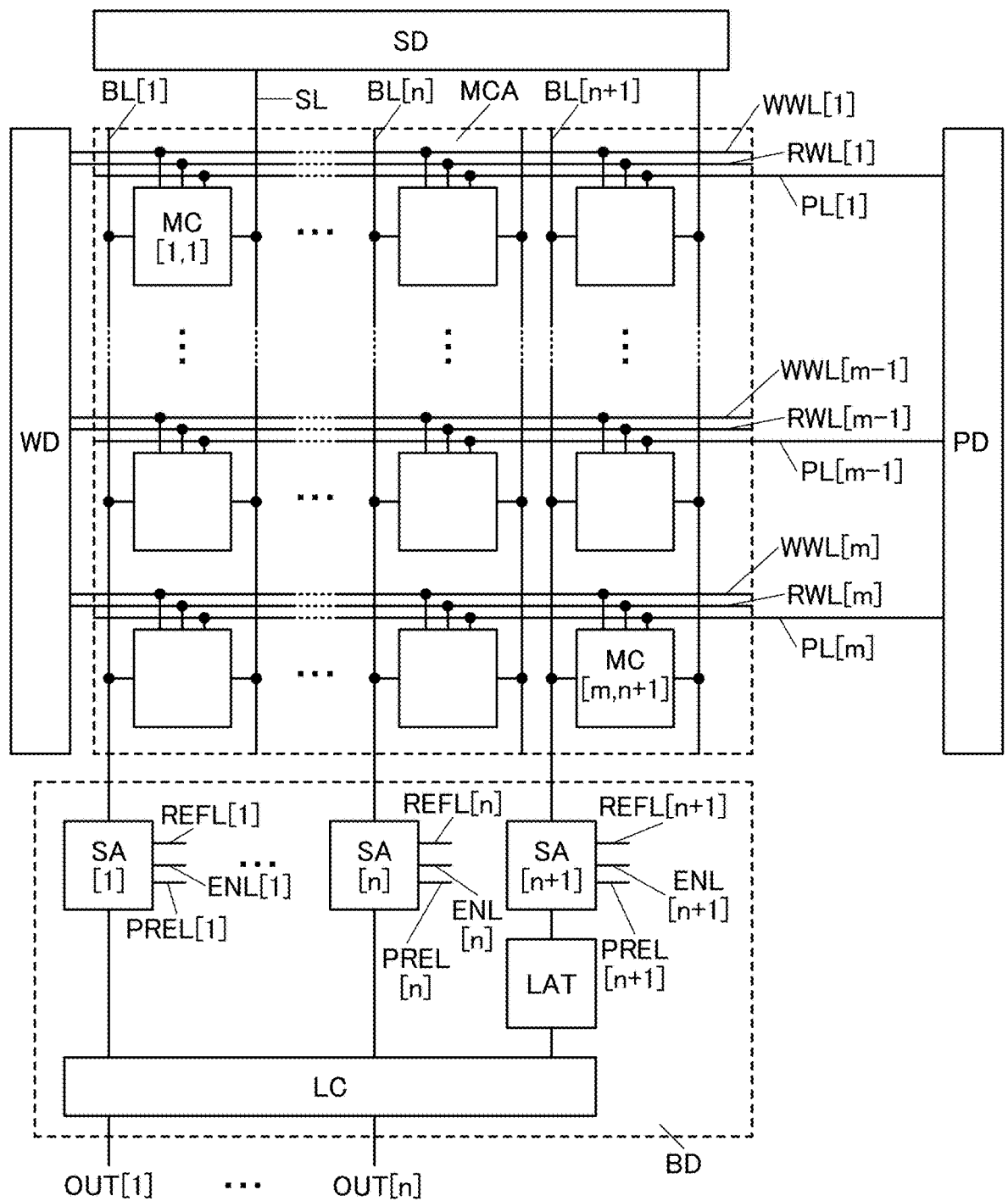
FIG. 1 is a block diagram illustrating a structure example of a semiconductor device.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

In addition, in this specification and the like, a metal oxide containing nitrogen is also collectively referred to as a metal oxide in some cases. A metal oxide containing nitrogen may be called a metal oxynitride.

In addition, in this specification and the like, one embodiment of the present invention can be constituted by combining, as appropriate, the structure described in each embodiment with the structures described in the other embodiments. Furthermore, in the case where a plurality of structure examples are described in one embodiment, the structure examples can be combined with each other as appropriate.

Note that a content (or part of the content) described in one embodiment can be applied to, combined with, replaced with, or the like at least one of another content (or part of the content) in the embodiment and a content (or part of the content) described in one or a plurality of different embodiments.

Note that in each embodiment, content described in the embodiment is content described using a variety of diagrams or content described with text disclosed in the specification.

Note that by combining a drawing (or may be part thereof) described in one embodiment with at least one of another part of the drawing, a different drawing (or may be part thereof) described in the embodiment, and a drawing (or may be part thereof) described in one or a plurality of different embodiments, much more drawings can be constituted.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be construed as being limited to the description in the embodiments. Note that in the structures of the invention in the embodiments, the same portions or portions having similar functions are denoted by the same reference numerals in different drawings, and repeated description thereof is omitted in some cases. In perspective views and the like, some components might not be illustrated for clarity of the drawings.

In this specification and the like, when a plurality of components are denoted with the same reference numerals, and in particular need to be distinguished from each other, an identification sign such as "_1", "[n]", or "[m,n]" is sometimes added to the reference numerals.

In the drawings in this specification, the size, the layer thickness, or the region is exaggerated for clarity in some cases. Therefore, the size, the layer thickness, or the region is not necessarily limited to the illustrated scale. Note that the drawings are schematic views illustrating ideal examples, and embodiments of the present invention are not limited to shapes or values shown in the drawings. For example, variation in signal, voltage, or current due to noise or variation in signal, voltage, or current due to difference in timing can be included.

In addition, ordinal numbers such as "first," "second," and "third" in this specification and the like are used to avoid confusion among components. Thus, the ordinal numbers do not limit the number of components. Furthermore, the ordinal numbers do not limit the order of components. For example, a "first" component in one embodiment in this specification and the like can be referred to as a "second" component in other embodiments or claims. For another example, a "first" component in one embodiment in this specification and the like can be omitted in other embodiments or claims.

In this specification and the like, the terms for describing positioning, such as "over" and "under", are sometimes used for convenience to describe the positional relationship between components with reference to drawings. The positional relationship between components is changed as appropriate in accordance with the direction from which each component is described. Thus, the positional relation is not limited to that described with a term in this specification and the like and can be described with another term as appropriate depending on the situation. For example, the expression "an insulator positioned over (on) a top surface of a conductor" can be replaced with the expression "an insulator positioned under (on) a bottom surface of a conductor" when the direction of a drawing showing these components is rotated by 180°.

Furthermore, the terms such as "over" and "under" do not necessarily mean that a component is placed directly over or directly under and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B.

In addition, in this specification and the like, the terms "film," "layer," and the like can be interchanged with each other depending on the situation. For example, the term "conductive layer" can be changed into the term "conductive film" in some cases. Moreover, for example, the term "insulating film" can be changed into the term "insulating layer" in some cases. Alternatively, the term "film", "layer", or the like is not used and can be interchanged with another term depending on the case or according to circumstances. For example, the term "conductive layer" or "conductive film" can be changed into the term "conductor" in some cases. Furthermore, for example, the term "insulating layer" or "insulating film" can be changed into the term "insulator" in some cases.

In this specification and the like, the term "electrode", "wiring", "terminal", or the like does not limit the function of a component. For example, an "electrode" is used as part of a wiring in some cases, and vice versa. Furthermore, the terms "electrode" or "wiring" can also include the case where a plurality of "electrodes" or "wirings" are formed in an integrated manner. For example, a "terminal" is used as part of a "wiring" or an "electrode" in some cases, and vice versa. Furthermore, the term "terminal" can also mean the case where a plurality of "electrodes", "wirings", "terminals", or the like are formed in an integrated manner, for example. Therefore, for example, an "electrode" can be part of a "wiring" or a "terminal", and a "terminal" can be part of a "wiring" or an "electrode". Moreover, the term "electrode", "wiring", "terminal", or the like is sometimes replaced with the term "region" depending on the case, for example.

In this specification and the like, the terms "wiring", "signal line", "power supply line", and the like can be interchanged with each other depending on the case or the situation. For example, the term "wiring" can be changed into the term "signal line" in some cases. Also, for example, the term "wiring" can be changed into the term "power source line" in some cases. Inversely, the term "signal line", "power source line", or the like can be changed into the term "wiring" in some cases. The term "power source line" or the like can be changed into the term "signal line" or the like in some cases. Inversely, the term "signal line" or the like can be changed into the term "power source line" or the like in some cases. The term "potential" that is applied to a wiring can be changed into the term "signal" or the like depending on the case or according to circumstances. Inversely, the term "signal" or the like can be changed into the term "potential" in some cases.

Embodiment 1

In this embodiment, a semiconductor device of one embodiment of the present invention and a driving method thereof will be described.

One embodiment of the present invention relates to a semiconductor device including a memory cell, for example, a memory device. In the memory cell included in the semiconductor device of one embodiment of the present invention, a capacitor whose dielectric material can have ferroelectricity is provided. In driving the semiconductor device, for example, binary data is written and retained in the memory cell, and then, the binary data is read out and returned. Assuming that a value of the binary data retained in the memory cell is "0" or "1", in either case, the polarization of the dielectric is reversed once during a period of performing one-time reading and one-time returning. In other words, the numbers of times of polarization reversal of the dielectric are made to be equal to each other between the case where the value of the binary data retained in the memory cell is "0" and the case were the value is "1". Accordingly, the reliability of the semiconductor device can be enhanced as compared to the case where in data reading and returning, a polarization reversal of the dielectric is not caused when the value of the binary data retained in the memory cell is "0" whereas a polarization reversal of the dielectric is caused two times in total when the value of the binary data retained in the memory cell is "1", for example.

<Structure Example of Semiconductor Device>

FIG. 1 is a block diagram illustrating a structure example of a semiconductor device 10 that is the semiconductor device of one embodiment of the present invention. The semiconductor device 10 can be a memory device, for example.

The semiconductor device 10 includes a memory cell array MCA in which memory cells MC are arranged in a matrix of m rows and n+1 columns (m and n are each an integer greater than or equal to 1). The semiconductor device 10 further includes a word line driver circuit WD, a plate line driver circuit PD, a potential generation circuit SD, and a bit line driver circuit BD.

The word line driver circuit WD is electrically connected to the memory cells MC through wirings WWL and to the memory cells MC through wirings RWL. The plate line driver circuit PD is electrically connected to the memory cells MC through wirings PL. The potential generation circuit SD is electrically connected to the memory cells MC through wirings SL. The bit line driver circuit BD is electrically connected to the memory cells MC through wirings BL.

The memory cells MC in one row can be electrically connected to the word line driver circuit WD through one wiring WWL and one wiring RWL, and can be electrically connected to the plate line driver circuit PD through one wiring PL. In addition, the memory cells MC in one column can be electrically connected to the bit line driver circuit BD through one wiring BL.

In this specification and the like, for example, the memory cell MC in the first row and the first column is denoted by a memory cell MC[1,1], and the memory cell MC in the m-th row and the (n+1)-th column is denoted by a memory cell MC[m,n+1]. For example, the wiring WWL, the wiring RWL, and the wiring PL electrically connected to the memory cells MC in the first row are denoted by a wiring WWL[1], a wiring RWL[1], and the wiring PL[1], respectively. The wiring WWL, the wiring RWL, and the wiring PL electrically connected to the memory cells MC in the m-th row are denoted by a wiring WWL[m], a wiring RWL[m], and a wiring PL[m], respectively. Furthermore, for example, the wiring BL electrically connected to the memory cells MC in the first column is denoted by a wiring BL[1], and the wiring BL electrically connected to the memory cells MC in the (n+1)-th column is denoted by a wiring BL[n+1]. The same applies to other components in some cases.

The word line driver circuit WD has a function of controlling the potential of the wiring WWL and the potential of the wiring RWL. Specifically, the word line driver circuit WD has a function of selecting the memory cell MC to which data is written by controlling the potential of the wiring WWL and a function of selecting the memory cell MC from which data is read by controlling the potential of the wiring RWL.

The plate line driver circuit PD has a function of controlling the potential of the wiring PL. The potential generation circuit SD has a function of controlling the potential of the wiring SL. The potential generation circuit SD can supply a constant potential to the wiring SL, for example, and can supply a ground potential to the wiring SL, for example.

The bit line driver circuit BD has a function of generating data that is to be written to the memory cells MC and supplying the data to the memory cells MC in a predetermined column. The bit line driver circuit BD has a function of reading the data written to the memory cells MC and outputting the data.

The bit line driver circuit BD is described in detail. The bit line driver circuit BD includes a sense amplifier circuit SA[1] to a sense amplifier circuit SA[n+1], a latch circuit LAT, and a logic operation circuit LC. The sense amplifier circuit SA is electrically connected to the wiring BL, a wiring REFL, a wiring ENL, and a wiring PREL. The sense amplifier circuit SA[1] to the sense amplifier circuit SA[n] are electrically connected to the logic operation circuit LC, and the sense amplifier circuit SA[n+1] is electrically connected to the logic operation circuit LC through the latch circuit LAT. The logic operation circuit LC is electrically connected to a wiring OUT[1] to a wiring OUT[n]. Note that the latch circuit LAT and the logic operation circuit LC may be provided outside the bit line driver circuit BD. The semiconductor device 10 does not necessarily include the latch circuit LAT. In the case where the semiconductor device 10 does not include the latch circuit LAT, data output from the sense amplifier circuit SA[n+1] can be directly input to the logic circuit LC, for example.

The sense amplifier circuit SA has a function of amplifying the potential difference between the wiring BL and the wiring REFL. For example, when the potential of the wiring BL is higher than that of the wiring REFL, the sense amplifier circuit SA can output a high potential. In contrast, when the potential of the wiring BL is lower than that of the wiring REFL, the sense amplifier circuit SA can output a low potential. Thus, the bit line driver circuit BD can write binary data, specifically, binary digital data to the memory cells MC and read the binary data written in the memory cells MC. For example, when the potential of the wiring BL is higher than that of the wiring REFL, "0" can be written or read to/from the memory cell MC. In contrast, when the potential of the wiring BL is lower than that of the wiring REFL, "1" can be written or read to/from the memory cell MC.

The wiring ENL can be supplied with an enable signal controlling whether to or not to activate the sense amplifier circuit SA. The enable signal can be a binary digital signal, for example. For example, when the potential of the wiring ENL is high, the sense amplifier circuit SA can be activated, and the potential difference between the wiring BL and the wiring REFL is amplified. In contrast, when the potential of the wiring ENL is low, the sense amplifier circuit SA can be inactivated, and the above amplification is not performed.

The wiring PREL can be supplied with a precharge signal controlling whether to or not to precharge the potentials of the wiring BL and the wiring REFL. The precharge signal can be a binary digital signal, for example. For example, when the potential of the wiring PREL is high, the wiring BL can be precharged to have a high potential. In addition, the potential of the wiring REFL can be set to a potential between the potential of the wiring BL when data with a value of "0" is read from the memory cell MC and the potential of the wiring BL when data with a value of "1" is read from the memory cell MC.

A common potential may be supplied to the wiring ENL[1] to the wiring ENL[n+1]. In this case, the wiring ENL[1] to the wiring ENL[n+1] can be electrically connected to each other. A common potential may be supplied to the wiring PREL[1] to the wiring PREL[n+1]. In this case, the wiring PREL[1] to the wiring PREL[n+1] can be electrically connected to each other.

The latch circuit LAT has a function of retaining data output from the sense amplifier circuit SA[n+1]. In other words, the latch circuit LAT can retain data output from the memory cell MC in the (n+1)-th column. The latch circuit LAT can include m latch circuits capable of retaining 1-bit data. Thus, the latch circuit LAT can retain all pieces of data read from the memory cell MC[1,n+1] to the memory cell MC[m,n+1].

The logic operation circuit LC has a function of performing logic operation using input data. The logic operation circuit LC has a function of performing logic operation of data output from the sense amplifier circuit SA and data output from the latch circuit LAT, for example. Data representing the logic operation results is output from the wiring OUT. For example, the logic operation circuit LC can perform logic operation of data output from the sense amplifier circuit SA[1] and data output from the latch circuit LAT and output data representing logic operation results from the wiring OUT[1]. For example, the logic operation circuit LC can perform logic operation of data output from the sense amplifier circuit SA[n] and data output from the latch circuit LAT and output data representing logic operation results from the wiring OUT[n].

According to the above, by the logic operation circuit LC, data output from each of the sense amplifier circuit SA[1] to the sense amplifier circuit SA[n] is subjected to logic operation with data output from the sense amplifier circuit SA[n+1]. The sense amplifier circuit SA[n+1] has a function of amplifying data read from the memory cells MC in the (n+1)-th column. Thus, the memory cell MC[1,n+1] to the memory cell MC[m,n+1] can be referred to as reference memory cells. Data written to the reference memory cells and data read from the reference memory cells can be referred to as reference data. Furthermore, binary reference data can be referred to as reference binary data.

<Structure Example of Memory Cell>

Figure 2A:
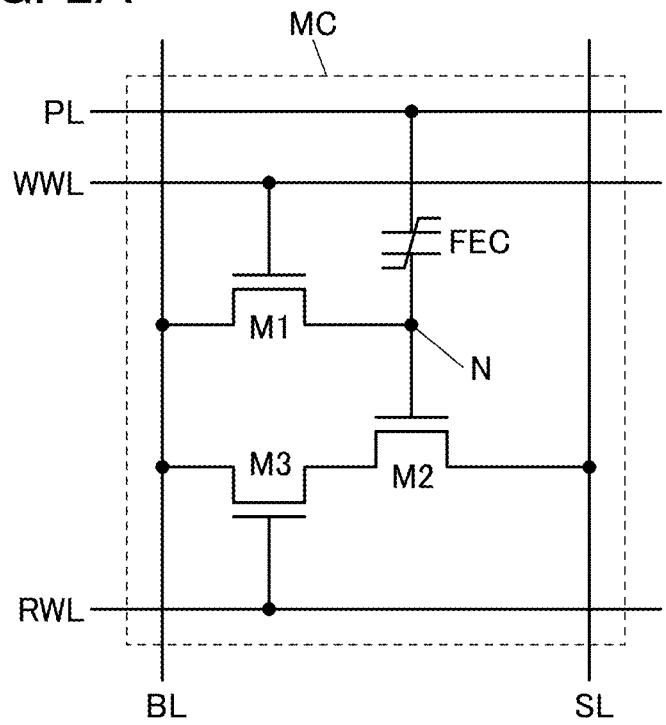
FIG. 2A and FIG. 2B are circuit diagrams each illustrating a structure example of a memory cell.

FIG. 2A is a circuit diagram illustrating a structure example of the memory cell MC. The memory cell MC includes a transistor M1, a transistor M2, a transistor M3, and a capacitor FEC.

Description is made below assuming that the transistor M1 to the transistor M3 are n-channel transistors. However, even when at least some of the transistor M1 to the transistor M3 are p-channel transistors, the potential levels are inverted as appropriate, for example, so that the following description can be applied. For example, in the case where the transistor M2 and the transistor M3 are p-channel transistors, the potential of the wiring SL can be high.

One of a source and a drain of the transistor M1 is electrically connected to a gate of the transistor M2. The gate of the transistor M2 is electrically connected to one electrode of the capacitor FEC. One of a source and a drain of the transistor M2 is electrically connected to one of a source and a drain of the transistor M3.

The other of the source and the drain of the transistor M1 and the other of the source and the drain of the transistor M3 are electrically connected to the wiring BL. The one of the source and the drain of the transistor M2 is electrically connected to the wiring SL. A gate of the transistor M1 is electrically connected to a wiring WWL. A gate of the transistor M3 is electrically connected to the wiring RWL. The other electrode of the capacitor FEC is electrically connected to the wiring PL.

Here, a node at which the one of the source and the drain of the transistor M1, the gate of the transistor M2, and the one electrode of the capacitor FEC are electrically connected is referred to as a node N.

The transistor M1 and the transistor M3 each function as a switching element. Specifically, when the potential of the gate of the transistor M1 is set to a high potential, the transistor M1 can be turned on, and when the potential of the gate of the transistor M1 is set to a low potential, the transistor M1 can be turned off. In other words, the potential of the wiring WWL is set to a high potential, whereby the transistor M1 can be turned on, and the potential of the wiring WWL is set to a low potential, whereby the transistor M1 can be turned off. Similarly, when the potential of the gate of the transistor M3 is set to a high potential, the transistor M3 can be turned on, and when the potential of the gate of the transistor M3 is set to a low potential, the transistor M3 can be turned off. In other words, the potential of the wiring RWL is set to a high potential, whereby the transistor M3 can be turned on, and the potential of the wiring RWL is set to a low potential, whereby the transistor M3 can be turned off. Since each of the transistor M1 and the transistor M3 functions as a switching element, it is preferable that the transistor M1 and the transistor M3 operate in a linear region.

The transistor M2 has a function of an amplifying transistor that amplifies the potential retained in the node N. Thus, the transistor M2 desirably operates in a saturation region.

The capacitor FEC is a capacitor including a material that can have ferroelectricity as a dielectric. In this specification and the like, a capacitor including a material that can have ferroelectricity as a dielectric is referred to as a ferroelectric capacitor.

Examples of materials that can have ferroelectricity include hafnium oxide, zirconium oxide, $HfZrO_X$ (X is a real number greater than 0), a material in which an element J1 (the element J1 here is zirconium (Zr), silicon (Si), aluminum (Al), gadolinium (Gd), yttrium (Y), lanthanum (La), strontium (Sr), or the like) is added to hafnium oxide, and a material in which an element J2 (the element J2 here is hafnium (Hf), silicon (Si), aluminum (Al), gadolinium (Gd), yttrium (Y), lanthanum (La), strontium (Sr), or the like) is added to zirconium oxide. Furthermore, as the material that can have ferroelectricity, a piezoelectric ceramic having a perovskite structure can be used, such as $PbTiO_X$, barium strontium titanate (BST), strontium titanate, lead zirconate titanate (PZT), strontium bismuth tantalate (SBT), bismuth ferrite (BFO), or barium titanate. The material that can have ferroelectricity can be, for example, a plurality of materials selected from the above-listed materials or can have a stacked-layer structure of a plurality of materials selected from the above-listed materials. Note that hafnium oxide, zirconium oxide, $HfZrO_X$, the material in which an element J1 is added to hafnium oxide, and the like have a possibility of changing their crystal structures (properties) depending on various processes or the like as well as deposition conditions. Thus, in this specification and the like, ferroelectrics denote not only a material exhibiting ferroelectric properties but also a material that can have ferroelectricity.

In particular, hafnium oxide or a material containing hafnium oxide and zirconium oxide is preferable as a material that can have ferroelectricity because ferroelectric properties can be secured even when such a material is processed into a thin film of several nm.

The thickness of the material that can have ferroelectricity can be less than or equal to 100 nm, preferably less than or equal to 50 nm, further preferably less than or equal to 20 nm, still further preferably less than or equal to 10 nm (typically greater than or equal to 2 nm and less than or equal to 9 nm). In the case where $HfZrO_X$ is used as the material that can have ferroelectricity, an atomic layer deposition (ALD) method, particularly a thermal ALD method, is preferably used for film deposition.

In the case where the material that can have ferroelectricity is deposited by a thermal ALD method, it is preferable to use a material not containing hydrocarbon (also referred to as HC) as a precursor. In the case where one or both of hydrogen and carbon are contained in the material that can have ferroelectricity, crystallization of the material that can have ferroelectricity is inhibited in some cases. Thus, it is preferable to use a precursor not containing hydrocarbon as described above so as to reduce the concentration of one or both of hydrogen and carbon in the material that can have ferroelectricity. For example, a chlorine-based material can be given as the precursor not containing hydrocarbon. Note that in the case where a material containing hafnium oxide and zirconium oxide ($HfZrO_X$) is used as the material that can have ferroelectricity, $HfCl_4$ and/or $ZrCl_4$ can be used as a precursor.

In the case where the material that can have ferroelectricity is deposited by a thermal ALD method, $H_2O$ or $O_3$ can be used as an oxidizer. Note that the oxidizer used for the thermal ALD method is not limited to the above. For example, the oxidizer used for the thermal ALD method may contain one or more selected from $O_2$, $O_3$, $N_2O$, $NO_2$, $H_2O$, and $H_2O_2$.

There is no particular limitation on the crystal structure of the material that can have ferroelectricity. For example, the crystal structure of the material that can have ferroelectricity may be one or more selected from a cubic crystal structure, a tetragonal crystal structure, a orthorhombic crystal structure, and a monoclinic crystal structure. In particular, the orthorhombic crystal structure is preferable for the material that can have ferroelectricity, in which case the ferroelectric properties are exhibited. Alternatively, for the material that can have ferroelectricity, a composite structure including an amorphous structure and a crystal structure may be employed.

A material that can have ferroelectricity is an insulator and has a property in which application of an electric field from the outside causes internal polarization and the polarization remains even after the electric field is made zero; thus, such a material can be used as a nonvolatile memory element. Hence, the use of the material as a dielectric sandwiched between a pair of electrodes of a capacitor allows the capacitor to be a "capacitor that can have ferroelectricity" or "ferroelectric capacitor". In this specification and the like, the material that can have ferroelectricity is sometimes represented as being provided between one electrode and the other electrode of the capacitor. Note that a memory circuit using a capacitor that can have ferroelectricity is sometimes referred to as an FeRAM (Ferroelectric Random Access Memory), a ferroelectric memory, or the like.

Figure 2B:
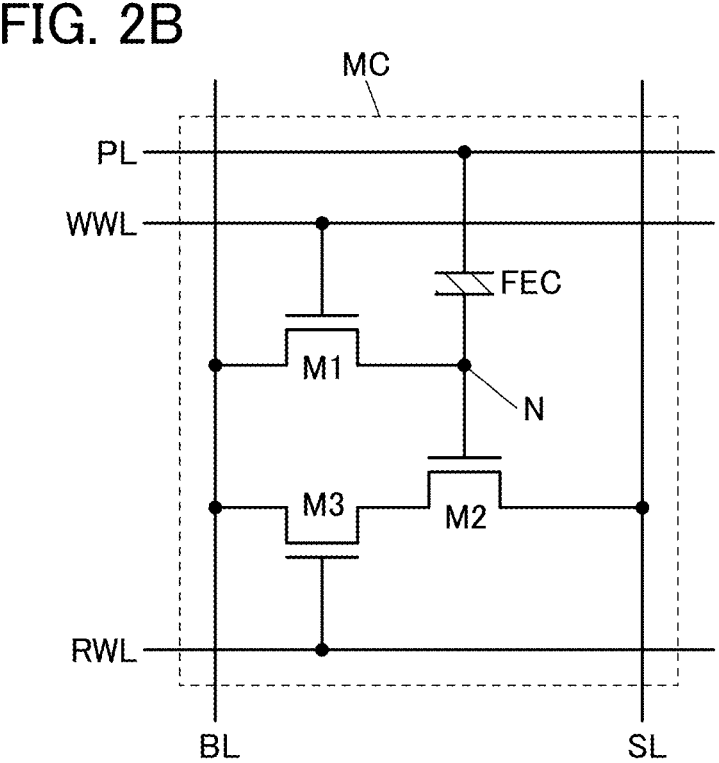

Note that in this specification and the like, a circuit symbol of a ferroelectric capacitor (e.g., the capacitor FEC) is represented as one provided with an oblique line on a circuit symbol of the capacitor, as shown in FIG. 2A. Another circuit symbol is one provided with a plurality of oblique lined between two parallel lines representing a circuit symbol of the capacitor, as shown in FIG. 2B.

Each of the transistor M1 to the transistor M3 can be a transistor containing silicon in its channel formation region (hereinafter referred to as a Si transistor). In particular, when a transistor containing single crystal silicon or low-temperature polysilicon in its channel formation region is used as each of the transistor M1 to the transistor M3, the on-state current of each of the transistor M1 to the transistor M3 can be increased. Accordingly, the high-speed operation of the memory cell MC is achieved, which leads to the semiconductor device 10 that can be driven at high speed. Alternatively, each of the transistor M1 to the transistor M3 may be a transistor containing amorphous silicon in its channel formation region.

Note that as each of the transistor M1 to the transistor M3, a transistor other than the Si transistor may be used. For example, OS transistors can be used as the transistor M1 to the transistor M3. An OS transistor has a feature of high withstand voltage. Thus, with use of OS transistors as the transistor M1 to the transistor M3, high voltages can be applied to the transistor M1 to the transistor M3 even when the transistor M1 to the transistor M3 are miniaturized. Miniaturization of the transistor M1 to the transistor M3 allows the area occupied by the memory cells MC to be reduced. Accordingly, the memory cells MC can be arranged at high density. Consequently, the semiconductor device 10 can have large storage capacity.

For example, OS transistors can be used as the transistor M1 to the transistor M3 included in the memory cell MC, and Si transistors can be used as transistors included in the word line driver circuit WD, the plate line driver circuit PD, the potential generation circuit SD, and the bit line driver circuit BD. Thus, the memory cell array MCA can be stacked over the word line driver circuit WD, the plate line driver circuit PD, the potential generation circuit SD, and the bit line driver circuit BD, to have regions overlapping therewith. Such a structure enables the semiconductor device 10 to be downsized while maintaining storage capacity of the semiconductor device 10. Even when OS transistors are used as transistors included in the word line driver circuit WD, the plate line driver circuit PD, the potential generation circuit SD, and the bit line driver circuit BD, these circuits and the memory cell array MCA can be stacked to have regions overlapping with each other.

In the case where the transistor M1 to the transistor M3 are OS transistors, a metal oxide in the channel formation region of each of the transistor M1 to the transistor M3 is preferably an oxide containing at least one of indium, gallium, and zinc. Instead of the oxide, an oxide containing at least one of indium, an element M (as the element M, for example, one kind or a plurality of kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given), and zinc may be used.

All of the transistor M1 to the transistor M3 are not necessarily the same kind of transistors. For example, some of the transistor M1 to the transistor M3 may be Si transistors and the other may be OS transistors. For example, a transistor to which high voltages are applied, among the transistor M1 to the transistor M3, can be an OS transistor and the other transistors may be Si transistors.

<Characteristics of Dielectric>

The dielectric of the ferroelectric capacitor has hysteresis characteristics. FIG. 3A is a graph showing an example of the hysteresis characteristics. In FIG. 3A, the horizontal axis represents voltages applied to the dielectric. The voltage can be a value obtained by subtracting the potential of one electrode of the capacitor FEC from the potential of the other electrode of the capacitor FEC, for example. In other words, a voltage obtained by subtracting the potential of the wiring PL from the potential of the node N can be applied to the dielectric, for example.

In FIG. 3A, the vertical axis represents polarization of the dielectric, and when the polarization shows a positive value, negative charge is localized on the one electrode side of the capacitor FEC and positive charge is localized on the other electrode side of the capacitor FEC. Meanwhile, when the polarization shows a negative value, negative charge is localized on the other electrode side of the capacitor FEC, and positive charge is localized on the one electrode side of the capacitor FEC.

Note that the voltage represented by the horizontal axis of the graph in FIG. 3A may be a value obtained by subtracting the potential of the one electrode of the capacitor FEC from the potential of the other electrode of the capacitor FEC. The polarization represented by the vertical axis of the graph in FIG. 3A may be expressed by a positive value when negative charge is localized on the other electrode side of the capacitor FEC and positive charge is localized on the one electrode side of the capacitor FEC, and expressed by a negative value when negative charge is localized on the one electrode side of the capacitor FEC and positive charge is localized on the other electrode side of the capacitor FEC.

As shown in FIG. 3A, the hysteresis characteristics of the dielectric can be represented by a curve 11 and a curve 12. Voltages at the intersection points of the curve 11 and the curve 12 are VSP and −VSP.

After the voltage lower than or equal to −VSP is applied to the dielectric, voltage applied to the dielectric is increased, whereby the polarization of the dielectric increases along the curve 11. Meanwhile, after the voltage higher than or equal to VSP is applied to the dielectric, voltage applied to the dielectric is decreased, whereby the polarization of the dielectric decreases along the curve 12. Thus, VSP and the −VSP can each be referred to as saturated polarization voltage. Note that for example, VSP is referred to as a first saturated polarization voltage and —VSP is referred to as a second saturated polarization voltage, in some cases.

Here, voltage applied to the dielectric when the polarization of the dielectric is zero in the case where the polarization of the dielectric changes along the curve 11 is voltage Vc. Furthermore, voltage applied to the dielectric when the polarization of the dielectric is zero in the case where the polarization of the changes along the curve 12 is voltage −Vc. Vc and −Vc can each be referred to as a coercive voltage. The values of Vc and −Vc can be regarded as intermediate values between −VSP and VSP. Note that for example, Vc is referred to as a first coercive voltage and −Vc is referred to as a second coercive voltage, in some cases.

Note that the absolute value of the first saturated polarization voltage may be different from the absolute value of the second saturated polarization voltage. Furthermore, the absolute value of the first coercive voltage may be different from the absolute value of the second coercive voltage.

<Driving Method Example of Semiconductor Device>

An example of a method of driving the semiconductor device 10 is described below. In the following description, a voltage applied to a dielectric of the capacitor FEC is a value obtained by subtracting the potential of the wiring PL from the potential of the node N.

FIG. 3B1 and FIG. 3B2 are circuit diagrams each showing an example of a driving method of the semiconductor device 10. In FIG. 3B1 and FIG. 3B2, "H" denotes a high potential and "L" denotes a low potential. The same applies to other drawings showing a method for driving the memory cell MC and the like.

In FIG. 3B1 and FIG. 3B2, across is put on a transistor that is in an off state. In addition, the voltage applied to the dielectric of the capacitor FEC is surrounded by a dashed-dotted line to be emphasized.

FIG. 3B1 shows an example in which binary data whose value is "0" is written to the memory cell MC, and FIG. 3B2 shows an example in which binary data whose value is "1" is written to the memory cell MC. A period during which operation shown in FIG. 3B1 or FIG. 3B2 is performed can be referred to as a data writing period.

As shown in FIG. 3B1 and FIG. 3B2, the potential of the wiring WWL is set to a high potential and the potential of the wiring RWL is set to a low potential during the data writing period. Thus, the transistor M1 is turned on and the transistor M3 is turned off.

In the case where binary data whose value is "0" is written to the memory cell MC, the potential of the wiring BL is set to GND and the potential of the wiring PL is set to Vw as shown in FIG. 3B1. GND can be a ground potential, for example. Vw is preferably higher than or equal to VSP. GND is not necessarily a ground potential as long as the semiconductor device 10 can be driven well enough to achieve an object of one embodiment of the present invention.

The description below is made on the assumption that Vw is a potential higher than or equal to VSP and GND is aground potential. In addition, as potentials supplied to the wiring BL and the wiring PL, Vw and GND are described as a high potential and a low potential, respectively.

In the example shown in FIG. 3B1, a voltage −Vw is applied to the dielectric of the capacitor FEC. By this, positive charge is localized on the one electrode side of the capacitor FEC (the node N side), and negative charge is localized on the other electrode side of the capacitor FEC (the wiring PL side). Accordingly, the binary data whose value is "0" can be written to the memory cell MC. As the voltage applied to the dielectric of the capacitor FEC is increased until the voltage of the dielectric does not become equivalent to or exceed VSP, the polarization of the dielectric is accelerated along the curve 11.

In the case where binary data whose value is "1" is written to the memory cell MC, the potential of the wiring BL is set to Vw, and the potential of the wiring PL is set to GND as shown in FIG. 3B2. By this, the voltage Vw is applied to the dielectric of the capacitor FEC. Accordingly, negative charge is localized on the one electrode side of the capacitor FEC (the node N side), and positive charge is localized on the other electrode side of the capacitor FEC (the wiring PL side). Thus, the binary data whose value is "1" can be written to the memory cell MC. As the voltage applied to the dielectric of the capacitor FEC is decreased but is in the range higher than −VSP, the polarization of the dielectric is reduced along the curve 12.

It can be argued that the operation shown in FIG. 3B1 causes the writing of binary data whose value is "1" to the memory cell MC and the operation shown in FIG. 3B2 causes the writing of binary data whose value is "0" to the memory cell MC.

FIG. 4A and FIG. 4B are timing charts each showing a driving method of the semiconductor device 10. FIG. 4A shows an example in which binary data whose value is "0" is read from the memory cell MC where the binary data has been written and retained, and returning data is performed. FIG. 4B shows an example in which binary data whose value is "1" is read from the memory cell MC where the binary data has been written and retained, and returning data is performed. As for the timing charts shown in FIG. 4A and FIG. 4B, all of the transistor M1 to the transistor M3 are n-channel transistors.

First, the case where binary data whose value is "0" is retained in the memory cell MC is described. In this case, as shown in FIG. 4A, the potential of the wiring WWL is set to a low potential in Time T10 to Time T11. Thus, the transistor M1 is turned off. In addition, the potential of the wiring RWL is set to a low potential. Thus, the transistor M3 is turned off. The potential of the wiring PL is set to GND.

In addition, the potential of the wiring ENL is set to a low potential. Accordingly, the sense amplifier circuit SA is brought into an inactivated state. Note that the potential of the node N is GND.

In such a state, the potential of the wiring PREL is set to a high potential, whereby the wiring BL and the wiring REFL are precharged. Accordingly, the potential of the wiring BL becomes Vw, for example, and higher than the potential of the wiring SL. The potential of the wiring REFL becomes a potential between GND and Vw.

In Time T11 to Time T12, the potential of the wiring RWL is set to a high potential. Accordingly, the transistor M3 is turned on. The potential of the wiring PREL is set to a low potential. Accordingly, the precharge of the wiring BL and the wiring REFL is completed.

In Time T12 to Time T13, the potential of the wiring PL is set to Vw. The potential of the node N increases due to capacitive coupling of the capacitor FEC or the like. Here, the capacitive coupling coefficient of the node N is less than 1, and the potential of the node N in times before Time T12 is GND; accordingly, the potential of the node N after an increase in the potential is lower than Vw. Note that even when the potential of the node N increases, the reversal of polarization is not generated in the dielectric of the capacitor FEC. In other words, a value obtained by subtracting the potential of the wiring PL from the potential of the node N is lower than or equal to Vc.

In this specification and the like, reversal of the polarization of the dielectric of the ferroelectric capacitor such as capacitor FEC is referred to as generation of polarization reversal in the ferroelectric capacitor, in some cases.

The potential of the wiring PL can be set to Vw in Time T11 to Time T12, and the potential of the wiring RWL can be set to a high potential in Time T12 to Time T13. Moreover, the potential of the wiring PREL can be kept at the high potential in Time T11 to Time T12, and the potential of the wiring PREL can be set to a low potential in Time T12 to Time T13.

In accordance with the above, it can be said that the transistor M3 is turned on and the potential of the node N increases in Time T11 to Time T13. Since the wiring BL is precharged to have a potential higher than the potential of the wiring SL, the potential of the wiring BL decreases in accordance with the potential of the node N which is electrically connected to the gate of the transistor M2. Accordingly, the data whose value is "0" retained in the memory cell MC can be read from the memory cell MC.

In Time T13 to Time T14, the potential of the wiring ENL is set to a high potential. Accordingly, the sense amplifier circuit SA is brought into an inactivated state, and the difference between the potential of the wiring BL and the potential of the wiring REFL is amplified. In the case where the potential of the wiring BL is higher than the potential of the wiring REFL at the time when the wiring ENL has a high potential, the potential of the wiring BL becomes Vw that is a high potential, and the potential of the wiring REFL becomes GND that is a low potential. Consequently, the data whose value is "0" read from the memory cell MC can be output from the sense amplifier circuit SA.

As described above, the semiconductor device 10 performs the operation in Time T10 to Time T14, whereby the data retained in the memory cell MC can be read and output from the wiring OUT. Accordingly, the period from Time T10 to Time T14 can be referred to as a data reading period.

Alternatively, a period from Time T11 to Time T14 excluding a period from Time T10 to Time T11 in which the wiring BL is precharged can be referred to as a data reading period.

In Time T14 to Time T15, the potential of the wiring WWL is set to a high potential. Accordingly, the transistor M1 is turned on. In addition, the potential of the wiring RWL is set to a low potential. Accordingly, the transistor M3 is turned off. In addition, the transistor M1 is turned on, whereby the potential of the node N becomes Vw that is the potential of the wiring BL.

In Time T14 to Time T15, both the potential of the node N and the potential of the wiring PL become Vw. Accordingly, the voltage applied to the dielectric of the capacitor FEC is 0 V. As shown in FIG. 3A or the like, even when the voltage applied to the dielectric of the capacitor FEC is 0 V, a polarization reversal is not generated in the dielectric.

In Time T15 to Time T16, the potential of the wiring PL is set to GND. Accordingly, the voltage applied to the dielectric of the capacitor FEC is Vw. Thus, a polarization reversal is generated in the dielectric, and the data whose value is "1" is written to the memory cell MC. Consequently, binary data obtained by reversing the value of the binary data read from the memory cell MC in Time T10 to Time T14 is returned to the memory cell MC.

In Time T16 to Time T17, the potential of the wiring ENL is set to a low potential. Accordingly, the sense amplifier circuit SA is brought into an inactivated state. The potential of the wiring BL is set to GND. Since the transistor M1 is in an on state, the potential of the node N is GND.

In Time T17, the potential of the wiring WWL is set to a low potential. Accordingly, the transistor M1 is turned off.

As described above, the semiconductor device 10 performs the operation in Time T14 to Time T17, whereby the data can be returned to the memory cell MC. Thus, a period from Time T14 to Time T17 can be referred to as a data returning period. Alternatively, a period from Time T14 to Time T16 in which the sense amplifier circuit SA is in an activated state, among Time T14 to Time T17, can be referred to as a data returning period.

Next, the case where binary data whose value is "1" is retained in the memory cell MC is described. In this case, as shown in FIG. 4B, the potential of the wiring WWL is set to a low potential in Time T20 to Time T21. Accordingly, the transistor M1 is turned off. In addition, the potential of the wiring RWL is set to a low potential. Accordingly, the transistor M3 is turned off. In addition, the potential of the wiring PL is set to GND.

In addition, the potential of the wiring ENL is set to a low potential. Accordingly, the sense amplifier circuit SA is brought into an inactivated state. Note that the potential of the node N is GND.

In the above state, the potential of the wiring PREL is set to a high potential, whereby the wiring BL and the wiring REFL are precharged. Accordingly, the potential of the wiring BL becomes Vw, for example, and higher than the potential of the wiring SL. The potential of the wiring REFL becomes a potential between GND and Vw.

In Time T21 to Time T22, the potential of the wiring RWL is set to a high potential. Accordingly, the transistor M3 is turned on. The potential of the wiring PREL is set to a low potential. Accordingly, the precharge of the wiring BL and the wiring REFL is completed.

In Time T22 to Time T23, the potential of the wiring PL is set to Vw. The potential of the node N increases due to capacitive coupling of the capacitor FEC or the like. Since the data whose value is "1" is retained in the memory cell MC in this case, negative charge is localized on the one electrode side of the capacitor FEC (the node N side). Hence, the capacitive coupling coefficient of the node N is larger than in the case of retaining the data whose value is "0" in the memory cell MC. Accordingly, the potential increment of the node N in Time T22 to Time T23 is larger than the potential increment of the node N in Time T12 to Time T13 shown in FIG. 4A. Note that the capacitive coupling coefficient of the node N is less than 1, and the potential of the node N in times before Time T22 is GND; thus, the potential of the node N after an increase in the potential is lower than Vw. Even when the potential of the node N increases, the reversal of polarization is not generated in the dielectric of the capacitor FEC. That is, the value obtained by subtracting the potential of the wiring PL from the potential of the node N is greater than or equal to −Vc.

The potential of the wiring PL can be set to Vw in Time T21 to T22, and the potential of the wiring RWL can be set to a high potential in Time T22 to Time T23. Moreover, the potential of the wiring PREL can be kept at the high potential in Time T21 to T22, and the potential of the wiring PREL can be set to a low potential in Time T22 to T23.

In accordance with the above, it can be said that the transistor M3 is turned on and the potential of the node N increases in Time T21 to Time T23. Since the wiring BL is precharged to have a potential higher than the potential of the wiring SL, the potential of the wiring BL decreases in accordance with the potential of the node N which is electrically connected to the gate of the transistor M2. Specifically, the potential decrement of the wiring BL in Time T22 to Time T23 is larger than the potential decrement of the wiring BL in Time T12 to Time T13 shown in FIG. 4A. Accordingly, for example, the potential of the wiring BL in Time T23 is lower than the potential of the wiring BL in Time T13. Hence, the data whose value is "1" retained in the memory cell MC can be read from the memory cell MC.

In Time T23 to Time T24, the potential of the wiring ENL is set to a high potential. Accordingly, the sense amplifier circuit SA is brought into an inactivated state, and the difference between the potential of the wiring BL and the potential of the wiring REFL is amplified. In the case where the potential of the wiring BL is lower than the potential of the wiring REFL at the time when the wiring ENL has a high potential, the potential of the wiring BL becomes GND that is a low potential, and the potential of the wiring REFL becomes Vw that is a high potential. Consequently, the data whose value is "1" read from the memory cell MC can be output from the sense amplifier circuit SA.

As described above, the semiconductor device 10 performs the operation in Time T20 to Time T24, whereby the data retained in the memory cell MC can be read and output from the wiring OUT. Accordingly, the period from Time T20 to Time T24 can be referred to as a data reading period. Alternatively, a period from Time T21 to Time T24 excluding a period from Time T20 to Time T21 in which the wiring BL is precharged can be referred to as a data reading period.

Note that, in some cases, the potential of the node N increases later than an increase in the potential of the wiring PL in Time T22 to Time T23. In this case, a high voltage (with a value large in the negative direction) is instantaneously applied to the dielectric of the capacitor FEC. This causes a possibility of generation of polarization reversal in the dielectric, leading to damage to data retained in the memory cell MC.

In Time T24 to Time T25, the potential of the wiring WWL is set to a high potential. Accordingly, the transistor M1 is turned on. In addition, the potential of the wiring RWL is set to a low potential. Accordingly, the transistor M3 is turned off. In addition, the transistor M1 is turned on, whereby the potential of the node N becomes GND that is the potential of the wiring BL.

In Time T24 to Time T25, the potential of the node N becomes GND. In contrast, the potential of the wiring PL is kept at Vw. Thus, the voltage applied to the dielectric of the capacitor FEC is −Vw. Consequently, a polarization reversal is generated in the dielectric, and the data whose value is "0" is written to the memory cell MC. That is, binary data obtained by reversing the value of the binary data read from the memory cell MC in Time T20 to Time T24 is returned to the memory cell MC. Note that in the case where the data retained in the memory cell MC is damaged in Time T22 to Time T23, a polarization reversal of the dielectric of the capacitor FEC is not generated in Time T24 to Time T25.

In Time T25 to Time T26, the potential of the wiring PC becomes GND. Accordingly, both the potential of the node N and the potential of the wiring PL become GND. Thus, the voltage applied to the dielectric of the capacitor FEC is 0 V. As shown in FIG. 3A or the like, a polarization reversal is not generated even when the voltage applied to the dielectric of the capacitor FEC is 0 V.

In Time T26 to Time T27, the potential of the wiring ENL is set to a low potential. Accordingly, the sense amplifier circuit SA is brought into an inactivated state.

In Time T27, the potential of the wiring WWL is set to a low potential. Accordingly, the transistor M1 is turned off.

As described above, the semiconductor device 10 performs the operation in Time T24 to Time T27, whereby the data can be returned to the memory cell MC. Thus, a period from Time T24 to Time T27 can be referred to as a data returning period. Alternatively, a period from Time T24 to Time T26 in which the sense amplifier circuit SA is in an inactivated state, among Time T24 to Time T27, can be referred to as a data returning period.

As described above, regardless of whether the value of binary data retained in the memory cell MC is "0" or "1", the polarization reversal in the dielectric of the capacitor FEC is generated one time in total throughout a combination of one data reading period and one data returning period.

Here, the case where the memory cell MC has a structure illustrated in FIG. 5A is considered. The memory cell MC illustrated in FIG. 5A has a structure in which the transistor M2 and the transistor M3 are eliminated from the memory cell MC illustrated in FIG. 2A. In the memory cell MC illustrated in FIG. 5A, a wiring WL is electrically connected to the gate of the transistor M1.

FIG. 5B1 and FIG. 5B2 are timing charts showing a driving method of the semiconductor device 10 in the case where the memory cell MC has a structure illustrated in FIG. 5A. FIG. 5B1 shows an example in which binary data whose value is "0" is read from the memory cell MC where the binary data has been written and retained, and returning data is performed. FIG. 5B2 shows an example in which binary data whose value is "1" is read from the memory cell MC where the binary data has been written and retained, and returning data is performed.

In the example shown in FIG. 5B1, in Time T30 to Time T33, data retained in the memory cell MC is read out. In other words, a period from Time T30 to Time T33 is a data reading period. In Time T33 to Time T35, data is returned to the memory cell MC. In other words, a period from Time T33 to Time T35 is a data returning period. Since binary data whose value is "0" is retained before Time T30, positive charge is localized on the one electrode side of the capacitor FEC (the node N side), and negative charge is localized on the other electrode side (the wiring PL side) of the capacitor FEC. In this case, in Time T30 to Time T35, a polarization reversal in the dielectric of the capacitor FEC is not generated. That is, in the case where the value of the binary data retained in the memory cell MC is "0", a polarization reversal in the dielectric of the capacitor FEC is not generated throughout the data reading period and the data writing period.

In the example shown in FIG. 5B2, in Time T40 to Time T43, data retained in the memory cell MC is read out. In other words, a period from Time T40 to Time T43 is a data reading period. In Time T43 to Time T45, data is returned to the memory cell MC. In other words, a period from Time T43 to Time T45 is a data returning period. Since binary data whose value is "1" is retained before Time T30, negative charge is localized on the one electrode side of the capacitor FEC (the node N side), and positive charge is localized on the other electrode side of the capacitor FEC (the wiring PL side). In this case, in each of a period from Time T41 to Time T42 and a period from Time T43 to Time T44, a polarization reversal in the dielectric of the capacitor FEC is generated. That is, in the case where the value of the binary data retained in the memory cell MC is "1", the polarization reversal in the dielectric of the capacitor FEC is generated two times in total throughout one data reading period and one data returning period.

As described above, the polarization reversal is generated a plurality of times in the dielectric of the capacitor FEC included in the memory cell MC which frequently retains data whose value is "1". This is likely to cause fatigue damage in the dielectric. Accordingly, in the case where the memory cell MC included in the semiconductor device 10 has the structure illustrated in FIG. 5A, the reliability of the semiconductor device 10 is reduced in some cases. In contrast, in the case where the memory cell MC included in the semiconductor device 10 has the structure illustrated in FIG. 2A, for example, the number of polarization reversals generated in the dielectric of the capacitor FEC throughout one data reading period and one data retuning period is one even when the value of data retained in the memory cell MC is "1". According to the above, with use of the structure illustrated in FIG. 2A for the memory cell MC, for example, the semiconductor device 10 can have high reliability, as compared to the case of using the structure illustrated in FIG. 5A for the memory cell MC.

In the case where the memory cell MC is driven by the method illustrated in FIG. 4A and FIG. 4B, the value of data retained in the memory cell MC is inverted every time the data is returned to the memory cell MC. However, it is preferable that the value of data output from the wiring OUT do not change even when the data is returned. In order to prevent a change in the value of data output from the wiring OUT even when returning data is performed, the logic operation circuit LC is provided between the sense amplifier circuit SA and the wiring OUT.

Specifically, the logic operation circuit LC executes logic operation of data read from the memory cell MC[i,1] to the memory cell MC[i,n] (i is an integer greater than or equal to 1 and less than or equal to m) and data read from the memory cell MC[i,n+1], for example. The logic operation can be an exclusive disjunction. Operation results are output from the wiring OUT. Specifically, data representing exclusive disjunction of the data read from the memory cell MC[i,1] and the data read from the memory cell MC[i,n+1] is output from the wiring OUT[1]. In addition, data representing exclusive disjunction of the data read from the memory cell MC[i,n] and the data read from the memory cell MC[i,n+1] is output from the wiring OUT[n]. Accordingly, in the case where the memory cell MC[i,n+1] retains data whose value is "0", for example, data whose value is the same as that of the data retained in the memory cell MC[i,1] to the memory cell MC[i,n] is output from the wiring OUT[1] to the wiring OUT[n]. In contrast, in the case where the memory cell MC[i,n+1] retains data whose value is "1", for example, data whose values is an inverted value of the data retained in the memory cell MC[i,1] to the memory cell MC[i,n] is output from the wiring OUT[1] to the wiring OUT[n]. For example, in the case where returning data is performed on the memory cells MC in the i-th row, the values of data retained in all of the memory cell MC[i,1] to the memory cell MC[i,n+1] are inverted. Hence, even when the value of data retained in the memory cell MC is inverted by returning data to the memory cell MC, data with a desired value can be output changelessly from the wiring OUT in the data reading period.

According to the above, data retained in the memory cells MC in the (n+1)-th column can be data representing whether values of data read from the memory cells MC in the first to n-th columns are inverted or not. Thus, the memory cells MC in the (n+1)-th column can be referred to as reference memory cells. Furthermore, data retained in the memory cells MC in the (n+1)-th column can be referred to as reference data. The data retained in the memory cell MC can be binary data; thus, data retained in the memory cells MC in the (n+1)-th column can be referred to as reference binary data.

Table 1 shows an example of a driving method of the semiconductor device 10. The driving example shown in Table 1 is for driving the semiconductor device 10 with driving modes represented as Step S1 to Step S8. Table 1 exhibits values of data retained in the memory cell MC[i,j1], the memory cell [i,j2] (j1 and j2 are each an integer greater than or equal to 1 and less than or equal to n), and the memory cell MC[i,n+1] and values of data output from the wiring OUT[j1] and the wiring OUT[j2], which are obtained by operation of the steps.

After that, in Step S3, the data retained in the memory cell MC is read out, and returning data is performed. Specifically, the operation shown in FIG. 4A is performed on the memory cell MC retaining data whose value is "0", and the operation shown in FIG. 4B is performed on the memory cell MC retaining data whose value is "1".

At the starting point of Step S3 (the end point of Step S2), the memory cells MC in the (n+1)-th column retain data whose value is "0". Thus, from the wiring OUT[1] to the wiring OUT[n], data retained in the memory cells MC in the first to n-th columns is output as it is at the starting point of Step S3 (the end point of Step S2). As described above, the value of data retained in the memory cell MC[i,j1] is "0" and the value of data retained in the memory cell MC[i,j2] is "1" at the starting point of Step S3 (the end point of Step S2). Therefore, in the case where data retained in the memory cells MC in the i-th row is read, the wiring OUT[j1] outputs data whose data is "0", and the wiring OUT[j2] outputs data whose value is "1".

Moreover, data is returned to the memory cell MC, whereby the data retained in the memory cell MC is inverted. Thus, as shown in Table 1, at the end point of Step S3, the value of data retained in the memory cell MC[i,j1] becomes "1", and the value of data retained in the memory cell MC[i,j2] becomes "0".

In Step S4, as in Step S3, data retained in the memory cell MC is read out, and then returning data is performed.

At the starting point of Step S4 (the end point of Step S3), the memory cells MC in the (n+1)-th column retains data whose value is "1". Thus, from the wiring OUT[1] to the wiring OUT[n], data whose value is an inverted value of data retained in the memory cells MC in the first to n-th columns is output at the starting point of Step S4 (the end point of Step S3). As described above, at the starting point of Step S4 (the end point of Step S3), the value of data retained in the memory cell MC[i,j1] is "1" and the value of data retained in the memory cell MC[i,j2] is "0". Therefore,

TABLE 1

| Driving mode | Data retained in MC | | | Data output from BD | |
|---|---|---|---|---|---|
| | MC[i, j1] | MC[i, j2] | MC[i, n + 1] | OUT[j1] | OUT[j2] |
| Initialization (S1) | 0 | 0 | 0 | — | — |
| Writing (S2) | 0 | 1 | 0 | — | — |
| Reading + Returning (S3) | 1 | 0 | 1 | 0 | 1 |
| Reading + Returning (S4) | 0 | 1 | 0 | | |
| Reading + Returning (S5) | 1 | 0 | 1 | | |
| Writing (S6) | 0 | 1 | 1 | — | — |
| Reading + Returning (S7) | 1 | 0 | 0 | 1 | 0 |
| Reading + Returning (S8) | 0 | 1 | 1 | | |

First, in Step S1, data of whose value is "0" is written to all the memory cells MC, for example. In other words, the operation shown in FIG. 3B1 is performed on all the memory cells MC, for example. Thus, data retained in the memory cells MC is initialized.

Next, in Step S2, desired data is written to the memory cells MC in the first to n-th columns. Specifically, the operation shown in FIG. 3B1 is performed on the memory cell MC to which data whose value is "0" is written, and the operation shown in FIG. 3B2 is performed on the memory cell MC to which data whose value is "1" is written. In Table 1, the data whose value is "0" is written to the memory cell MC[i,j1], and the data whose value is "1" is written to the memory cell MC[i,j2]. Furthermore, in Step S2, data whose value is "0" is written to the memory cell MCs in the (n+1)-th column.

in the case where data retained in the memory cells MC in the i-th row is read, the wiring OUT[j1] outputs data whose value is "0", and the wiring OUT[j2] outputs data whose value is "1". In other words, data with the same value as the data output from the wiring OUT in Step S3 is output in Step S4.

In Step S5, as in Step S3 or the like, data retained in the memory cell MC is read out, and then returning data is performed. Thus, as in Step S3, the wiring OUT[j1] outputs data whose value is "0" and the wiring OUT[j2] outputs data whose value is "1".

Next, in Step S6, desired data is written to the memory cells MC in the first to n-th columns. Specifically, the operation shown in FIG. 3B1 is performed on the memory cell MC to which data whose value is "0" is written, and the operation shown in FIG. 3B2 is performed on the memory cell MC to which data whose value is "1" is written as in Step S2. Thus, data retained in the memory cells MC in the first to n-th columns can be updated.

In Table 1, the data whose value is "0" is written to the memory cell MC[i,j1], and the data whose value is "1" is written to the memory cell MC[i,j2]. Furthermore, in Step S6, data is not written to the memory cells MC in the (n+1)-th column. In the example shown in Table 1, the memory cells MC in the (n+1)-th column retain data whose value is "1" at the end point of Step S6. Thus, the data whose value is "1" is retained changelessly in the memory cells MC in the (n+1)-th column.

Note that in Step S6, regardless of the value of data retained in the memory cells MC in the (n+1)-th column, data whose value is "0" may be written to the memory cells in the (n+1)-th column.

Next, in Step S7, as in Step S3 or the like, data retained in the memory cell MC is read out, and then returning data is performed.

At the starting point of Step S7 (the end point of Step S6), the memory cells MC in the (n+1)-th column retain data whose value is "1". Thus, from the wiring OUT[1] to the wiring OUT[n], data whose value is an inverted value of data retained in the memory cells MC in the first to n-th columns is output at the starting point of Step S7 (the end point of Step S6). As described above, at the starting point of Step S7 (the end point of Step S6), the value of data retained in the memory cell MC[i,j1] is "1" and the value of data retained in the memory cell MC[i,j2] is "0". Therefore, in the case where data retained in the memory cells MC in the i-th row is read, the wiring OUT[j1] outputs data whose value is "1", and the wiring OUT[j2] outputs data whose value is "0".

In Step S8, as in Step S7 or the like, data retained in the memory cell MC is read out, and then returning data is performed. Thus, as in Step S7, the wiring OUT[j1] outputs data whose value is "1", and the wiring OUT[j2] outputs data whose value is "0".

As described above, by the driving method of the semiconductor device of one embodiment of the present invention, the wiring OUT can output data with a desired value changelessly in a data reading period even when the value of data retained in the memory cell MC is inverted by data returning to the memory cell MC.

This embodiment can be combined with the other embodiments described in this specification and the like as appropriate.

Embodiment 2

Figure 6:
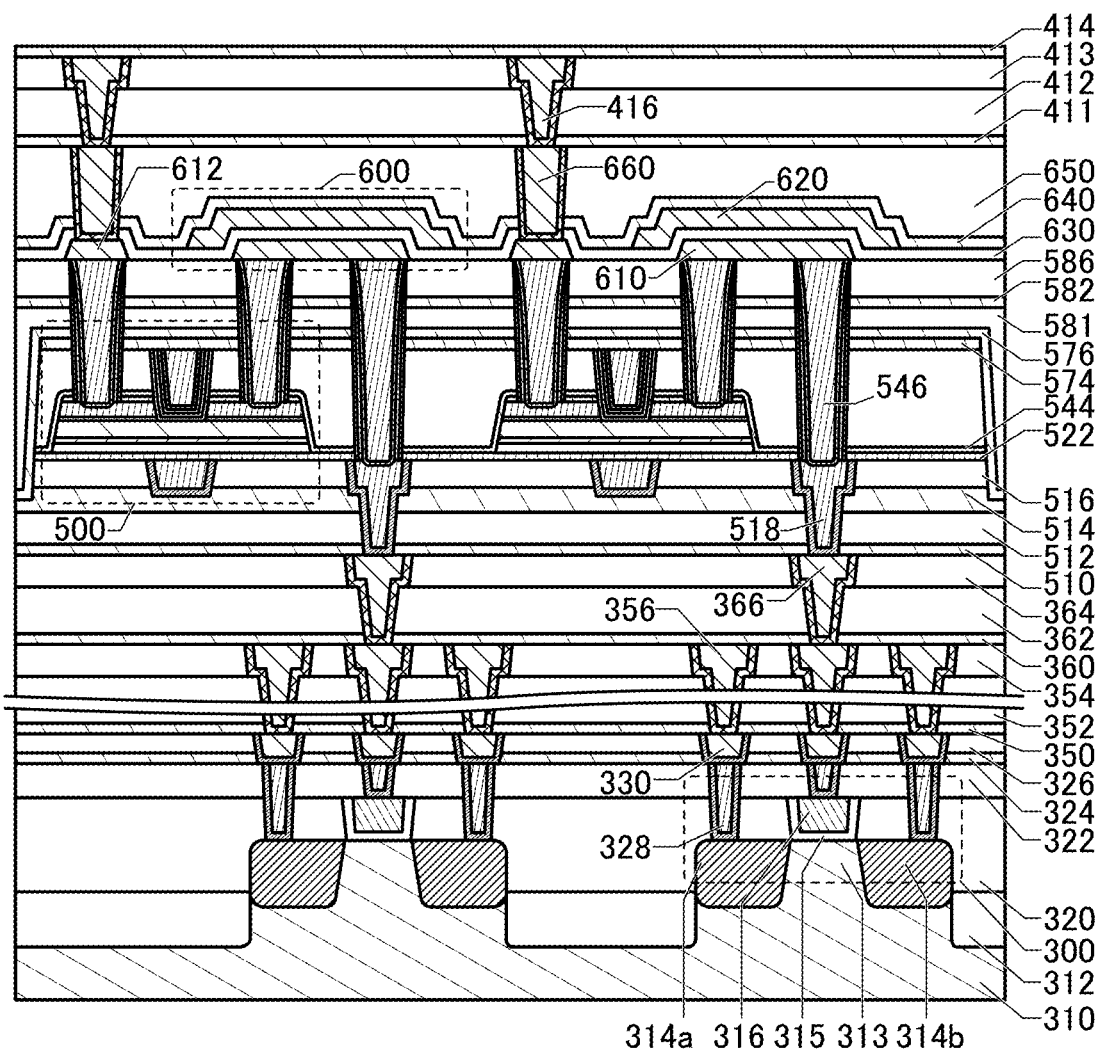
FIG. 6 is a schematic cross-sectional view illustrating a structure example of a semiconductor device.
Figure 7A:
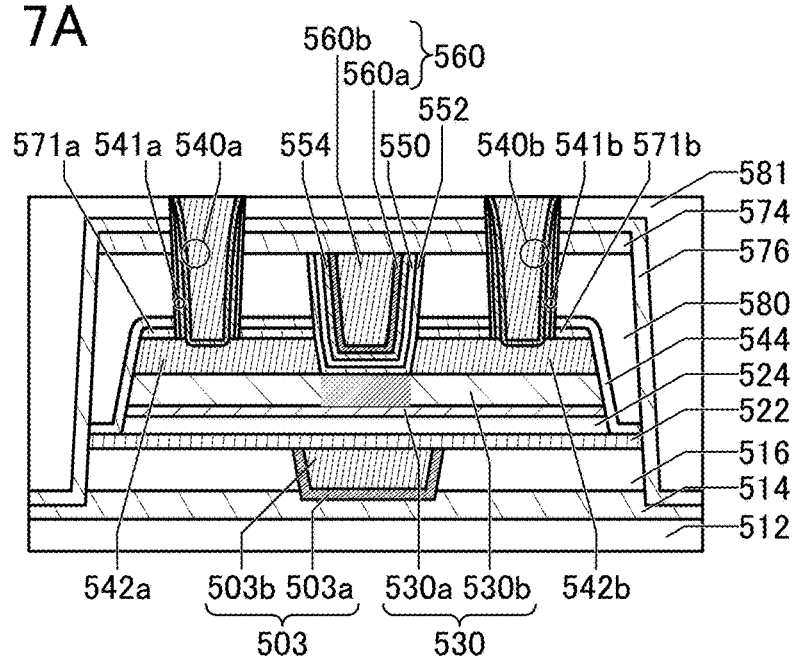
FIG. 7A to FIG. 7C are schematic cross-sectional views illustrating a structure example of a transistor.
Figure 7B:
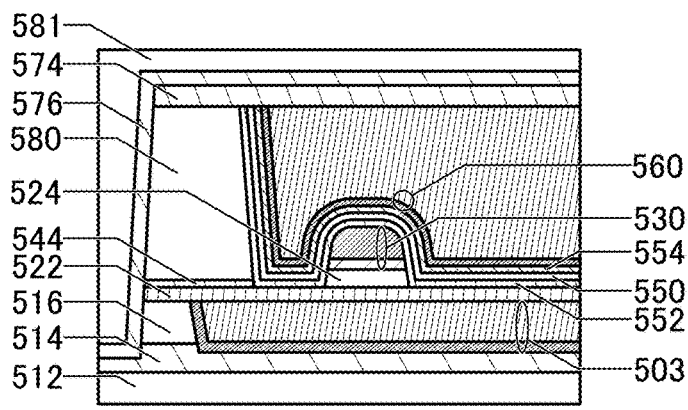
Figure 7C:
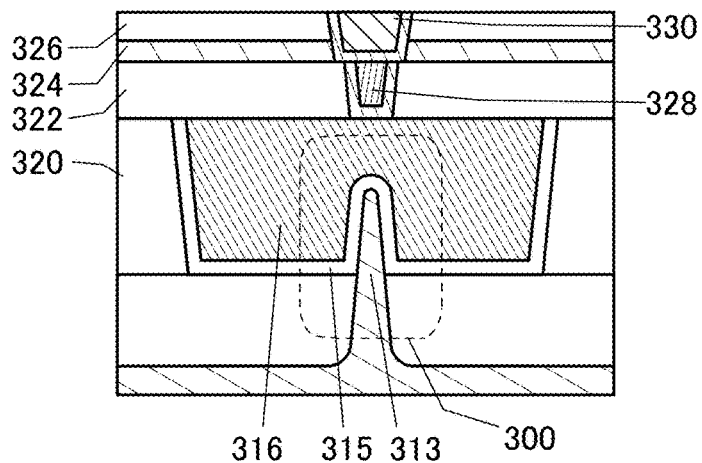

This embodiment describes structure examples of the semiconductor device described in the above embodiments and structure examples of transistors that can be used in the semiconductor device described in the above embodiment.
<Structure Example 1 of Semiconductor Device>
FIG. 6 illustrates the semiconductor device described in the above embodiment as an example, and the semiconductor device includes a transistor 300, a transistor 500, and a capacitor 600. FIG. 7A is a cross-sectional view of the transistor 500 in the channel length direction, FIG. 7B is a cross-sectional view of the transistor 500 in the channel width direction, and FIG. 7C is a cross-sectional view of the transistor 300 in the channel width direction.

The transistor 500 is a transistor containing a metal oxide in a channel formation region (an OS transistor). The transistor 500 has features that the off-state current is low and that the field-effect mobility hardly changes even at high temperatures. When the transistor 500 is applied to a semiconductor device, for example, the transistor M1 or the like included in the memory cell MC illustrated in FIG. 2A or the like, the semiconductor device can have operation capability less likely to be degraded even at high temperatures.

The transistor 500 is provided above the transistor 300, for example, and the capacitor 600 is provided above the transistor 300 and the transistor 500, for example. Note that the capacitor 600 can be the capacitor FEC or the like illustrated in FIG. 2A or the like described in the above embodiment.

The transistor 300 is provided on a substrate 310 and includes an element isolation layer 312, a conductor 316, an insulator 315, a semiconductor region 313 that is part of the substrate 310, and a low-resistance region 314a and a low-resistance region 314b functioning as a source region and a drain region. Note that the transistor 300 can be used as the transistor M2 or the like illustrated in FIG. 2A or the like, described in the above embodiment, for example.

A semiconductor substrate (e.g., a single crystal substrate or a silicon substrate) is preferably used as the substrate 310.

As illustrated in FIG. 7C, in the transistor 300, a top surface and a side surface in the channel width direction of the semiconductor region 313 are covered with the conductor 316 with the insulator 315 therebetween. Such a Fin-type transistor 300 can have an increased effective channel width, and thus the transistor 300 can have improved on-state characteristics. In addition, since contribution of an electric field of a gate electrode can be increased, the off-state characteristics of the transistor 300 can be improved.

Note that the transistor 300 may be either a p-channel transistor or an n-channel transistor.

A region of the semiconductor region 313 where a channel is formed, a region in the vicinity thereof, the low-resistance region 314a and the low-resistance region 314b functioning as a source region and a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), GaN (gallium nitride), or the like. A structure may be employed in which silicon whose effective mass is controlled by applying stress to the crystal lattice and changing the lattice spacing is used. Alternatively, the transistor 300 may be an HEMT (High Electron Mobility Transistor) with GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

The element isolation layer 312 is provided to separate a plurality of transistors on the substrate 310 from each other. The element isolation layer can be formed by, for example, a LOCOS (LOCal Oxidation of Silicon) method, an STI (Shallow Trench Isolation) method, a mesa isolation method, or the like.

Figure 8:
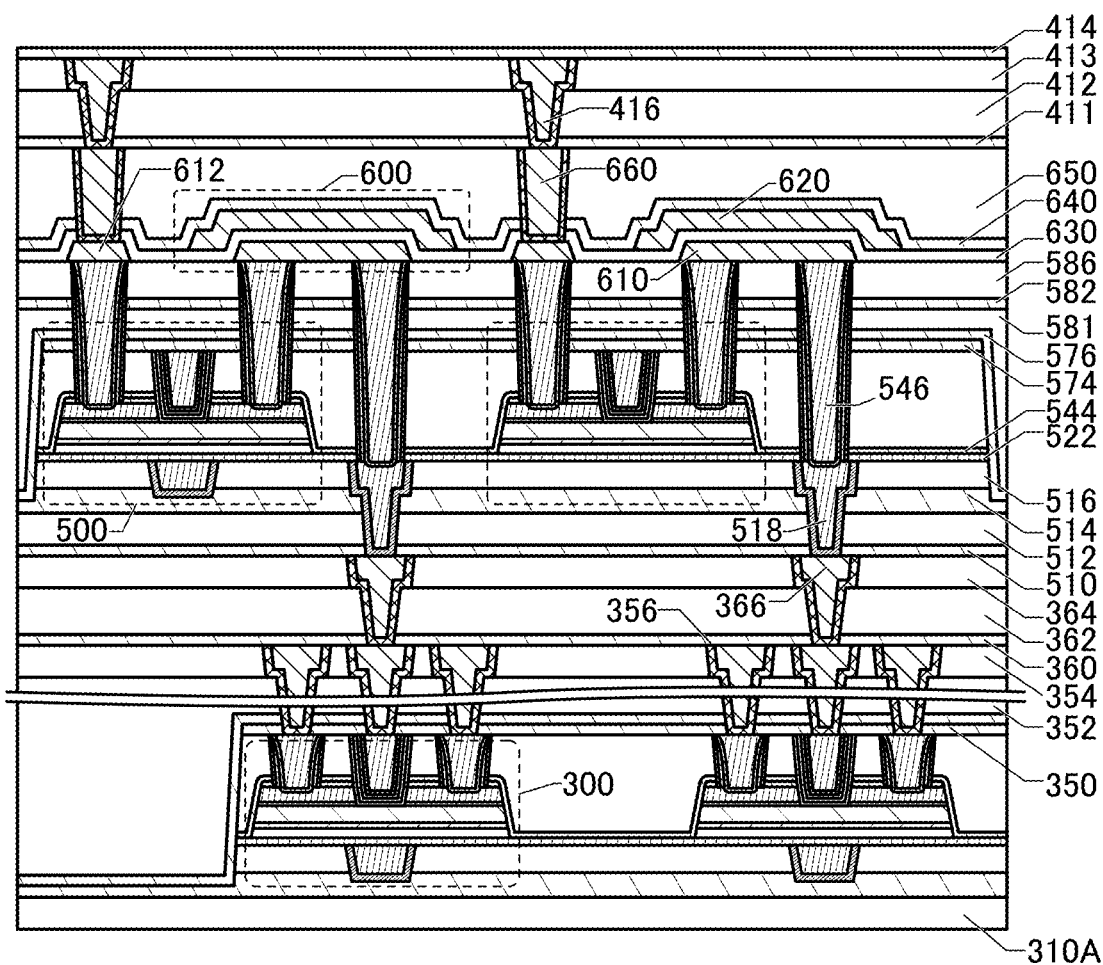
FIG. 8 is a schematic cross-sectional view illustrating a structure example of a semiconductor device.

Note that the transistor 300 shown in FIG. 6 is an example and the structure is not limited thereto; an appropriate transistor is used in accordance with a circuit configuration, a driving method, or the like. For example, the transistor 300 may have a planar structure instead of a FIN-type structure illustrated in FIG. 7C. For example, when a semiconductor device is configured as a single-polarity circuit using only OS transistors, the transistor 300 can have a structure similar to that of the transistor 500 using an oxide semiconductor, as illustrated in FIG. 8. Note that the details of the transistor 500 will be described later. In this specification and the like, a single-polarity circuit refers to a circuit including only either n-channel transistors or p-channel transistors.

Note that in FIG. 8, the transistor 300 is provided over a substrate 310A; in this case, a semiconductor substrate may be used as the substrate 310A as in the case of the substrate 310 in the semiconductor device in FIG. 6. As the substrate 310A, for example, an SOI substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used. Examples of the glass substrate include barium borosilicate glass, aluminoborosilicate glass, and soda lime glass. As examples of the flexible substrate, the attachment film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as an acrylic resin. Other examples are polypropylene, polyester, polyvinyl fluoride, and polyvinyl chloride. Other examples are polyamide, polyimide, an aramid resin, an epoxy resin, an inorganic vapor deposition film, paper, and the like.

In the transistor 300 in FIG. 6, an insulator 320, an insulator 322, an insulator 324, and an insulator 326 are stacked in this order over the substrate 310.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that has a higher oxygen content than a nitrogen content, and silicon nitride oxide refers to a material that has a higher nitrogen content than an oxygen content. Moreover, in this specification, aluminum oxynitride refers to a material that has a higher oxygen content than a nitrogen content, and aluminum nitride oxide refers to a material that has a higher nitrogen content than an oxygen content.

The insulator 322 may have a function of a planarization film for planarizing a level difference caused by the transistor 300 or the like covered with the insulator 320 and the insulator 322. For example, the top surface of the insulator 322 may be planarized by planarization treatment using a chemical mechanical polishing (CMP) method or the like to improve planarity.

As the insulator 324, it is preferable to use a film having a barrier property that prevents diffusion of hydrogen, impurities, or the like from the substrate 310, the transistor 300, or the like into a region where the transistor 500 is provided.

For the film having a barrier property against hydrogen, silicon nitride deposited by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for an interlayer film, parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. A plurality of conductors having a function of a plug or a wiring are collectively denoted by the same reference numeral in some cases. Moreover, in this specification and the like, a wiring and a plug connected to the wiring may be a single component. That is, part of a conductor functions as a wiring in some cases and part of a conductor functions as a plug in other cases.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 6, an insulator 350, an insulator 352, and an insulator 354 are provided to be stacked in this order above the insulator 326 and the conductor 330. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

For example, like the insulator 324, the insulator 350 is preferably formed using an insulator having a barrier property against impurities such as hydrogen and water. The insulator 352 and the insulator 354 are preferably formed using an insulator having a relatively low dielectric constant to reduce the parasitic capacitance generated between wirings, like the insulator 326. Furthermore, the conductor 356 preferably contains a conductor having a barrier property against impurities such as hydrogen and water. In particular, the conductor having a barrier property against hydrogen is formed in an opening portion of the insulator 350 having a barrier property against hydrogen. With this structure, the transistor 300 and the transistor 500 can be separated by the barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

An insulator 360, an insulator 362, and an insulator 364 are stacked in this order over the insulator 354 and the conductor 356.

Like the insulator 324 or the like, the insulator 360 is preferably formed using an insulator having a barrier property against impurities such as water and hydrogen. Thus, the insulator 360 can be formed using any of the materials usable for the insulator 324 or the like, for example.

The insulator 362 and the insulator 364 have functions of an interlayer insulating film and a planarization film. Like the insulator 324, the insulator 362 and the insulator 364 are preferably formed using an insulator having a barrier property against impurities such as water and hydrogen. Thus, the insulator 362 and/or the insulator 364 can be formed using any of the materials usable for the insulator 324.

An opening portion is provided in regions of the insulator 360, the insulator 362, and the insulator 364 that overlap with part of the conductor 356, and the conductor 366 is provided to fill the opening portion. The conductor 366 is also formed over the insulator 362. The conductor 366 has a function of a plug or a wiring connected to the transistor 300, for example. Note that the conductor 366 can be provided using a material similar to those for the conductor 328 and the conductor 330.

An insulator 510, an insulator 512, an insulator 514, and an insulator 516 are stacked in this order over the insulator 364 and the conductor 366. A substance with a barrier property against oxygen or hydrogen is preferably used for any of the insulator 510, the insulator 512, the insulator 514, and the insulator 516.

For example, as the insulator 510 and the insulator 514, it is preferable to use a film having a barrier property that prevents diffusion of hydrogen or impurities from the substrate 310, a region where the transistor 300 is provided, or the like into the region where the transistor 500 is provided. Thus, a material similar to that for the insulator 324 can be used.

For the film having a barrier property against hydrogen, silicon nitride deposited by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors of change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for a protective film of the transistor 500.

For the insulator 512 and the insulator 516, a material similar to that for the insulator 320 can be used, for example. Furthermore, when a material with a relatively low permittivity is used for these insulators, parasitic capacitance generated between wirings can be reduced. A silicon oxide film, a silicon oxynitride film, or the like can be used for the insulator 512 or the insulator 516, for example.

Furthermore, a conductor 518, a conductor included in the transistor 500 (e.g., a conductor 503 illustrated in FIG. 7A and FIG. 7B), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by the layer having a barrier property against oxygen, hydrogen, and water; hence, diffusion of hydrogen from the transistor 300 into the transistor 500 can be inhibited.

The transistor 500 is provided above the insulator 516.

As illustrated in FIG. 7A and FIG. 7B, the transistor 500 includes the insulator 516 over the insulator 514, the conductor 503 (a conductor 503a and a conductor 503b) positioned to be embedded in the insulator 514 or the insulator 516, an insulator 522 over the insulator 516 and the conductor 503, an insulator 524 over the insulator 522, an oxide 530a over the insulator 524, an oxide 530b over the oxide 530a, a conductor 542a over the oxide 530b, an insulator 571a over the conductor 542a, a conductor 542b over the oxide 530b, an insulator 571b over the conductor 542b, an insulator 552 over the oxide 530b, an insulator 550 over the insulator 552, an insulator 554 over the insulator 550, a conductor 560 (a conductor 560a and a conductor 560b) that is positioned over the insulator 554 and overlaps with part of the oxide 530b, and an insulator 544 positioned over the insulator 522, the insulator 524, the oxide 530a, the oxide 530b, the conductor 542a, the conductor 542b, the insulator 571a, and insulator 571b. Here, as illustrated in FIG. 7A and FIG. 7B, the insulator 552 is in contact with the top surface of the insulator 522, the side surface of the insulator 524, the side surface of the oxide 530a, the side surface and the top surface of the oxide 530b, the side surface of the conductor 542, the side surface of the insulator 571, the side surface of the insulator 544, the side surface of an insulator 580, and the bottom surface of the insulator 550. A top surface of the conductor 560 is placed to be substantially level with an upper portion of the insulator 554, an upper portion of the insulator 550, an upper portion of the insulator 552, and a top surface of the insulator 580. An insulator 574 is in contact with part of at least one of the top surface of the conductor 560, the upper portion of the insulator 552, the upper portion of the insulator 550, the upper portion of the insulator 554, and the top surface of the insulator 580. Note that in this specification and the like, the conductor 542a and the conductor 542b are collectively referred to as a conductor 542, and the insulators 571a and 571b are collectively referred to as an insulator 571. The same expression applies to other components in some cases.

An opening reaching the oxide 530b is provided in the insulator 580 and the insulator 544. The insulator 552, the insulator 550, the insulator 554, and the conductor 560 are provided in the opening. The conductor 560, the insulator 552, the insulator 550, and the insulator 554 are provided between the conductor 542a and the conductor 542b and between the insulator 571a and the insulator 571b in the channel length direction of the transistor 500. The insulator 554 includes a region in contact with a side surface of the conductor 560 and a region in contact with a bottom surface of the conductor 560.

The oxide 530 preferably includes the oxide 530a provided over the insulator 524 and the oxide 530b provided over the oxide 530a. Including the oxide 530a under the oxide 530b makes it possible to inhibit diffusion of impurities into the oxide 530b from components formed below the oxide 530a.

Although a structure in which two layers, the oxide 530a and the oxide 530b, are stacked as the oxide 530 in the transistor 500 is described, the present invention is not limited thereto. For example, the transistor 500 can include a single-layer structure of the oxide 530b or a stacked-layer structure of three or more layers. Alternatively, the oxide 530a and the oxide 530b can each have a stacked-layer structure.

The conductor 560 functions as a first gate (also referred to as a top gate) electrode, and the conductor 503 functions as a second gate (also referred to as a back gate) electrode. The insulator 552, the insulator 550, and the insulator 554 function as a first gate insulator, and the insulator 522 and the insulator 524 function as a second gate insulator. Note that the gate insulator is also referred to as a gate insulating layer or a gate insulating film in some cases. The conductor 542a functions as one of a source and a drain, and the conductor 542b functions as the other of the source and the drain. At least part of a region of the oxide 530 that overlaps with the conductor 560 functions as a channel formation region.

Figure 9A:
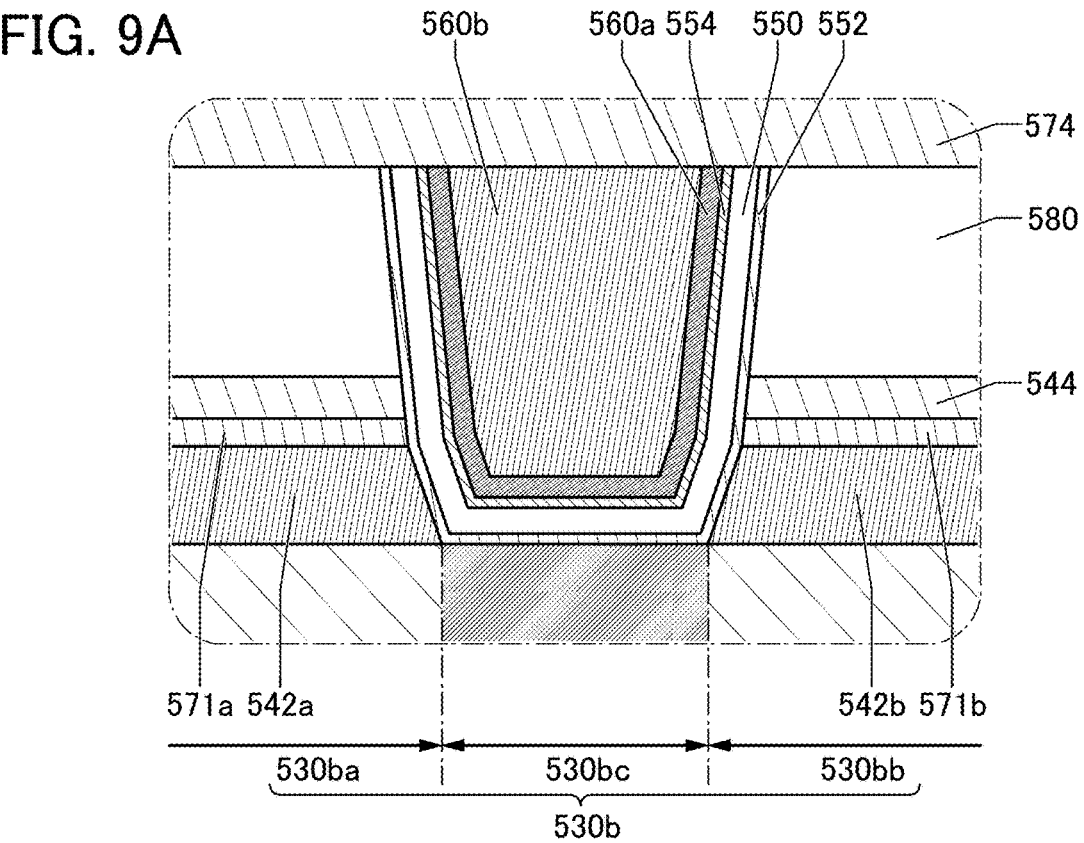
FIG. 9A and FIG. 9B are schematic cross-sectional views each illustrating a structure example of a transistor.

Here, FIG. 9A is an enlarged view of the vicinity of the channel formation region in FIG. 7A. Supply of oxygen to the oxide 530b forms the channel formation region in a region between the conductor 542a and the conductor 542b. As illustrated in FIG. 9A, the oxide 530b includes a region 530bc functioning as the channel formation region of the transistor 500 and a region 530ba and a region 530bb that are provided to sandwich the region 530bc and function as a source region and a drain region. At least part of the region 530bc overlaps with the conductor 560. In other words, the region 530bc is provided between the conductor 542a and the conductor 542b. The region 530ba is provided to overlap with the conductor 542a, and the region 530bb is provided to overlap with the conductor 542b.

The region 530bc functioning as the channel formation region has a smaller amount of oxygen vacancies (an oxygen vacancy in a metal oxide is sometimes referred to as $V_O$ in this specification and the like) or a lower impurity concentration than the region 530ba and the region 530bb to be a high-resistance region having a low carrier concentration. Thus, the region 530bc can be regarded as being i-type (intrinsic) or substantially i-type.

A transistor using a metal oxide is likely to change its electrical characteristics when impurities or oxygen vacancies ($V_O$) exist in a region of the metal oxide where a channel is formed, which might degrade the reliability. In some cases, hydrogen in the vicinity of an oxygen vacancy ($V_O$) forms a defect that is an oxygen vacancy ($V_O$) into which hydrogen enters (hereinafter sometimes referred to as $V_OH$), which generates an electron serving as a carrier. Therefore, when the region of the oxide semiconductor where a channel is formed includes oxygen vacancies, the transistor tends to have normally-on characteristics (even when no voltage is applied to the gate electrode, the channel exists and current flows through the transistor). Thus, impurities, oxygen vacancies, and $V_OH$ are preferably reduced as much as possible in the region of the oxide semiconductor where a channel is formed.

The region 530ba and the region 530bb functioning as the source region and the drain region are each a low-resistance region with an increased carrier concentration because they include a large amount of oxygen vacancies ($V_O$) or have a high concentration of an impurity such as hydrogen, nitrogen, or a metal element. In other words, the region 530ba and the region 530bb are each an n-type region having a higher carrier concentration and a lower resistance than the region 530bc.

The carrier concentration in the region 530bc functioning as the channel formation region is preferably lower than or equal to $1 \times 10^{18}$ cm$^{-3}$, further preferably lower than $1 \times 10^{17}$ cm$^{-3}$, still further preferably lower than $1 \times 10^{16}$ cm$^{-3}$, yet further preferably lower than $1 \times 10^{13}$ cm$^{-3}$, yet still further preferably lower than $1 \times 10^{12}$ cm$^{-3}$. Note that the lower limit of the carrier concentration in the region 530bc functioning as the channel formation region is not particularly limited and can be, for example, $1 \times 10^{-9}$ cm$^{-3}$.

Between the region 530bc and the region 530ba or the region 530bb, a region having a carrier concentration that is lower than or substantially equal to the carrier concentrations in the region 530ba and the region 530bb and higher than or substantially equal to the carrier concentration in the region 530bc may be formed. That is, the region functions as a junction region between the region 530bc and the region 530ba or the region 530bb. The hydrogen concentration in the junction region is lower than or substantially equal to the hydrogen concentrations in the region 530ba and the region 530bb and higher than or substantially equal to the hydrogen concentration in the region 530bc in some cases. The amount of oxygen vacancies in the junction region is smaller than or substantially equal to the amounts of oxygen vacancies in the region 530ba and the region 530bb and larger than or substantially equal to the amount of oxygen vacancies in the region 530bc in some cases.

Although FIG. 9A illustrates an example in which the region 530ba, the region 530bb, and the region 530bc are formed in the oxide 530b, the present invention is not limited thereto. For example, the above regions may be formed not only in the oxide 530b but also in the oxide 530a.

In the oxide 530, the boundaries between the regions are difficult to detect clearly in some cases. The concentrations of a metal element and impurity elements such as hydrogen and nitrogen, which are detected in each region, may be gradually changed not only between the regions but also in each region. That is, the region closer to the channel formation region preferably has a lower concentration of a metal element and impurity elements such as hydrogen and nitrogen.

In the transistor 500, a metal oxide functioning as a semiconductor (such a metal oxide is hereinafter also referred to as an oxide semiconductor) is preferably used for the oxide 530 (the oxide 530a and the oxide 530b) including the channel formation region.

The metal oxide functioning as a semiconductor preferably has a band gap of 2 eV or more, further preferably 2.5 eV or more. With use of such a metal oxide having a large band gap, the off-state current of the transistor can be reduced.

For example, as the oxide 530, metal oxide such as an In-M-Zn oxide containing indium, an element M, and zinc is used; the element M is one or more selected from aluminum, gallium, yttrium, tin, copper, vanadium, beryllium, boron, titanium, iron, nickel, germanium, zirconium, molybdenum, lanthanum, cerium, neodymium, hafnium, tantalum, tungsten, magnesium, and the like. Alternatively, an In—Ga oxide, an In—Zn oxide, or an indium oxide may be used as the oxide 530.

Here, the atomic ratio of In to the element M in the metal oxide used as the oxide 530b is preferably greater than the atomic ratio of In to the element M in the metal oxide used as the oxide 530a.

The oxide 530a is provided under the oxide 530b in the above manner, whereby impurities and oxygen can be inhibited from diffusing into the oxide 530b from components formed below the oxide 530a.

When the oxide 530a and the oxide 530b contain a common element (as the main component) besides oxygen, the density of defect states at an interface between the oxide 530a and the oxide 530b can be made low. Since the density of defect states at the interface between the oxide 530a and the oxide 530b can be made low, the influence of interface scattering on carrier conduction is small, and a high on-state current can be obtained.

The oxide 530b preferably has crystallinity. It is particularly preferable to use a CAAC-OS (c-axis aligned crystalline oxide semiconductor) as the oxide 530b.

The CAAC-OS is a metal oxide having a dense structure with high crystallinity and small amounts of impurities and defects (e.g., oxygen vacancies ($V_O$)). In particular, after the formation of a metal oxide, heat treatment is performed at a temperature at which the metal oxide does not become a polycrystal (e.g., higher than or equal to 400° C. and lower than or equal to 600° C.), whereby a CAAC-OS having a dense structure with higher crystallinity can be obtained. When the density of the CAAC-OS is increased in such a manner, diffusion of impurities or oxygen in the CAAC-OS can be further reduced.

On the other hand, a clear crystal grain boundary is difficult to observe in the CAAC-OS; thus, it can be said that a reduction in electron mobility due to the crystal grain boundary is less likely to occur. Hence, a metal oxide including a CAAC-OS is physically stable. Therefore, the metal oxide including a CAAC-OS is resistant to heat and has high reliability.

If impurities and oxygen vacancies exist in a region of an oxide semiconductor where a channel is formed, a transistor using the oxide semiconductor might have variable electrical characteristics and poor reliability. In some cases, hydrogen in the vicinity of an oxygen vacancy forms a defect that is the oxygen vacancy into which hydrogen enters (hereinafter sometimes referred to as $V_OH$), which generates an electron serving as a carrier. Therefore, when the region of the oxide semiconductor where a channel is formed includes oxygen vacancies, the transistor tends to have normally-on characteristics (even when no voltage is applied to the gate electrode, the channel exists and current flows through the transistor). Thus, impurities, oxygen vacancies, and $V_OH$ are preferably reduced as much as possible in the region of the oxide semiconductor where a channel is formed. In other words, it is preferable that the region of the oxide semiconductor where a channel is formed have a reduced carrier concentration and be of an i-type (intrinsic) or substantially i-type.

As a countermeasure to the above, an insulator containing oxygen that is released by heating (hereinafter, sometimes referred to as excess oxygen) is provided in the vicinity of the oxide semiconductor and heat treatment is performed, so that oxygen can be supplied from the insulator to the oxide semiconductor to reduce oxygen vacancies and $V_OH$. However, supply of an excess amount of oxygen to the source region or the drain region might cause a decrease in the on-state current or field-effect mobility of the transistor 500. Furthermore, a variation of oxygen supplied to the source region or the drain region in the substrate plane leads to a variation in characteristics of the semiconductor device including the transistor.

Therefore, the region 530bc functioning as the channel formation region in the oxide semiconductor is preferably an i-type or substantially i-type region with a reduced carrier concentration, whereas the region 530ba and the region 530bb functioning as the source region and the drain region are preferably n-type regions with high carrier concentrations. That is, it is preferable that oxygen vacancies and $V_OH$ in the region 530bc of the oxide semiconductor be reduced and the region 530ba and the region 530bb not be supplied with an excess amount of oxygen.

Thus, in this embodiment, microwave treatment is performed in an oxygen-containing atmosphere in a state where the conductor 542a and the conductor 542b are provided over the oxide 530b so that oxygen vacancies and $V_OH$ in the region 530bc can be reduced. Here, the microwave treatment refers to, for example, treatment using an apparatus including a power source that generates high-density plasma with use of a microwave.

The microwave treatment in an oxygen-containing atmosphere converts an oxygen gas into plasma using a high-frequency wave such as a microwave or RF and activates the oxygen plasma. At this time, the region 530bc can also be irradiated with the high-frequency wave such as a microwave or RF. By the effect of the plasma, a microwave, or the like, $V_OH$ in the region 530bc can be cut; thus, hydrogen H can be removed from the region 530bc and an oxygen vacancy $V_O$ can be filled with oxygen. That is, the reaction "$V_OH \rightarrow H + V_O$" occurs in the region 530bc, so that the hydrogen concentration in the region 530bc can be reduced. As a result, oxygen vacancies and $V_OH$ in the region 530bc can be reduced to lower the carrier concentration.

In the microwave treatment in an oxygen-containing atmosphere, the high-frequency wave such as the microwave or RF, the oxygen plasma, or the like is blocked by the conductor 542a and the conductor 542b and does not affect the region 530ba nor the region 530bb. In addition, the effect of the oxygen plasma can be reduced by the insulator 571 and the insulator 580 that are provided to cover the oxide 530b and the conductor 542. Hence, a reduction in $V_OH$ and supply of an excess amount of oxygen do not occur in the region 530*ba* and the region 530*bb* in the microwave treatment, which can prevent a decrease in carrier concentration.

Microwave treatment is preferably performed in an oxygen-containing atmosphere after formation of an insulating film to be the insulator 552 or after formation of an insulating film to be the insulator 550. By performing the microwave treatment in an oxygen-containing atmosphere through the insulator 552 or the insulator 550 in such a manner, oxygen can be efficiently supplied into the region 530*bc*. In addition, the insulator 552 is provided to be in contact with the side surface of the conductor 542 and a surface of the region 530*bc*, thereby preventing oxygen more than necessary from being supplied to the region 530*bc* and preventing the side surface of the conductor 542 from being oxidized. Furthermore, the side surface of the conductor 542 can be inhibited from being oxidized when an insulating film to be the insulator 550 is formed.

The oxygen supplied into the region 530*bc* has any of a variety of forms such as an oxygen atom, an oxygen molecule, and an oxygen radical (an O radical, an atom or a molecule having an unpaired electron, or an ion). Note that the oxygen supplied into the region 530*bc* preferably has any one or more of the above forms, and is particularly preferably an oxygen radical. Furthermore, the film quality of the insulator 552 and the insulator 550 can be improved, leading to higher reliability of the transistor 500.

In the above manner, oxygen vacancies and $V_O H$ can be selectively removed from the region 530*bc* in the oxide semiconductor, whereby the region 530*bc* can be an i-type or substantially i-type region. Furthermore, supply of an excess amount of oxygen to the region 530*ba* and the region 530*bb* functioning as the source region and the drain region can be inhibited and the n-type electrical conductivity can be maintained. As a result, a change in the electrical characteristics of the transistor 500 can be inhibited, and thus a variation in the electrical characteristics of the transistors 500 in the substrate plane can be reduced.

With the above structure, a semiconductor device with a small variation in transistor characteristics can be provided. A semiconductor device with favorable reliability can also be provided. A semiconductor device having favorable electrical characteristics can be provided.

As illustrated in FIG. 7B, a curved surface may be provided between the side surface of the oxide 530*b* and the top surface of the oxide 530*b* in a cross-sectional view of the transistor 500 in the channel width direction. In other words, an end portion of the side surface and an end portion of the top surface may be curved (hereinafter referred to as rounded).

The radius of curvature of the curved surface is preferably greater than 0 nm and less than the thickness of the oxide 530*b* in a region overlapping with the conductor 542, or less than half of the length of a region that does not have the curved surface. Specifically, the radius of curvature of the curved surface is greater than 0 nm and less than or equal to 20 nm, preferably greater than or equal to 1 nm and less than or equal to 15 nm, and further preferably greater than or equal to 2 nm and less than or equal to 10 nm. Such a shape can improve the coverage of the oxide 530*b* with the insulator 552, the insulator 550, the insulator 554, and the conductor 560.

The oxide 530 preferably has a stacked-layer structure of a plurality of oxide layers with different chemical compositions. Specifically, the atomic ratio of the element M to a metal element that is a main component of the metal oxide used as the oxide 530*a* is preferably greater than the atomic ratio of the element M to a metal element that is a main component of the metal oxide used as the oxide 530*b*. In addition, the atomic ratio of the element M to In in the metal oxide used as the oxide 530*a* is preferably higher than the atomic ratio of the element M to In in the metal oxide used as the oxide 530*b*. Furthermore, the atomic ratio of In to the element M in the metal oxide used as the oxide 530*b* is preferably higher than the atomic ratio of In to the element M in the metal oxide used as the oxide 530*a*.

The oxide 530*b* is preferably an oxide having crystallinity, such as a CAAC-OS. An oxide having crystallinity, such as a CAAC-OS, has a dense structure with small amounts of impurities and defects (e.g., oxygen vacancies) and high crystallinity. This can inhibit oxygen extraction from the oxide 530*b* by the source electrode or the drain electrode. This can reduce oxygen extraction from the oxide 530*b* even when heat treatment is performed; thus, the transistor 500 is stable with respect to high temperatures in a manufacturing process (what is called thermal budget).

Here, the conduction band minimum gradually changes at a junction portion of the oxide 530*a* and the oxide 530*b*. In other words, the conduction band minimum at the junction portion of the oxide 530*a* and the oxide 530*b* continuously changes or is continuously connected. To achieve this, the density of defect states in a mixed layer formed at the interface between the oxide 530*a* and the oxide 530*b* is preferably made low.

Specifically, when the oxide 530*a* and the oxide 530*b* contain a common element as a main component besides oxygen, a mixed layer with a low density of defect states can be formed. For example, in the case where the oxide 530*b* is an In-M-Zn oxide, an In-M-Zn oxide, an M-Zn oxide, an oxide of the element M, an In—Zn oxide, an indium oxide, or the like may be used as the oxide 530*a*.

Specifically, as the oxide 530*a*, a metal oxide with a composition of In:M:Zn=1:3:4 [atomic ratio] or in the neighborhood thereof, or a composition of In:M:Zn=1:1:0.5 [atomic ratio] or in the neighborhood thereof is used. As the oxide 530*b*, a metal oxide with a composition of In:M:Zn=1: 1:1 [atomic ratio] or in the neighborhood thereof, or a composition of In:M:Zn=4:2:3 [atomic ratio] or in the neighborhood thereof is used. Note that a composition in the neighborhood includes the range of ±30% of an intended atomic ratio. Gallium is preferably used as the element M.

When the metal oxide is deposited by a sputtering method, the above atomic ratio is not limited to the atomic ratio of the deposited metal oxide and may be the atomic ratio of a sputtering target used for depositing the metal oxide.

As illustrated in FIG. 7A or the like, the insulator 552 formed using aluminum oxide or the like is provided in contact with the top and side surfaces of the oxide 530, whereby indium contained in the oxide 530 is unevenly distributed in some cases at the interface between the oxide 530 and the insulator 552 and in its vicinity. Accordingly, the vicinity of the surface of the oxide 530 comes to have an atomic ratio close to that of an indium oxide or that of an In—Zn oxide. Such an increase in the atomic ratio of indium in the vicinity of the surface of the oxide 530, especially the vicinity of the surface of the oxide 530*b*, can increase the field-effect mobility of the transistor 500.

When the oxide 530*a* and the oxide 530*b* have the above structure, the density of defect states at the interface between the oxide 530*a* and the oxide 530*b* can be made low. Thus, the influence of interface scattering on carrier conduction is small, and the transistor 500 can have a high on-state current and excellent frequency characteristics.

At least one of the insulator 512, the insulator 514, the insulator 544, the insulator 571, the insulator 574, an insulator 576, and an insulator 581 preferably functions as a barrier insulating film, which inhibits diffusion of impurities such as water and hydrogen from the substrate side or above the transistor 500 into the transistor 500. Thus, for at least one of the insulator 512, the insulator 514, the insulator 544, the insulator 571, the insulator 574, the insulator 576, and the insulator 581, it is preferable to use an insulating material having a function of inhibiting diffusion of impurities such as hydrogen atoms, hydrogen molecules, water molecules, nitrogen atoms, nitrogen molecules, nitrogen oxide molecules (e.g., $N_2O$, NO, or $NO_2$), or copper atoms (an insulating material through which the impurities are less likely to pass). Alternatively, it is preferable to use an insulating material having a function of inhibiting diffusion of oxygen (e.g., at least one of an oxygen atom, an oxygen molecule, and the like) (through which the oxygen is less likely to pass).

Note that in this specification, a barrier insulating film refers to an insulating film having a barrier property. A barrier property in this specification means a function of inhibiting diffusion of a targeted substance (also referred to as having low permeability). Alternatively, a barrier property means a function of trapping and fixing (or gettering) a targeted substance.

An insulator having a function of inhibiting diffusion of oxygen and impurities such as water and hydrogen is preferably used as the insulator 512, the insulator 514, the insulator 544, the insulator 571, the insulator 574, the insulator 576, and the insulator 581; for example, aluminum oxide, magnesium oxide, hafnium oxide, gallium oxide, indium gallium zinc oxide, silicon nitride, or silicon nitride oxide can be used. For example, silicon nitride, which has a higher hydrogen barrier property, is preferably used for the insulator 512, the insulator 544, and the insulator 576. For example, aluminum oxide or magnesium oxide, which has a function of capturing or fixing hydrogen well, or the like is preferably used for the insulator 514, the insulator 571, the insulator 574, and the insulator 581. In this case, impurities such as water and hydrogen can be inhibited from diffusing to the transistor 500 side from the substrate side through the insulator 512 and the insulator 514. Impurities such as water and hydrogen can be inhibited from diffusing to the transistor 500 side from an interlayer insulating film and the like which are provided outside the insulator 581. Alternatively, oxygen contained in the insulator 524 and the like can be inhibited from diffusing to the substrate side through the insulator 512 and the insulator 514. Alternatively, oxygen contained in the insulator 580 and the like can be inhibited from diffusing to above the transistor 500 through the insulator 574 and the like. In this manner, it is preferable that the transistor 500 be surrounded by the insulator 512, the insulator 514, the insulator 571, the insulator 544, the insulator 574, the insulator 576, and the insulator 581, which have a function of inhibiting diffusion of oxygen and impurities such as water and hydrogen.

Here, an oxide having an amorphous structure is preferably used for the insulator 512, the insulator 514, the insulator 544, the insulator 571, the insulator 574, the insulator 576, and the insulator 581. For example, a metal oxide such as $AlO_x$ (x is a given number greater than 0) or $MgO_y$ (y is a given number greater than 0) is preferably used. In such a metal oxide having an amorphous structure, an oxygen atom has a dangling bond and sometimes has a property of capturing or fixing hydrogen with the dangling bond. When such a metal oxide having an amorphous structure is used as the component of the transistor 500 or provided around the transistor 500, hydrogen contained in the transistor 500 or hydrogen present around the transistor 500 can be captured or fixed. In particular, hydrogen contained in the channel formation region of the transistor 500 is preferably captured or fixed. The metal oxide having an amorphous structure is used as the component of the transistor 500 or provided around the transistor 500, whereby the transistor 500 and a semiconductor device, which have favorable characteristics and high reliability, can be manufactured.

Although each of the insulator 512, the insulator 514, the insulator 544, the insulator 571, the insulator 574, the insulator 576, and the insulator 581 preferably has an amorphous structure, a region having a polycrystalline structure may be partly formed. Alternatively, each of the insulator 512, the insulator 514, the insulator 544, the insulator 571, the insulator 574, the insulator 576, and the insulator 581 may have a multilayer structure in which a layer having an amorphous structure and a layer having a polycrystalline structure are stacked. For example, a stacked-layer structure in which a layer having a polycrystalline structure is formed over a layer having an amorphous structure may be employed.

The insulator 512, the insulator 514, the insulator 544, the insulator 571, the insulator 574, the insulator 576, and the insulator 581 can be deposited by a sputtering method, for example. Since a sputtering method does not need to use a molecule containing hydrogen as a deposition gas, the hydrogen concentrations in the insulator 512, the insulator 514, the insulator 544, the insulator 571, the insulator 574, the insulator 576, and the insulator 581 can be reduced. Note that the deposition method is not limited to a sputtering method, and a chemical vapor deposition (CVD) method, a molecular beam epitaxy (MBE) method, a pulsed laser deposition (PLD) method, an atomic layer deposition (ALD) method, or the like may be used as appropriate.

The resistivities of the insulator 512, the insulator 544, and the insulator 576 are preferably low in some cases. For example, by setting the resistivities of the insulator 512, the insulator 544, and the insulator 576 to approximately $1 \times 10^{13}$ Ωcm, the insulator 512, the insulator 544, and the insulator 576 can sometimes reduce charge up of the conductor 503, the conductor 542, the conductor 560, or the like in treatment using plasma or the like in the manufacturing process of a semiconductor device. The resistivities of the insulator 512, the insulator 544, and the insulator 576 are preferably higher than or equal to $1 \times 10^{10}$ Ωcm and lower than or equal to $1 \times 10^{15}$ Ωcm.

The insulator 516, the insulator 574, the insulator 580, and the insulator 581 each preferably have a lower permittivity than the insulator 514. When a material with a low permittivity is used for an interlayer film, parasitic capacitance generated between wirings can be reduced. For the insulator 516, the insulator 580, and the insulator 581, silicon oxide, silicon oxynitride, silicon oxide to which fluorine is added, silicon oxide to which carbon is added, silicon oxide to which carbon and nitrogen are added, porous silicon oxide, or the like is used as appropriate, for example.

The insulator 581 is preferably an insulator functioning as an interlayer film, a planarization film, or the like, for example.

The conductor 503 is positioned to overlap with the oxide 530 and the conductor 560. Here, the conductor 503 is preferably provided to be embedded in an opening formed in the insulator 516. Part of the conductor 503 is embedded in the insulator 514 in some cases.

The conductor 503 includes the conductor 503a and the conductor 503b. The conductor 503a is provided in contact with a bottom surface and a sidewall of the opening. The conductor 503b is provided to be embedded in a recessed portion formed in the conductor 503a. Here, the upper portion of the conductor 503b is substantially level with the upper portion of the conductor 503a and the upper portion of the insulator 516.

For the conductor 503a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material that has a function of inhibiting the diffusion of oxygen (e.g., at least one of an oxygen atom, an oxygen molecule, and the like).

When the conductor 503a is formed using a conductive material having a function of inhibiting diffusion of hydrogen, impurities such as hydrogen contained in the conductor 503b can be prevented from diffusing into the oxide 530 through the insulator 524 and the like. When the conductor 503a is formed using a conductive material having a function of inhibiting diffusion of oxygen, the conductivity of the conductor 503b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, a single layer or a stacked layer of the above conductive material is used as the conductor 503a. For example, titanium nitride is used for the conductor 503a.

Moreover, the conductor 503b is preferably formed using a conductive material containing tungsten, copper, or aluminum as its main component. For example, tungsten is used for the conductor 503b.

The conductor 503 sometimes functions as a second gate electrode. In that case, by changing a potential applied to the conductor 503 not in conjunction with but independently of a potential applied to the conductor 560, the threshold voltage ($V_{th}$) of the transistor 500 can be controlled. In particular, $V_{th}$ of the transistor 500 can be higher in the case where a negative potential is applied to the conductor 503, and the off-state current can be reduced. Thus, drain current at the time when a potential applied to the conductor 560 is 0 V can be lower in the case where a negative potential is applied to the conductor 503 than in the case where a negative potential is not applied to the conductor 503.

The electric resistivity of the conductor 503 is designed in consideration of the potential applied to the conductor 503, and the thickness of the conductor 503 is determined in accordance with the electric resistivity. The thickness of the insulator 516 is substantially equal to that of the conductor 503. The conductor 503 and the insulator 516 are preferably as thin as possible in the allowable range of the design of the conductor 503. When the thickness of the insulator 516 is reduced, the absolute amount of impurities such as hydrogen contained in the insulator 516 can be reduced, reducing the amount of the impurities to be diffused into the oxide 530.

When seen from above, the conductor 503 is preferably provided to be larger than a region of the oxide 530 that does not overlap with the conductor 542a or the conductor 542b. As illustrated in FIG. 7B, it is particularly preferable that the conductor 503 extend to a region outside end portions of the oxide 530a and the oxide 530b in the channel width direction. That is, the conductor 503 and the conductor 560 preferably overlap with each other with the insulators therebetween on the outer side of the side surface of the oxide 530 in the channel width direction. With this structure, the channel formation region of the oxide 530 can be electrically surrounded by the electric field of the conductor 560 functioning as a first gate electrode and the electric field of the conductor 503 functioning as the second gate electrode. In this specification and the like, a transistor structure in which a channel formation region is electrically surrounded by electric fields of a first gate and a second gate is referred to as a surrounded channel (S-channel) structure.

In this specification and the like, a transistor having the S-channel structure refers to a transistor having a structure in which a channel formation region is electrically surrounded by the electric fields of a pair of gate electrodes. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

As illustrated in FIG. 7B, the conductor 503 is extended to function as a wiring as well. However, without limitation to this structure, a structure in which a conductor functioning as a wiring is provided below the conductor 503 may be employed. In addition, the conductor 503 is not necessarily provided in each transistor. For example, the conductor 503 may be shared by a plurality of transistors.

Although the transistor 500 having a structure in which the conductor 503 is a stack of the conductor 503a and the conductor 503b is illustrated, the present invention is not limited thereto. For example, the conductor 503 may be provided as a single layer or to have a stacked-layer structure of three or more layers.

The insulator 522 and the insulator 524 function as a gate insulator.

It is preferable that the insulator 522 have a function of inhibiting diffusion of hydrogen (e.g., at least one of a hydrogen atom, a hydrogen molecule, and the like). In addition, it is preferable that the insulator 522 have a function of inhibiting diffusion of oxygen (e.g., at least one of an oxygen atom, an oxygen molecule, and the like). For example, the insulator 522 preferably has a function of inhibiting diffusion of one or both of hydrogen and oxygen more than the insulator 524.

As the insulator 522, an insulator containing an oxide of one or both of aluminum and hafnium, which is an insulating material, is preferably used. As the insulator, aluminum oxide, hafnium oxide, oxide containing aluminum and hafnium (hafnium aluminate), or the like is preferably used. In the case where the insulator 522 is formed using such a material, the insulator 522 functions as a layer that inhibits release of oxygen from the oxide 530 to the substrate side and diffusion of impurities such as hydrogen from the periphery of the transistor 500 into the oxide 530. Thus, providing the insulator 522 can inhibit diffusion of impurities such as hydrogen into the transistor 500 and inhibit generation of oxygen vacancies in the oxide 530. Furthermore, the conductor 503 can be inhibited from reacting with oxygen contained in the insulator 524 or the oxide 530.

Alternatively, aluminum oxide, bismuth oxide, germanium oxide, niobium oxide, silicon oxide, titanium oxide, tungsten oxide, yttrium oxide, or zirconium oxide may be added to the above insulator, for example. Alternatively, these insulators may be subjected to nitriding treatment. A stack of silicon oxide, silicon oxynitride, or silicon nitride over these insulators may be used for the insulator 522.

For example, a single layer or a stacked layer of an insulator containing what is called a high-k material such as aluminum oxide, hafnium oxide, tantalum oxide, or zirconium oxide may be used for the insulator 522. With further miniaturization and higher integration of a transistor, a problem such as generation of leakage current may arise because of a thinned gate insulator. When a high-k material is used for an insulator functioning as the gate insulator, a gate potential at the time when the transistor operates can be reduced while the physical thickness is maintained. Furthermore, a substance with a high permittivity such as lead zirconate titanate (PZT), strontium titanate ($SrTiO_3$), or $(Ba,Sr)TiO_3$ (BST) may be used for the insulator 522.

Silicon oxide or silicon oxynitride, for example, can be used as appropriate for the insulator 524 that is in contact with the oxide 530.

In a manufacturing process of the transistor 500, heat treatment is preferably performed with the surface of the oxide 530 exposed. For example, the heat treatment is performed at higher than or equal to 100° C. and lower than or equal to 600° C., preferably higher than or equal to 350° C. and lower than or equal to 550° C. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). The heat treatment may be performed under reduced pressure. Alternatively, the heat treatment may be performed in an atmosphere containing an oxidizing gas at 10 ppm or more, 1% or more, or 10% or more in order to compensate for released oxygen, after heat treatment in a nitrogen gas or inert gas atmosphere. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that oxygen adding treatment performed on the oxide 530 can promote a reaction in which oxygen vacancies in the oxide 530 are repaired with supplied oxygen, i.e., a reaction of "$V_O+O \rightarrow null$". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_OH$.

Note that the insulator 522 and the insulator 524 may each have a stacked-layer structure of two or more layers. In that case, without limitation to a stacked-layer structure formed of the same material, a stacked-layer structure formed of different materials may be employed. The insulator 524 may be formed into an island shape so as to overlap with the oxide 530a. In this case, the insulator 544 is in contact with the side surface of the insulator 524 and the top surface of the insulator 522.

The conductor 542a and the conductor 542b are provided in contact with the top surface of the oxide 530b. The conductor 542a and the conductor 542b function as a source electrode and a drain electrode of the transistor 500.

For the conductor 542 (the conductor 542a and the conductor 542b), for example, a nitride containing tantalum, a nitride containing titanium, a nitride containing molybdenum, a nitride containing tungsten, a nitride containing tantalum and aluminum, a nitride containing titanium and aluminum, or the like is preferably used. In one embodiment of the present invention, a nitride containing tantalum is particularly preferable. As another example, ruthenium oxide, ruthenium nitride, an oxide containing strontium and ruthenium, or an oxide containing lanthanum and nickel may be used. These materials are preferable because they are conductive materials that are not easily oxidized or materials that maintain the conductivity even when absorbing oxygen.

Note that hydrogen contained in the oxide 530b or the like diffuses into the conductor 542a or the conductor 542b in some cases. In particular, when a nitride containing tantalum is used for the conductor 542a and the conductor 542b, hydrogen contained in the oxide 530b or the like is likely to diffuse into the conductor 542a or the conductor 542b, and the diffused hydrogen is bonded to nitrogen contained in the conductor 542a or the conductor 542b in some cases. That is, hydrogen contained in the oxide 530b or the like is absorbed by the conductor 542a or the conductor 542b in some cases.

No curved surface is preferably formed between the side surface of the conductor 542 and a top surface of the conductor 542. When no curved surface is formed in the conductor 542, the conductor 542 can have a large cross-sectional area in the channel width direction. Accordingly, the conductivity of the conductor 542 is increased, so that the on-state current of the transistor 500 can be increased.

The insulator 571a is provided in contact with a top surface of the conductor 542a, and the insulator 571b is provided in contact with atop surface of the conductor 542b. The insulator 571 preferably functions as at least a barrier insulating film against oxygen. Thus, the insulator 571 preferably has a function of inhibiting oxygen diffusion. For example, the insulator 571 preferably has a function of inhibiting diffusion of oxygen more than the insulator 580. For example, a nitride containing silicon such as silicon nitride may be used for the insulator 571. The insulator 571 preferably has a function of capturing impurities such as hydrogen. In that case, for the insulator 571, a metal oxide having an amorphous structure, for example, an insulator such as aluminum oxide or magnesium oxide, may be used. It is particularly preferable to use aluminum oxide having an amorphous structure or amorphous aluminum oxide for the insulator 571 because hydrogen can be captured or fixed more effectively in some cases. Accordingly, the transistor 500 and the semiconductor device with favorable characteristics and high reliability can be manufactured.

The insulator 544 is provided to cover the insulator 524, the oxide 530a, the oxide 530b, the conductor 542, and the insulator 571. The insulator 544 preferably has a function of capturing and fixing hydrogen. In that case, the insulator 544 preferably includes silicon nitride, or a metal oxide having an amorphous structure, for example, an insulator such as aluminum oxide or magnesium oxide. Alternatively, for example, a stacked-layer film of aluminum oxide and silicon nitride over the aluminum oxide may be used as the insulator 544.

When the above insulator 571 and the insulator 544 are provided, the conductor 542 can be surrounded by the insulators having a barrier property against oxygen. That is, oxygen contained in the insulator 524 and the insulator 580 can be prevented from diffusing into the conductor 542. As a result, the conductor 542 can be inhibited from being directly oxidized by oxygen contained in the insulator 524 and the insulator 580, so that an increase in resistivity and a reduction in on-state current can be inhibited.

The insulator 552 functions as part of the gate insulator. As the insulator 552, a barrier insulating film against oxygen is preferably used. As the insulator 552, an insulator that can be used as the insulator 574 described above may be used. An insulator containing an oxide of one or both of aluminum and hafnium is preferably deposited as the insulator 552. As the insulator, aluminum oxide, hafnium oxide, an oxide containing aluminum and hafnium (hafnium aluminate), an oxide containing hafnium and silicon (hafnium silicate), or the like can be used. In this embodiment, aluminum oxide is used for the insulator 552. In this case, the insulator 552 is an insulator containing at least oxygen and aluminum.

As illustrated in FIG. 7B, the insulator 552 is provided in contact with the top surface and the side surface of the oxide 530b, the side surface of the oxide 530a, the side surface of the insulator 524, and the top surface of the insulator 522. That is, the regions of the oxide 530a, the oxide 530b, and the insulator 524 that overlap with the conductor 560 are covered with the insulator 552 in the cross section in the channel width direction. With this structure, the insulator 552 having a barrier property against oxygen can prevent release of oxygen from the oxide 530a and the oxide 530b at the time of heat treatment or the like. This can inhibit formation of oxygen vacancies ($V_O$) in the oxide 530a and the oxide 530b. Therefore, oxygen vacancies ($V_O$) and $V_OH$ formed in the region 530bc can be reduced. Thus, the transistor 500 can have favorable electrical characteristics and higher reliability.

Even when an excess amount of oxygen is contained in the insulator 580, the insulator 550, and the like, oxygen can be inhibited from being excessively supplied to the oxide 530a and the oxide 530b. Thus, the region 530ba and the region 530bb are prevented from being excessively oxidized by oxygen through the region 530bc; a reduction in on-state current or field-effect mobility of the transistor 500 can be inhibited.

As illustrated in FIG. 7A, the insulator 552 is provided in contact with the side surfaces of the conductor 542, the insulator 571, the insulator 544, and the insulator 580. This can inhibit formation of an oxide film on the side surface of the conductor 542 by oxidization of the side surface. Accordingly, a reduction in on-state current or field-effect mobility of the transistor 500 can be inhibited.

Furthermore, the insulator 552 needs to be provided in an opening formed in the insulator 580 and the like, together with the insulator 554, the insulator 550, and the conductor 560. The thickness of the insulator 552 is preferably small for miniaturization of the transistor 500. The thickness of the insulator 552 is preferably greater than or equal to 0.1 nm, greater than or equal to 0.5 nm, or greater than or equal to 1.0 nm, and less than or equal to 1.0 nm, less than or equal to 3.0 nm, or less than or equal to 5.0 nm. Note that the above-described lower limits and upper limits can be combined with each other. In that case, at least part of the insulator 552 includes a region having the above-described thickness. The thickness of the insulator 552 is preferably smaller than that of the insulator 550. In that case, at least part of the insulator 552 includes a region having a thickness smaller than that of the insulator 550.

To form the insulator 552 having a small thickness as described above, an ALD method is preferably used for deposition. Examples of an ALD method include a thermal ALD method, in which a precursor and a reactant react with each other only by a thermal energy, and a PEALD (Plasma Enhanced ALD) method, in which a reactant excited by plasma is used. The use of plasma in a PEALD method is sometimes preferable because deposition at a lower temperature is possible.

An ALD method, which enables an atomic layer to be deposited one by one using self-limiting characteristics of atoms, has advantages such as deposition of an extremely thin film, deposition on a component with a high aspect ratio, deposition of a film with a small number of defects such as pinholes, deposition with excellent coverage, and low-temperature deposition. Therefore, the insulator 552 can be formed on the side surface or the like of the opening formed in the insulator 580 and the like to have a small thickness as described above and to have favorable coverage.

Note that some of precursors usable in an ALD method contain carbon or the like. Thus, a film formed by an ALD method may contain impurities such as carbon in a larger amount than a film formed by another deposition method. Note that impurities can be quantified by secondary ion mass spectrometry (SIMS) or X-ray photoelectron spectroscopy (XPS).

The insulator 550 functions as part of the gate insulator. The insulator 550 is preferably provided in contact with a top surface of the insulator 552. For the insulator 550, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like can be used. In particular, silicon oxide and silicon oxynitride are preferable because they are thermally stable. The insulator 550 in this case is an insulator containing at least oxygen and silicon.

As in the insulator 524, the concentration of impurities such as water and hydrogen in the insulator 550 is preferably reduced. The thickness of the insulator 550 is preferably greater than or equal to 1 nm or greater than or equal to 0.5 nm and less than or equal to 15 nm or less than or equal to 20 nm. Note that the above-described lower limits and upper limits can be combined with each other. In that case, at least part of the insulator 550 includes a region having the above-described thickness.

Although FIG. 7A, FIG. 7B, and the like illustrate a single-layer structure of the insulator 550, the present invention is not limited to this structure, and a stacked-layer structure of two or more layers may be employed. For example, as illustrated in FIG. 9B, the insulator 550 may have a stacked-layer structure including two layers of an insulator 550a and an insulator 550b over the insulator 550a.

Figure 9B:
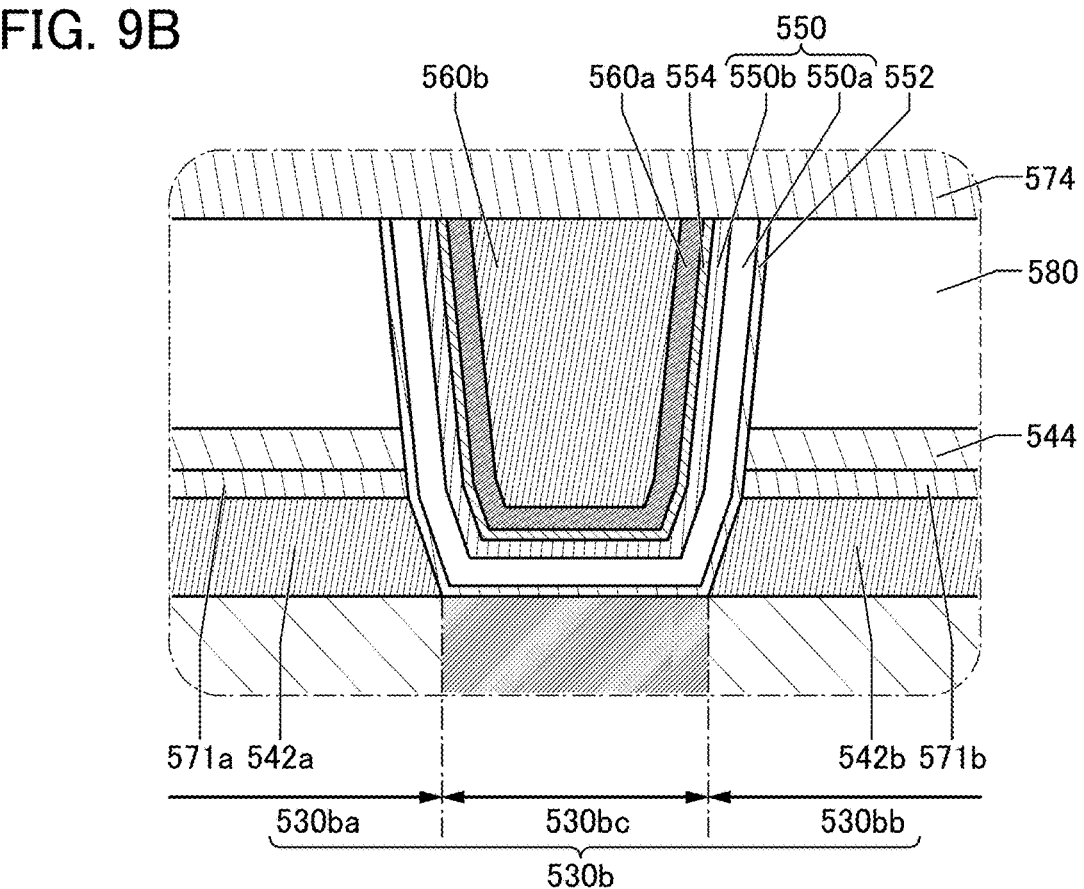

In the case where the insulator 550 has a stacked-layer structure of two layers as illustrated in FIG. 9B, it is preferable that the insulator 550a in a lower layer be formed using an insulator that is likely to transmit oxygen and the insulator 550b in an upper layer be formed using an insulator having a function of inhibiting oxygen diffusion. With such a structure, oxygen contained in the insulator 550a can be inhibited from diffusing into the conductor 560. That is, a reduction in the amount of oxygen supplied to the oxide 530 can be inhibited. In addition, oxidation of the conductor 560 due to oxygen contained in the insulator 550a can be inhibited. For example, it is preferable that the insulator 550a be provided using any of the above-described materials that can be used for the insulator 550 and the insulator 550b be provided using an insulator containing an oxide of one or both of aluminum and hafnium. As the insulator, aluminum oxide, hafnium oxide, an oxide containing aluminum and hafnium (hafnium aluminate), an oxide containing hafnium and silicon (hafnium silicate), or the like can be used. In this embodiment, hafnium oxide is used as the insulator 550b. In this case, the insulator 550b is an insulator containing at least oxygen and hafnium. The thickness of the insulator 550b is preferably greater than or equal to 0.5 nm or greater than or equal to 1.0 nm, and less than or equal to 3.0 nm or less than or equal to 5.0 nm. Note that the above-described lower limits and upper limits can be combined with each other. In that case, at least part of the insulator 550b includes a region having the above-described thickness.

In the case where silicon oxide, silicon oxynitride, or the like is used for the insulator 550a, the insulator 550b may be formed using an insulating material that is a high-k material having a high dielectric constant. The gate insulator having a stacked-layer structure of the insulator 550a and the insulator 550b can be thermally stable and can have a high dielectric constant. Thus, a gate potential that is applied during operation of the transistor can be reduced while the physical thickness of the gate insulator is maintained. In addition, the equivalent oxide thickness (EOT) of the insulator functioning as the gate insulator can be reduced. Therefore, the withstand voltage of the insulator 550 can be increased.

The insulator 554 functions as part of a gate insulator. As the insulator 554, a barrier insulating film against hydrogen is preferably used. This can prevent diffusion of impurities such as hydrogen contained in the conductor 560 into the insulator 550 and the oxide 530b. As the insulator 554, an insulator that can be used as the insulator 576 described above may be used. For example, silicon nitride deposited by a PEALD method may be used as the insulator 554. In this case, the insulator 554 is an insulator containing at least nitrogen and silicon.

Furthermore, the insulator 554 may have a barrier property against oxygen. Thus, diffusion of oxygen contained in the insulator 550 into the conductor 560 can be inhibited.

Furthermore, the insulator 554 needs to be provided in an opening formed in the insulator 580 and the like, together with the insulator 552, the insulator 550, and the conductor 560. The thickness of the insulator 554 is preferably small for miniaturization of the transistor 500. The thickness of the insulator 554 is preferably greater than or equal to 0.1 nm, greater than or equal to 0.5 nm, or greater than or equal to 1.0 nm, and less than or equal to 3.0 nm or less than or equal to 5.0 nm. Note that the above-described lower limits and upper limits can be combined with each other. In that case, at least part of the insulator 554 includes a region having the above-described thickness. The thickness of the insulator 554 is preferably smaller than that of the insulator 550. In that case, at least part of the insulator 554 includes a region having a thickness smaller than that of the insulator 550.

The conductor 560 functions as the first gate electrode of the transistor 500. The conductor 560 preferably includes the conductor 560a and the conductor 560b provided over the conductor 560a. For example, the conductor 560a is preferably provided to cover a bottom surface and a side surface of the conductor 560b. As illustrated in FIGS. 7A and 7B, the top portion of the conductor 560 is substantially level with the top portion of the insulator 550. Note that although the conductor 560 has a two-layer structure of the conductor 560a and the conductor 560b in FIG. 7A and FIG. 7B, the conductor 560 can have, besides the two-layer structure, a single-layer structure or a stacked-layer structure of three or more layers.

For the conductor 560a, a conductive material having a function of inhibiting diffusion of impurities such as a hydrogen atom, a hydrogen molecule, a water molecule, a nitrogen atom, a nitrogen molecule, a nitrogen oxide molecule, and a copper atom is preferably used. Alternatively, it is preferable to use a conductive material that has a function of inhibiting the diffusion of oxygen (e.g., at least one of an oxygen atom, an oxygen molecule, and the like).

In addition, when the conductor 560a has a function of inhibiting diffusion of oxygen, the conductivity of the conductor 560b can be inhibited from being lowered because of oxidation due to oxygen contained in the insulator 550. As the conductive material having a function of inhibiting diffusion of oxygen, for example, titanium, titanium nitride, tantalum, tantalum nitride, ruthenium, or ruthenium oxide is preferably used.

Furthermore, the conductor 560 also functions as a wiring and thus is preferably a conductor having high conductivity. For example, a conductive material containing tungsten, copper, or aluminum as its main component can be used for the conductor 560b. The conductor 560b can have a stacked-layer structure. Specifically, for example, the conductor 560b can have a stacked-layer structure of titanium or titanium nitride and the above conductive material.

In the transistor 500, the conductor 560 is formed in a self-aligned manner to fill the opening formed in the insulator 580 and the like. The formation of the conductor 560 in this manner allows the conductor 560 to be placed properly in a region between the conductor 542a and the conductor 542b without alignment.

As illustrated in FIG. 7B, in the channel width direction of the transistor 500, with the bottom surface of the insulator 522 deemed as a benchmark, the level of the bottom surface of the conductor 560 in a region where the conductor 560 and the oxide 530b do not overlap with each other is preferably lower than the level of the bottom surface of the oxide 530b. When the conductor 560 functioning as the gate electrode covers the side surface and the top surface of the channel formation region of the oxide 530b with the insulator 550 and the like therebetween, the electric field of the conductor 560 can easily act on the entire channel formation region of the oxide 530b. Thus, the on-state current of the transistor 500 can be increased and the frequency characteristics of the transistor 500 can be improved. The difference between the level of the bottom surface of the conductor 560 in a region where the oxide 530a and the oxide 530b do not overlap with the conductor 560 and the level of the bottom surface of the oxide 530b, with the bottom surface of the insulator 522 deemed as a benchmark, is preferably greater than or equal to 0 nm, greater than or equal to 3 nm, or greater than or equal to 5 nm, and less than or equal to 20 nm, less than or equal to 50 nm, or less than or equal to 100 nm. Note that the above-described lower limits and upper limits can be combined with each other.

The insulator 580 is provided over the insulator 544, and the opening is formed in a region where the insulator 550 and the conductor 560 are to be provided. In addition, the top surface of the insulator 580 may be planarized.

The insulator 580 functioning as an interlayer film preferably has a low permittivity. When a material with a low permittivity is used for an interlayer film, parasitic capacitance generated between wirings can be reduced. The insulator 580 is preferably provided using a material similar to that for the insulator 516, for example. In particular, silicon oxide and silicon oxynitride are preferable because they are thermally stable. In particular, materials such as silicon oxide, silicon oxynitride, and porous silicon oxide are preferably used, in which case a region containing oxygen to be released by heating can be easily formed.

The concentration of impurities such as water and hydrogen in the insulator 580 is preferably reduced. An oxide containing silicon, such as silicon oxide or silicon oxynitride, is used as appropriate for the insulator 580, for example.

The insulator 574 preferably functions as a barrier insulating film that inhibits impurities such as water and hydrogen from diffusing into the insulator 580 from above and preferably has a function of capturing impurities such as hydrogen. The insulator 574 preferably functions as a barrier insulating film that inhibits passage of oxygen. For the insulator 574, a metal oxide having an amorphous structure, for example, an insulator such as aluminum oxide, can be used. In this case, the insulator 574 is an insulator containing at least oxygen and aluminum. The insulator 574, which has a function of capturing impurities such as hydrogen, is provided in contact with the insulator 580 in a region sandwiched between the insulator 512 and the insulator 581, whereby impurities such as hydrogen contained in the insulator 580 and the like can be captured and the amount of hydrogen in the region can be constant. It is particularly preferable to use aluminum oxide having an amorphous structure for the insulator 574, in which case hydrogen can sometimes be captured or fixed more effectively. Accordingly, the transistor 500 and the semiconductor device with favorable characteristics and high reliability can be manufactured.

The insulator 576 functions as a barrier insulating film that inhibits impurities such as water and hydrogen from diffusing into the insulator 580 from above. The insulator 576 is provided over the insulator 574. The insulator 576 is preferably formed using a nitride containing silicon such as silicon nitride or silicon nitride oxide. For example, silicon nitride deposited by a sputtering method is used for the insulator 576. When the insulator 576 is deposited by a sputtering method, a high-density silicon nitride film can be formed. To obtain the insulator 576, silicon nitride deposited by a PEALD method or a CVD method may be stacked over silicon nitride deposited by a sputtering method.

One of a first terminal and a second terminal of the transistor 500 is electrically connected to a conductor 540a serving as a plug, and the other of the first terminal and the second terminal of the transistor 500 is electrically connected to a conductor 540b. Note that in this specification and the like, the conductor 540a and the conductor 540b are collectively referred to as the conductor 540.

The conductor 540a is provided in a region overlapping with the conductor 542a, for example. Specifically, an opening portion is formed in the insulator 571, the insulator 544, the insulator 580, the insulator 574, the insulator 576, and the insulator 581 illustrated in FIG. 7A and in an insulator 582 and an insulator 586 illustrated in FIG. 6 in the region overlapping with the conductor 542a, and the conductor 540a is provided inside the opening portion. The conductor 540b is provided in a region overlapping with the conductor 542b, for example. Specifically, an opening portion is formed in the insulator 571, the insulator 544, the insulator 580, the insulator 574, the insulator 576, and the insulator 581 illustrated in FIG. 7A and in the insulator 582 and the insulator 586 illustrated in FIG. 6 in the region overlapping with the conductor 542b, and the conductor 540b is provided inside the opening portion. Note that the insulator 582 and the insulator 586 will be described later.

As illustrated in FIG. 7A, an insulator 541a as an insulator having an impurity barrier property may be provided between the conductor 540a and the side surface of the opening portion in the region overlapping with the conductor 542a. Similarly, an insulator 541b as an insulator having an impurity barrier property may be provided between the conductor 540b and the side surface of the opening portion in the region overlapping with the conductor 542b. Note that in this specification and the like, the insulator 541a and the insulator 541b are collectively referred to as the insulator 541.

The conductor 540a and the conductor 540b are preferably formed using a conductive material containing tungsten, copper, or aluminum as its main component. The conductor 540a and the conductor 540b may each have a stacked-layer structure.

In the case where the conductor 540 has a stacked-layer structure, a conductive material having a function of inhibiting passage of impurities such as water and hydrogen is preferably used for a first conductor provided in the vicinity of the insulator 574, the insulator 576, the insulator 581, the insulator 580, the insulator 544, and the insulator 571. For example, tantalum, tantalum nitride, titanium, titanium nitride, ruthenium, ruthenium oxide, or the like is preferably used. The conductive material having a function of inhibiting passage of impurities such as water and hydrogen may be used as a single layer or stacked layers. Moreover, impurities such as water and hydrogen contained in a layer above the insulator 576 can be inhibited from entering the oxide 530 through the conductor 540a and the conductor 540b.

For the insulator 541a and the insulator 541b, a barrier insulating film that can be used for the insulator 544 or the like may be used. For the insulator 541a and the insulator 541b, for example, an insulator such as silicon nitride, aluminum oxide, or silicon nitride oxide may be used. Since the insulator 541a and the insulator 541b are provided in contact with the insulator 580, impurities such as water and hydrogen contained in the insulator 580 or the like can be inhibited from entering the oxide 530 through the conductor 540a and the conductor 540b. In particular, silicon nitride is suitable because of its high blocking property against hydrogen. Furthermore, oxygen contained in the insulator 580 can be prevented from being absorbed by the conductor 540a and the conductor 540b.

When the insulator 541a and the insulator 541b each have a stacked-layer structure as illustrated in FIG. 7A, a first insulator in contact with an inner wall of the opening in the insulator 580 and the like and a second insulator on the inner side of the first insulator are preferably formed using a combination of a barrier insulating film against oxygen and a barrier insulating film against hydrogen.

For example, aluminum oxide deposited by an ALD method may be used as the first insulator and silicon nitride deposited by a PEALD method may be used as the second insulator. Such a structure can inhibit oxidation of the conductor 540 and reduce entry of hydrogen into the conductor 540.

Although the first insulator of the insulator 541 and the second conductor of the insulator 541 are stacked in the transistor 500, the present invention is not limited thereto. For example, the insulator 541 may have a single-layer structure or a stacked-layer structure of three or more layers. Although the first conductor of the conductor 540 and the second conductor of the conductor 540 are stacked in the transistor 500, the present invention is not limited thereto. For example, the conductor 540 may have a single-layer structure or a stacked-layer structure of three or more layers.

As illustrated in FIG. 6, a conductor 610, a conductor 612, and the like serving as wirings may be provided in contact with an upper portion of the conductor 540a and an upper portion of the conductor 540b. For the conductor 610 and the conductor 612, a conductive material containing tungsten, copper, or aluminum as its main component is preferably used. The conductors can each have a stacked-layer structure. Specifically, the conductors may each be a stack of titanium or a titanium nitride and any of the above conductive materials, for example. Note that the conductor may be formed to be embedded in an opening provided in an insulator.

The structure of the transistor included in the semiconductor device of one embodiment of the present invention is not limited to that of the transistor 500 illustrated in FIG. 6, FIG. 7A, FIG. 7B, and FIG. 8. The structure of the transistor included in the semiconductor device of one embodiment of the present invention may be changed in accordance with circumstances.

Figure 10:
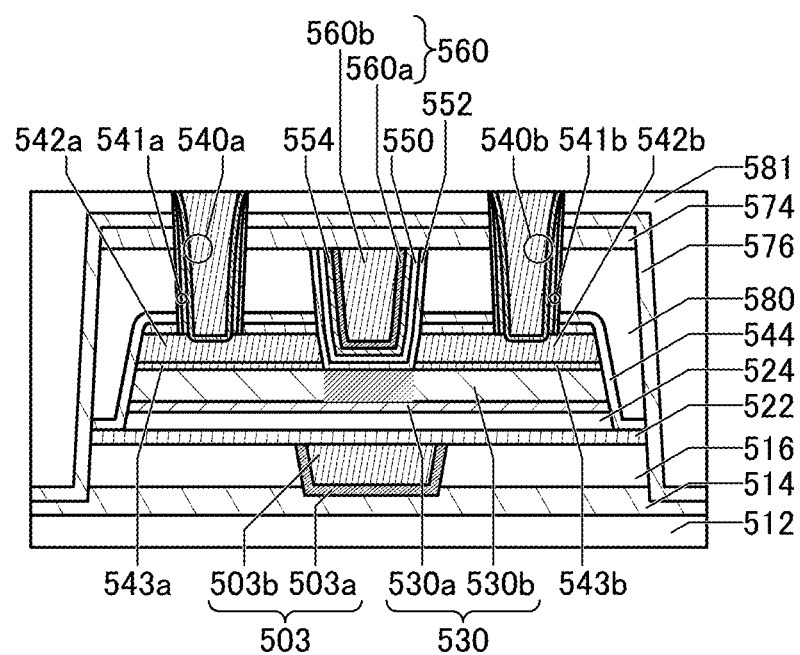
FIG. 10 is a schematic cross-sectional view illustrating a structure example of a transistor.

For example, the transistor 500 illustrated in FIG. 6, FIG. 7A, FIG. 7B, and FIG. 8 may have a structure illustrated in FIG. 10. The transistor in FIG. 10 is different from the transistor 500 illustrated in FIG. 6, FIG. 7A, FIG. 7B, and FIG. 8 in including an oxide 543a and an oxide 543b. Note that in this specification and the like, the oxide 543a and the oxide 543b are collectively referred to as an oxide 543. The cross-sectional structure in the channel width direction of the transistor in FIG. 10 can be similar to the cross-sectional structure of the transistor 500 illustrated in FIG. 7B.

The oxide 543a is provided between the oxide 530b and the conductor 542a, and the oxide 543b is provided between the oxide 530b and the conductor 542b. Here, the oxide 543a is preferably in contact with the top surface of the oxide 530b and a bottom surface of the conductor 542a. The oxide 543b is preferably in contact with the top surface of the oxide 530b and the bottom surface of the conductor 542b.

The oxide 543 preferably has a function of inhibiting passage of oxygen. The oxide 543 having a function of inhibiting passage of oxygen is preferably placed between the oxide 530b and the conductor 542 functioning as the source electrode or the drain electrode, in which case the electric resistance between the conductor 542 and the oxide 530b can be reduced. Such a structure can improve the electrical characteristics, the field-effect mobility, and the reliability of the transistor 500 in some cases.

A metal oxide containing the element M may be used as the oxide 543. In particular, aluminum, gallium, yttrium, or tin is preferably used for the element M. The concentration of the element M in the oxide 543 is preferably higher than that in the oxide 530b. Furthermore, gallium oxide may be used as the oxide 543. A metal oxide such as an In-M-Zn oxide may be used as the oxide 543. Specifically, the atomic ratio of the element M to In in the metal oxide used as the oxide is preferably greater than the atomic ratio of the element M to In in the metal oxide used as the oxide 530b. The thickness of the oxide 543 is preferably greater than or equal to 0.5 nm or greater than or equal to 1 nm, and less than or equal to 2 nm, less than or equal to 3 nm, or less than or equal to 5 nm. Note that the above-described lower limits and upper limits can be combined with each other. The oxide 543 preferably has crystallinity. In the case where the oxide 543 has crystallinity, release of oxygen from the oxide 530 can be suitably inhibited. When the oxide 543 has a hexagonal crystal structure or the like, for example, release of oxygen from the oxide 530 can sometimes be inhibited.

The insulator 582 is provided over the insulator 581, and the insulator 586 is provided over the insulator 582.

A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

For the insulator 586, a material similar to that for the insulator 320 can be used. Furthermore, when a material with a relatively low permittivity is used for these insulators, parasitic capacitance generated between wirings can be reduced. A silicon oxide film, a silicon oxynitride film, or the like can be used for the insulator 586, for example.

Next, the capacitor 600 and a wiring in the vicinity thereof or a plug included in the semiconductor device illustrated in FIG. 6 and FIG. 8. Note that the capacitor 600 and the wiring and/or the plug are provided above the transistor 500 illustrated in FIG. 6 and FIG. 8.

The capacitor 600 includes the conductor 610, a conductor 620, and an insulator 630, for example.

The conductor 610 is provided over one of the conductor 540a and the conductor 540b, a conductor 546, and the insulator 586. The conductor 610 has a function of one of the pair of electrodes of the capacitor 600.

The conductor 612 is provided over the other of the conductor 540a and the conductor 540b and the insulator 586. The conductor 612 has a function of a plug, a wiring, a terminal, or the like for electrically connecting a circuit element, a wiring, or the like placed above to the transistor 500.

Note that the conductor 612 and the conductor 610 may be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

The conductor 612 and the conductor 610 each have a single-layer structure in FIG. 6; however, the structure is not limited thereto, and a stacked-layer structure of two or more layers may be employed. For example, between a conductor having a barrier property and a conductor having high conductivity, a conductor that is highly adhesive to the conductor having a barrier property and the conductor having high conductivity may be formed.

The insulator 630 is provided over the insulator 586 and the conductor 610. The insulator 630 functions as a dielectric sandwiched between the pair of electrodes of the capacitor 600.

As the insulator 630, for example, silicon oxide, silicon oxynitride, silicon nitride oxide, silicon nitride, aluminum oxide, aluminum oxynitride, aluminum nitride oxide, aluminum nitride, hafnium oxide, hafnium oxynitride, hafnium nitride oxide, hafnium nitride, or zirconium oxide can be used. The insulator 630 can be provided to have a stacked-layer structure or a single-layer structure using any of the above materials.

For another example, the insulator 630 may have a stacked-layer structure using a material with high dielectric strength, such as silicon oxynitride, and a high-permittivity (high-k) material. In the capacitor 600 having such a structure, a sufficient capacitance can be ensured owing to the high-permittivity (high-k) insulator, and the dielectric strength can be increased owing to the insulator with high dielectric strength; hence, the electrostatic breakdown of the capacitor 600 can be inhibited.

Examples of the insulator of a high-permittivity (high-k) material (material with high dielectric constant) include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Alternatively, the insulator 630 may have a ingle layer or stacked layers formed using, for example, any of insulators containing a high-k material, such as aluminum oxide, hafnium oxide, tantalum oxide, zirconium oxide, lead zirconate titanate (PZT), strontium titanate ($SrTiO_3$), or (Ba, Sr)$TiO_3$ (BST). For the insulator 630, a compound containing hafnium and zirconium may be used, for example. When the semiconductor apparatus is miniaturized and highly integrated, a gate insulator and a dielectric used for a capacitor become thin, which might cause a problem of leak current of a transistor and a capacitor, for example. When a high-k material is used for the gate insulator and an insulator functioning as the dielectric used for the capacitor, a gate potential during operation of the transistor can be lowered and the capacitance of the capacitor can be ensured while the physical thickness is kept.

The conductor 620 is provided to overlap with the conductor 610 with the insulator 630 therebetween. The conductor 610 has a function of one of the pair of electrodes of the capacitor 600.

Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In the case where the conductor 620 is formed concurrently with another component such as a conductor, Cu (copper), Al (aluminum), or the like, which is a low-resistance metal material, is used. For example, the conductor 620 can be formed using a material that can be used for the conductor 610. The conductor 620 may have a stacked-layer structure of two or more layers instead of a single-layer structure.

An insulator 640 is provided over the conductor 620 and the insulator 630. The insulator 640 is preferably formed using a film having a barrier property that prevents hydrogen, impurities, or the like from diffusing into the region where the transistor 500 is provided, for example. Thus, a material similar to that for the insulator 324 can be used.

An insulator 650 is provided over the insulator 640. The insulator 650 can be provided using a material similar to that for the insulator 320. The insulator 650 may function as a planarization film that covers an uneven shape thereunder. Thus, the insulator 650 can be formed using any of the materials that can be used for the insulator 324, for example.

Although the capacitor 600 illustrated in FIG. 6 and FIG. 8 is a planar capacitor, the shape of the capacitor is not limited thereto. For example, the capacitor 600 may be a cylindrical capacitor instead of a planar capacitor.

A wiring layer may be provided above the capacitor 600. For example, in FIG. 6, an insulator 411, an insulator 412, an insulator 413, and an insulator 414 are provided in this order above the insulator 650. In addition, a conductor 416 serving as a plug or a wiring is provided in the insulator 411, the insulator 412, and the insulator 413. The conductor 416 can be provided, for example, in a region overlapping with a conductor 660 to be described later.

In addition, in the insulator 630, the insulator 640, and the insulator 650, an opening portion is provided in a region overlapping with the conductor 612, and the conductor 660 is provided to fill the opening portion. The conductor 660 serves as a plug or a wiring that is electrically connected to the conductor 416 included in the above-described wiring layer.

Like the insulator 324 or the like, the insulator 411 and the insulator 414 are each preferably formed using an insulator having a barrier property against impurities such as water and hydrogen, for example. Thus, the insulator 411 and the insulator 414 can be formed using any of the materials that can be used for the insulator 324 or the like, for example.

Like the insulator 326, the insulator 412 and the insulator 413 are each preferably formed using, for example, an insulator having a relatively low dielectric constant to reduce the parasitic capacitance generated between wirings.

The conductor 612 and the conductor 416 can be provided using materials similar to those for the conductor 328 and the conductor 330, for example.

<Structure Example of Transistor and Ferroelectric Capacitor>

Next is described a structure in which a dielectric that can have ferroelectricity is provided in or around the transistor 500 including a metal oxide in a channel formation region.

Figure 11A:
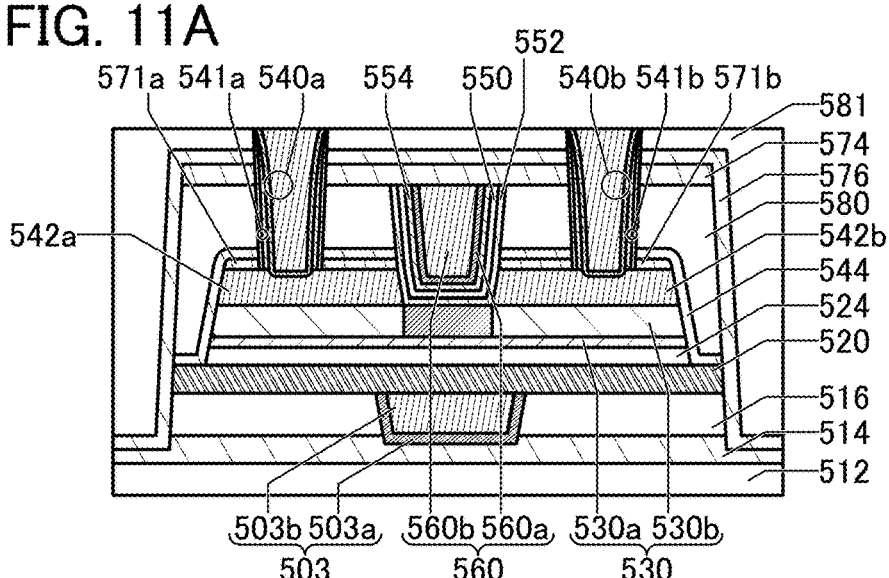
FIG. 11A to FIG. 11C are schematic cross-sectional views each illustrating a structure example of a transistor.

FIG. 11A illustrates an example of a transistor structure in which a dielectric that can have ferroelectricity is provided for the structure of the transistor 500 in FIG. 6, FIG. 7A, or the like.

The transistor illustrated in FIG. 11A has a structure in which the insulator 522 functioning as the second gate insulator is replaced with an insulator 520. As the insulator 520, a dielectric that can have ferroelectricity can be used, for example.

Thus, in the transistor in FIG. 11A, a ferroelectric capacitor between the oxide 530 and the conductor 503 functioning as the second gate electrode can be provided. In other words, the transistor in FIG. 11A can be a FeFET (Ferroelectric FET) in which a dielectric that can have ferroelectricity is included as part of the second gate insulator.

Note that a material that can have ferroelectricity can be similar to the material that can be used for the dielectric of the capacitor FEC, which is described in the above embodiment.

Figure 11B:
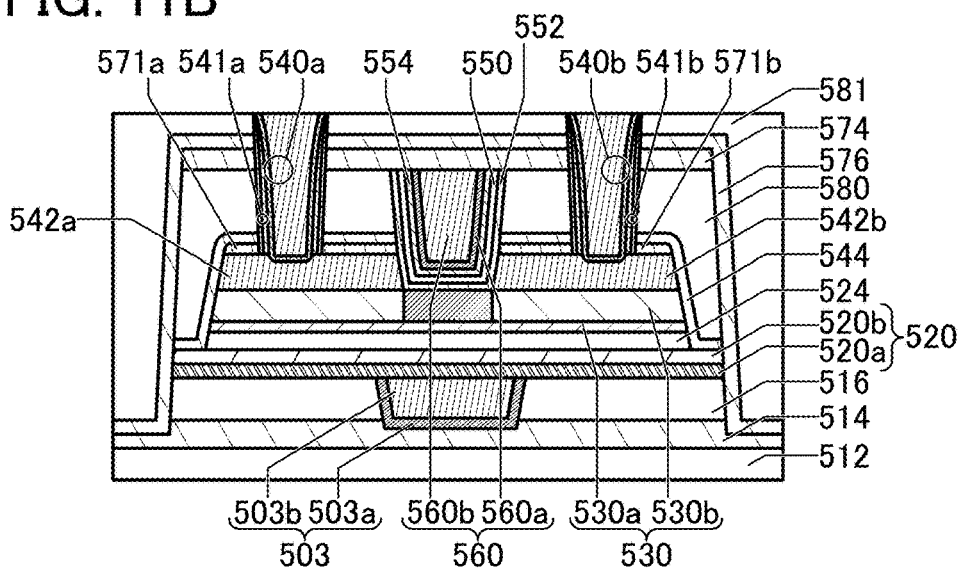

Although the insulator 520 is illustrated as a single layer in FIG. 11A, the insulator 520 can be an insulating film including two or more layers containing a dielectric that can have ferroelectricity. A specific example thereof is illustrated in FIG. 11B. The insulator 520 in FIG. 11B includes, for example, an insulator 520a and an insulator 520b. The insulator 520a is provided on top surfaces of the insulator 516 and the conductor 503, and the insulator 520b is provided on the top surface of the insulator 520a.

As the insulator 520a, a dielectric that can have ferroelectricity can be used, for example. As the insulator 520b, silicon oxide or the like can be used, for example. Alternatively, for example, silicon oxide can be used as the insulator 520a and a dielectric that can have ferroelectricity can be used as the insulator 520b.

As illustrated in FIG. 11B, the insulator 520 is formed with two layers, one of which includes a dielectric that can have ferroelectricity and the other of which includes silicon oxide, whereby the leakage of current flowing between the oxide 530 and the conductor 503 functioning as the gate electrode can be inhibited.

Figure 11C:
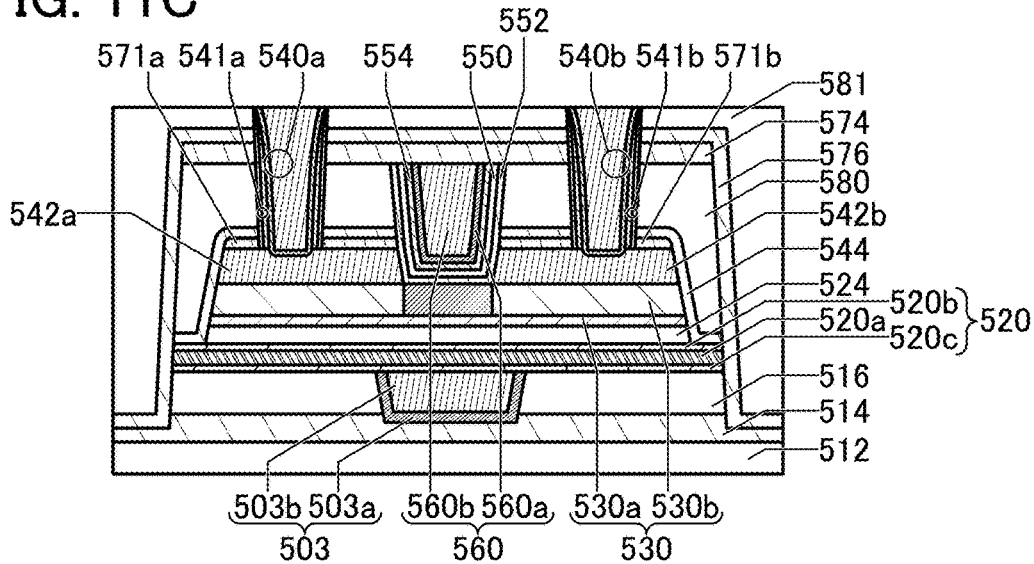

FIG. 11C illustrates a structure example of a transistor in which the insulator 520 is formed with three layers. The insulator 520 in FIG. 11C includes, for example, the insulator 520a, the insulator 520b, and an insulator 520c. The insulator 520c is provided on top surfaces of the insulator 516 and the conductor 503, the insulator 520a is provided on the top surface of the insulator 520c, and the insulator 520b is provided on the top surface of the insulator 520a.

As the insulator 520*a*, a dielectric that can have ferroelectricity can be used, for example. As each of the insulator 520*b* and the insulator 520*c*, silicon oxide or the like can be used, for example.

The structures of the transistors and the ferroelectric capacitors illustrated in FIG. 11A to FIG. 11C can be employed for the transistor M1 and the capacitor FEC, for example, illustrated in FIG. 2A and the like, which are described in the above embodiment.

Figure 12:
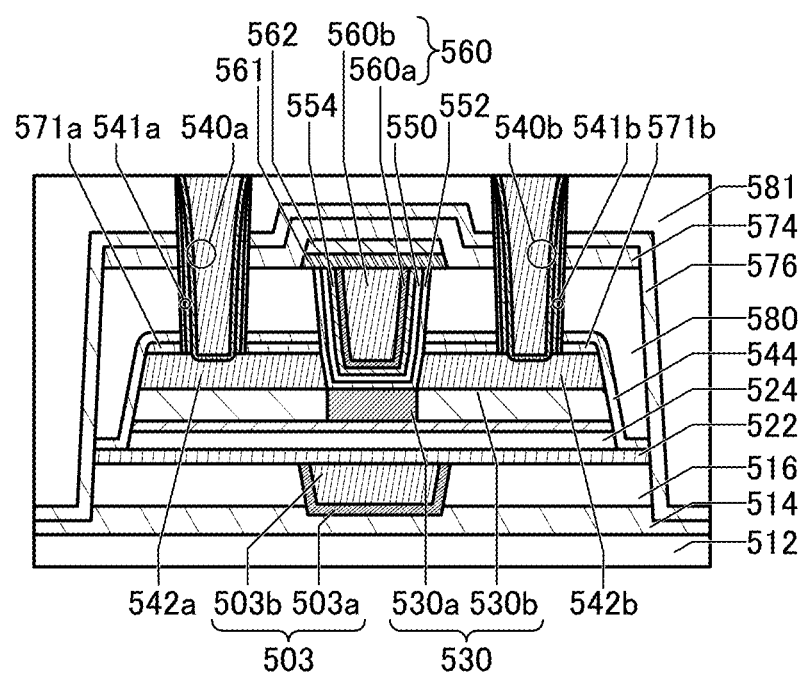
FIG. 12 is a schematic cross-sectional view illustrating a structure example of a transistor.

FIG. 12 illustrates an example of a transistor structure in which a dielectric that can have ferroelectricity is provided for the structure of the transistor 500 in FIG. 6, FIG. 7A, or the like, which is different from those of the transistors in FIG. 11A to FIG. 11C.

In the structure example of the transistor illustrated in FIG. 12, a dielectric that can have ferroelectricity is provided above the insulator 552, the insulator 550, and the insulator 554, which function as the first gate insulator, the conductor 560 functioning as a first gate electrode, and part of the insulator 580.

Specifically, an insulator 561 is provided to be in contact with parts of the insulator 552, the insulator 550, the insulator 554, the conductor 560, and the insulator 580. As the insulator 561, a dielectric that can have ferroelectricity, which is applicable to the insulator 520 in FIG. 11A, can be used, for example.

A conductor 562 is provided to be over and in contact with the insulator 561. The conductor 562 can be provided using a material similar to those for the conductor 328 and the conductor 330, for example.

Therefore, the transistor structure in FIG. 12 enables a dielectric capacitor to be provided between the conductor 562 and the conductor 503 functioning as the first gate electrode.

The insulator 561 may have a stacked-layer structure including two or more layers, like the insulator 520 illustrated in FIG. 11B and FIG. 11C.

The structures of the transistor and the ferroelectric capacitor illustrated in FIG. 12 can be employed for the transistor M2 and the capacitor FEC, for example, illustrated in FIG. 2A or the like, which are described in the above embodiment.

Figure 13A:
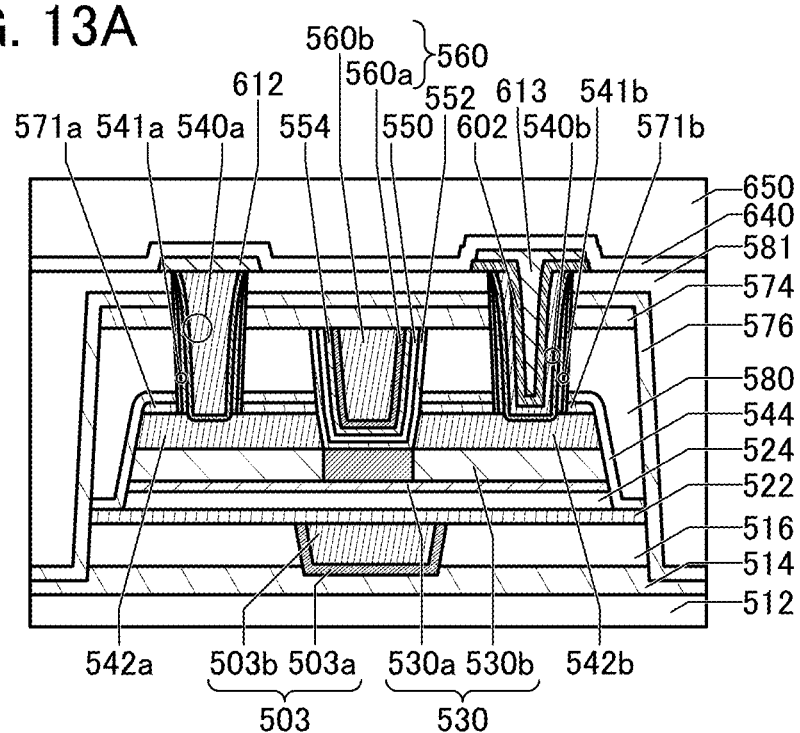
FIG. 13A and FIG. 13B are schematic cross-sectional views each illustrating a structure example of a transistor.

FIG. 13A illustrates an example of a transistor structure in which a dielectric that can have ferroelectricity is provided for the structure of the transistor 500 in FIG. 6, FIG. 7A, or the like, which is different from those of the transistors in FIG. 11A to FIG. 11C and FIG. 12.

The transistor illustrated in FIG. 13A includes an insulator 602 in an opening portion which is in a region overlapping with the conductor 542*b* and provided in the insulator 544, the insulator 571*b*, the insulator 580, the insulator 574, the insulator 576, and the insulator 581. Specifically, in the opening portion, the insulator 541*b* is provided on the side surface of the opening portion, the conductor 540*b* is provided over the insulator 541*b* and the conductor 542*b* that corresponds to the bottom of the opening portion, the insulator 602 is provided over the conductor 540*b* and a region that is part of the insulator 581, and a conductor 613 is provided over the insulator 602 to fill the remaining space of the opening portion.

As another specific example, the opening portion may have a structure such that the insulator 541*b* is provided on the side surface of the opening portion, the conductor 540*b* is provided over the insulator 541*b*, the insulator 602 is provided over the conductor 540*b*, the conductor 542*b* corresponding to the bottom of the opening portion, and a region that is part of the insulator 581, and the conductor 613 is provided over the insulator 602 to fill the remaining space of the opening portion.

For the insulator 602, a dielectric that can have ferroelectricity, which is applicable to the insulator 520 in FIG. 11A, can be used, for example.

The conductor 613 can be provided using a material similar to those for the conductor 328 and the conductor 330, for example.

Thus, with the structure of the transistor in FIG. 13A, a ferroelectric capacitor between the conductor 540*b* and the conductor 613 can be provided in the opening portion in the region overlapping with the conductor 542*b*.

Note that the insulator 602 may have a stacked-layer structure including two or more layers, like the insulator 520 illustrated in FIG. 11B and FIG. 11C.

The structures of the transistor and the ferroelectric capacitor illustrated in FIG. 13A can be employed for, for example the transistor M2 and the capacitor FEC illustrated in FIG. 2A or the like, described in the above embodiment.

Figure 13B:
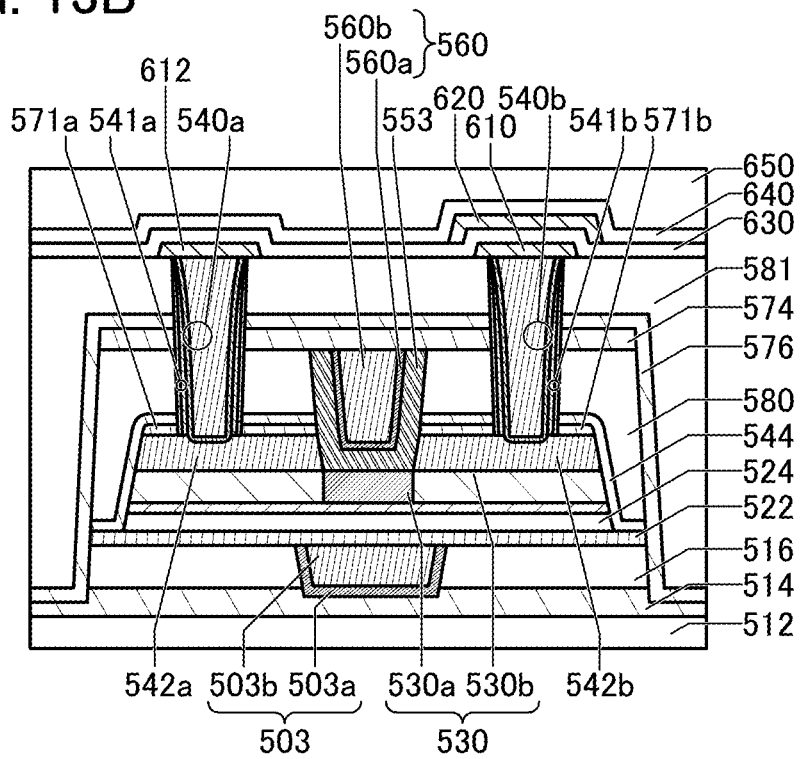

FIG. 13B illustrates an example of a transistor structure in which a dielectric that can have ferroelectricity is provided for the structure of the transistor 500 in FIG. 6, FIG. 7A, or the like, which is different from those of the transistors in FIG. 11A to FIG. 11C, FIG. 12, and FIG. 13A.

The transistor illustrated in FIG. 13B has a structure in which the insulator 552 functioning as the first gate insulator, the insulator 550, and the insulator 554 are replaced with the insulator 553. As the insulator 553, a dielectric that can have ferroelectricity, which is applicable to the insulator 520 in FIG. 11A, can be used, for example.

Thus, the transistor in FIG. 13B can be provided with a ferroelectric capacitor between the oxide 530 and the conductor 560 functioning as the first gate electrode. In other words, the transistor in FIG. 13B can be a FeFET in which a dielectric that can have ferroelectricity is included as part of the first gate insulator.

Note that the insulator 553 may have a stacked-layer structure including two or more layers, like the insulator 520 illustrated in FIG. 11B and FIG. 11C.

Although FIG. 13B illustrates the structure in which the insulator 552, the insulator 550, and the insulator 554 are replaced with the insulator 553, another structure example in which at least one of the insulator 552, the insulator 550, and the insulator 554 is replaced with the insulator 553 and the other insulator(s) and the insulator 553 are stacked may be employed.

The structures of the transistor and the ferroelectric capacitor illustrated in FIG. 13B can be employed for, for example the transistor M2 and the capacitor FEC illustrated in FIG. 2A or the like, described in the above embodiment.

Figure 14A:
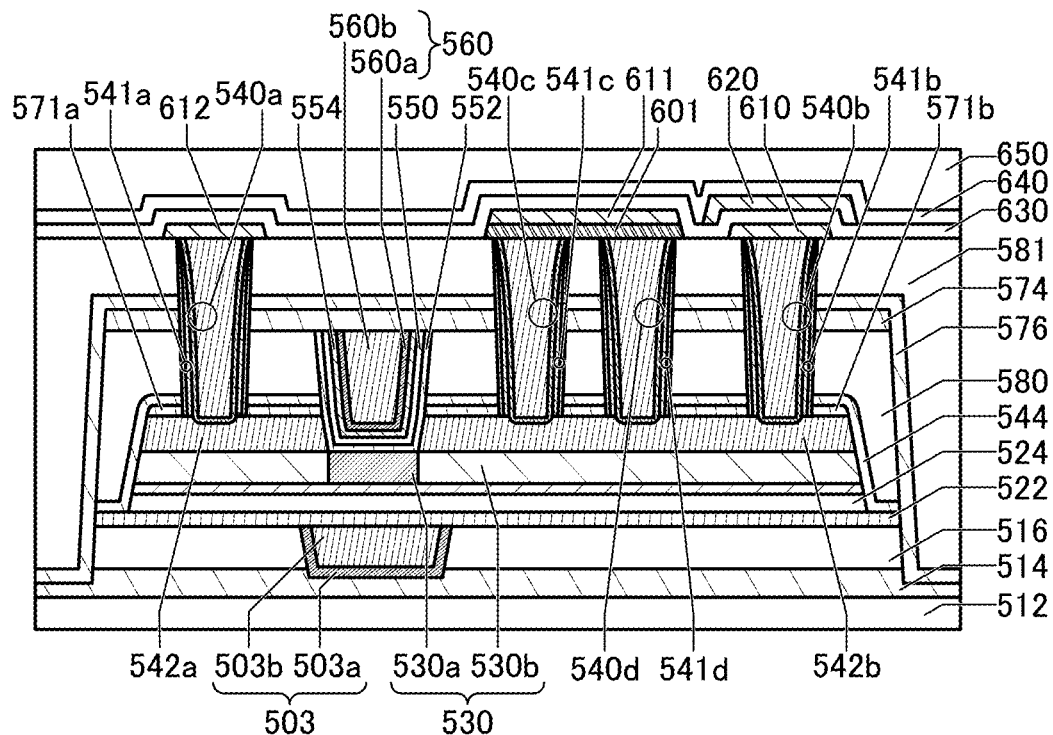
FIG. 14A and FIG. 14B are schematic cross-sectional views each illustrating a structure example of a transistor.

FIG. 14A illustrates an example of a structure including the transistor 500 and capacitors. Each of the capacitors includes a dielectric that can have ferroelectricity and is provided in the vicinity of the transistor 500.

In the transistor illustrated in FIG. 14A, a plurality of opening portions are formed in the insulator 544, the insulator 571*b*, the insulator 580, the insulator 574, the insulator 576, and the insulator 581 in a region overlapping with the conductor 542*b*, for example. In one of the opening portions, a conductor 540*c* functioning as a plug is provided, and an insulator 541*c* is provided, as an insulator having a barrier property against impurities, between the side surface of the opening portion and the conductor 540*c*. In another opening portion, a conductor 540*d* functioning as a plug is provided, and an insulator 541*d* is provided, as an insulator having a barrier property against impurities, between the side surface of the opening portion and the conductor 540d. The material applicable to the conductor 540a and the conductor 540b can be used for the conductor 540c and the conductor 540d, for example, and a material applicable to the insulator 541a and the insulator 541b can be used for the insulator 541c and the insulator 541d, for example.

An insulator 601 is provided over and in contact with the conductor 540c and the conductor 540d. For the insulator 601, a dielectric that can have ferroelectricity, which is applicable to the insulator 520 in FIG. 11A, can be used for example.

A conductor 611 is provided over and in contact with the insulator 601. The conductor 611 can be provided using a material similar to those for the conductor 328 and the conductor 330, for example.

Thus, with the structure illustrated in FIG. 14A, dielectric capacitors can be provided between the conductor 611 and the conductor 540c and the conductor 540d each functioning as a plug.

Note that the insulator 601 may have a stacked-layer structure including two or more layers, like the insulator 520 illustrated in FIG. 11B and FIG. 11C.

Although the number of plugs in contact with the insulator 601 is two (the conductor 540c and the conductor 540d) in FIG. 14A, the number of plugs can be one or three or more. In other words, FIG. 14A illustrates an example where two opening portions each provided with a conductor as a plug are provided in the region overlapping with the insulator 601; however, one opening portion or three or more opening portions may be provided in the region overlapping with the insulator 601.

The structures of the transistor and the ferroelectric capacitor illustrated in FIG. 14A can be employed for, for example, the transistor M2 and the capacitor FEC illustrated in FIG. 2A or the like, described in the above embodiment.

Figure 14B:
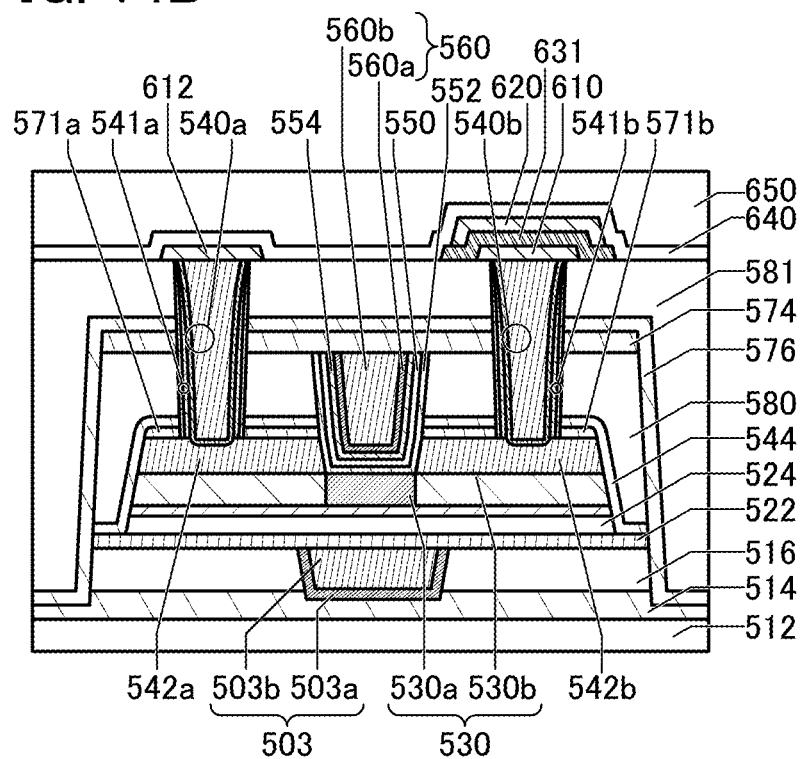

FIG. 14B illustrates an example of a structure including the transistor 500 and capacitors, which is different from that of FIG. 14A. Each of the capacitors includes a dielectric that can have ferroelectricity and is provided in the vicinity of the transistor 500.

In the transistor illustrated in FIG. 14B, the insulator 631 is provided over the conductor 610 positioned over the conductor 540b functioning as a plug and a region that is part of the insulator 581. For the insulator 631, a dielectric that can have ferroelectricity, which is applicable to the insulator 520 in FIG. 11A, can be used for example.

Furthermore, the conductor 620 is provided on the top surface of the insulator 631, and the insulator 640 and the insulator 650 are provided in this order over the insulator 581, the conductor 612, the conductor 620, and a region corresponding to part of the insulator 631.

Thus, with the structure illustrated in FIG. 14B, a dielectric capacitor can be provided between the conductor 610 and the conductor 620.

Note that the insulator 631 may have a stacked-layer structure including two or more layers, like the insulator 520 illustrated in FIG. 11B and FIG. 11C.

The structures of the transistor and the ferroelectric capacitor illustrated in FIG. 14B can be employed for, for example the transistor M1 and the capacitor FEC illustrated in FIG. 2A or the like, described in the above embodiment.

Figure 15:
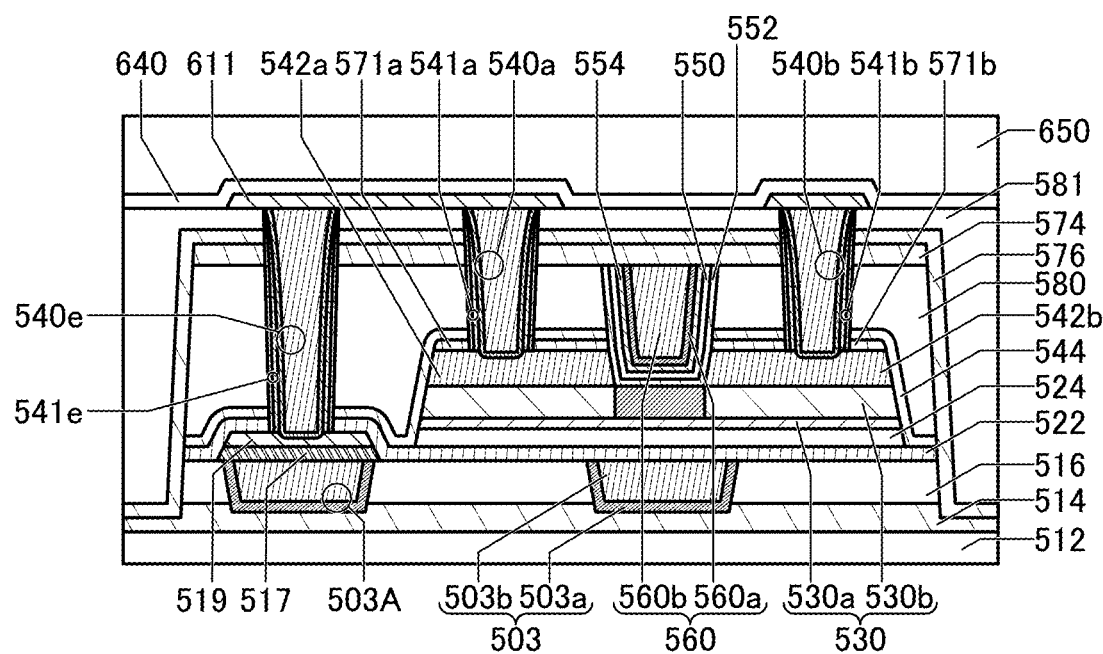
FIG. 15 is a schematic cross-sectional view illustrating a structure example of a transistor.

FIG. 15 illustrates an example of a structure including the transistor 500 and a capacitor, which is different from those of FIG. 14A and FIG. 14B. The capacitor includes a dielectric that can have ferroelectricity and is provided in the vicinity of the transistor 500.

In FIG. 15, the insulator 516 has a plurality of openings. The conductor 503 is embedded in one of the openings, and a conductor 503A is embedded in another opening.

As the conductor 503A, a material, which is applicable to the conductor 503, can be used, for example.

Over the conductor 503A, an insulator 517 and a conductor 519 are sequentially provided. In addition, the insulator 522 described in the transistor 500 in FIG. 7A is provided to cover the insulator 517 and the conductor 519. The insulator 544 described in the transistor 500 in FIG. 7A is provided to cover over the insulator 522.

As the insulator 517, a dielectric that can have ferroelectricity, which is applicable to the insulator 520 in FIG. 11A, can be used for example.

The conductor 519 can be provided using a material similar to those for the conductor 328 and the conductor 330, for example.

Thus, with the structure illustrated in FIG. 15, a dielectric capacitor can be provided between the conductor 503A and the conductor 519.

Note that the insulator 517 may have a stacked-layer structure including two or more layers, like the insulator 520 illustrated in FIG. 11B and FIG. 11C.

After the insulator 581 is provided, an opening portion is formed in the insulator 522, the insulator 544, the insulator 580, the insulator 574, the insulator 576, and the insulator 581 in a region overlapping with the conductor 503. A conductor 540e functioning as a plug is provided on the inner side of the opening portion, and an insulator 541e is provided, as an insulator having a barrier property against impurities, between the side surface of the opening portion and the conductor 540e. As the conductor 540e, a material which is applicable to the conductor 540a and the conductor 540b can be used, for example, and as the insulator 541e, a material which is applicable to the insulator 541a and the insulator 541b can be used, for example.

The conductor 611 is provided on the top surfaces of the conductors 540a and 540e functioning as plugs and on the top surface of part of the insulator 581. The conductor 611 can be provided using a material similar to those for the conductor 328 and the conductor 330, for example.

The insulator 640 and the insulator 650 are sequentially provided on the top surfaces of the conductor 611 and part of the insulator 581.

The structures of the transistor and the ferroelectric capacitor illustrated in FIG. 15 can be employed for, for example the transistor M1 and the capacitor FEC illustrated in FIG. 2A or the like, described in the above embodiment.

<Structure Example 2 of Semiconductor Device>

Next, a structure example in which a ferroelectric capacitor is provided for the above-described semiconductor device is described.

Figure 16:
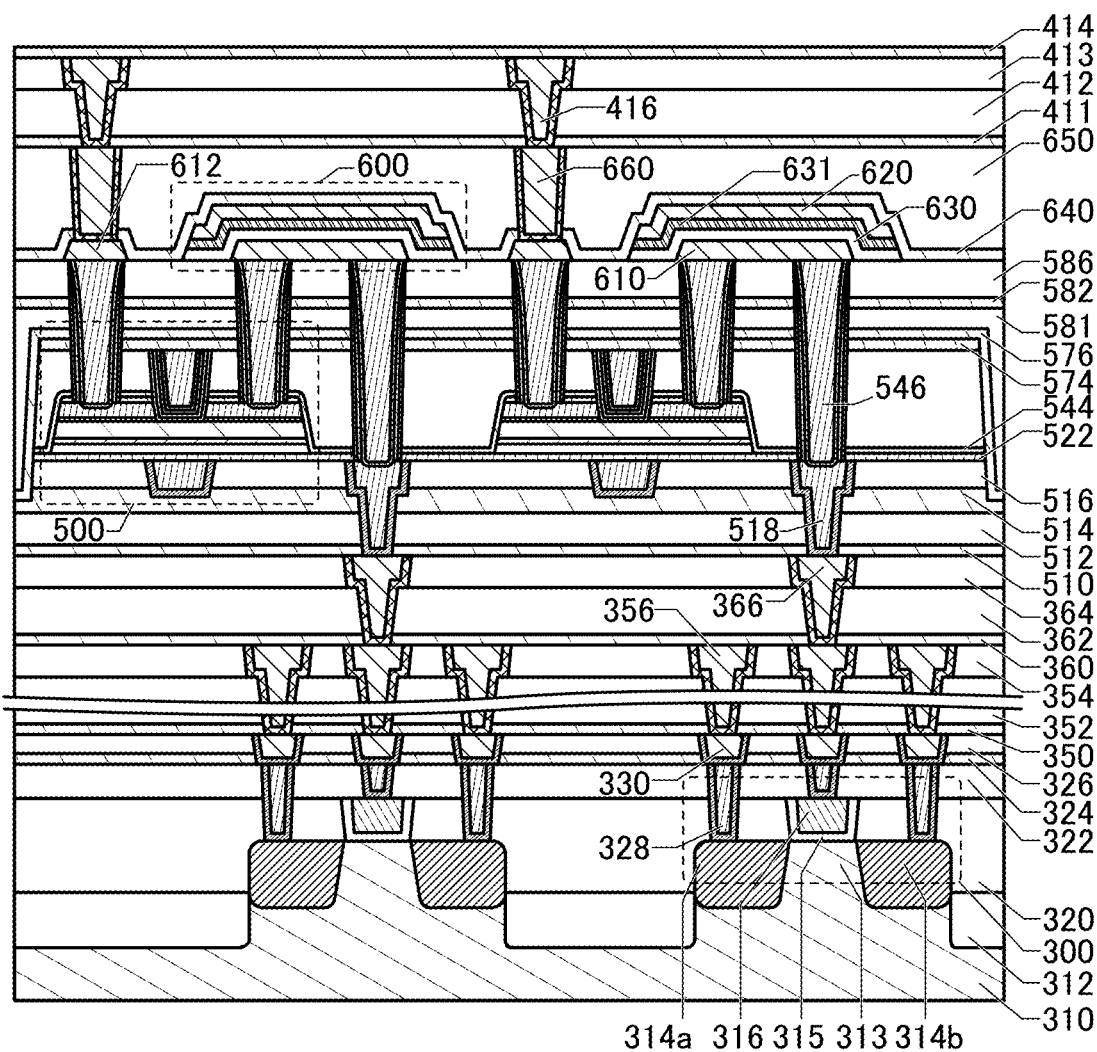
FIG. 16 is a schematic cross-sectional view illustrating a structure example of a semiconductor device.

FIG. 16 illustrates an example in which the structure of the capacitor 600 provided on the top surfaces of the insulator 582 and the conductor 546 is changed from that in the semiconductor device illustrated in FIG. 6.

Specifically, the capacitor 600 includes the conductor 610, the conductor 620, the insulator 630, and the insulator 631, for example. In particular, as the insulator 631, a dielectric that can have ferroelectricity can be used as described in FIG. 14B.

In FIG. 16, the conductor 610 and the conductor 612 can be formed using a material similar to that of the conductor 610 and the conductor 612 in FIG. 6. In addition, the conductor 610 and the conductor 612 in FIG. 16 can be formed in a manner similar to that for the conductor 610 and the conductor 612 in FIG. 6.

In FIG. 16, the insulator 630 is provided on the top surfaces of the conductor 610 and part of the insulator 586. The insulator 631 is provided on the top surface of the insulator 630, and the conductor 620 is provided on the top surface of the insulator 631.

As the insulator 630, a material which is applicable to the insulator 630 in FIG. 6 can be used, for example.

In FIG. 16, the insulator 640 is provided on the top surfaces of a region including the end portion of the insulator 630, a region including the end portion of the insulator 631, the conductor 620, and part of the insulator 586.

As the insulator 640, a material which is applicable to the insulator 640 in FIG. 6 can be used, for example.

The structure of the capacitor 600 illustrated in FIG. 16 is employed, whereby a ferroelectric capacitor can be provided for the semiconductor device illustrated in FIG. 6.

Next, a structure example of a semiconductor device provided with a ferroelectric capacitor, which is different from that in FIG. 16, is described.

Figure 17:
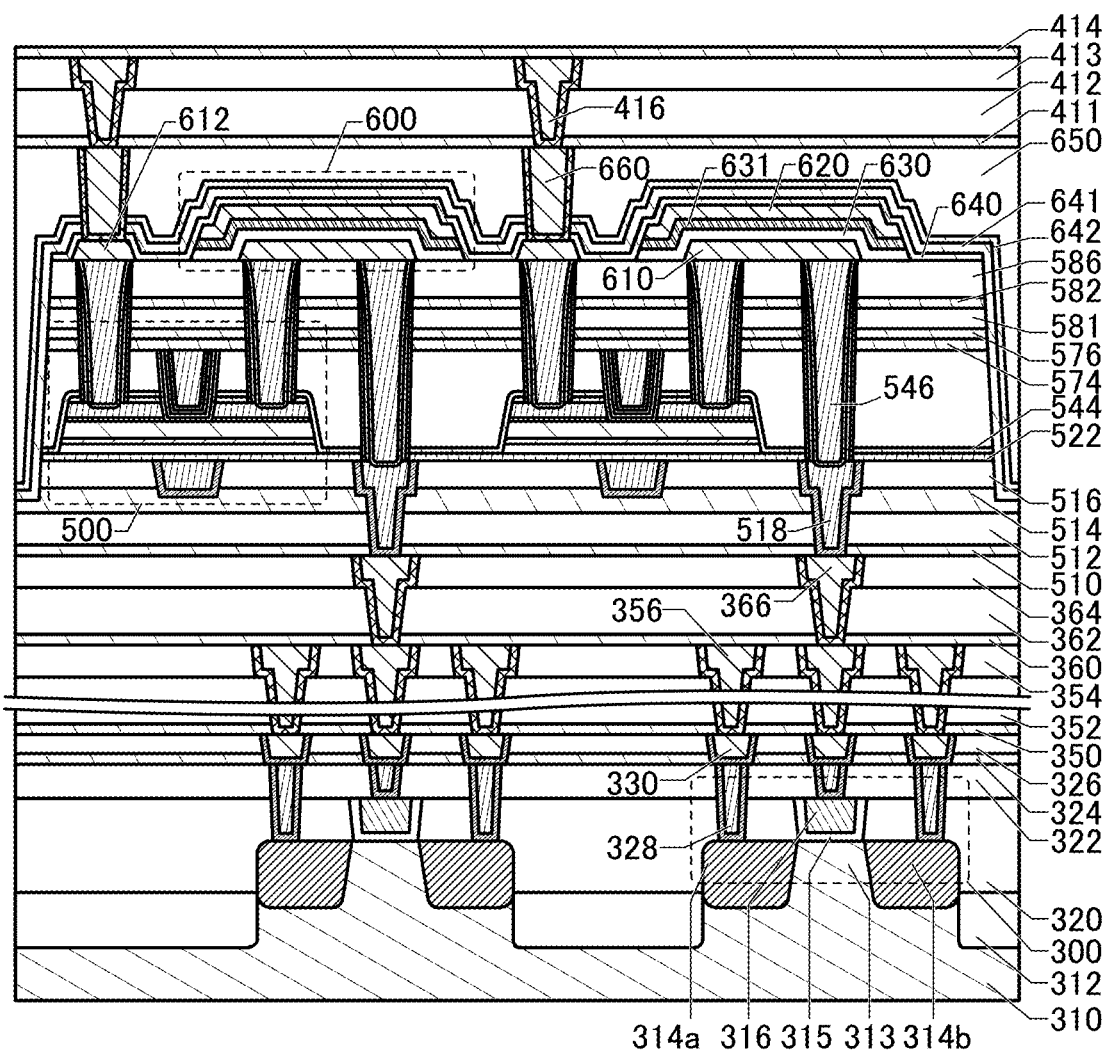
FIG. 17 is a schematic cross-sectional view illustrating a structure example of a semiconductor device.

A semiconductor device illustrated in FIG. 17 is a modification example of the semiconductor device in FIG. 16, in which the transistor 500 and the capacitor 600 are surrounded by the insulator 571, the insulator 544, the insulator 574, the insulator 576, the insulator 581, an insulator 641, an insulator 642, and the like.

In the semiconductor devices in FIG. 6 and FIG. 16, the components ranging from the substrate 310 to the insulator 574 are sequentially provided, and then the opening portion reaching the insulator 514 is provided. Meanwhile, in the semiconductor device in FIG. 17, the components ranging from the substrate 310 to the insulator 640 are sequentially provided, and then the opening portion reaching the insulator 514 is provided.

In the semiconductor device in FIG. 17, the insulator 641, the insulator 642, and the insulator 650 are sequentially provided on the bottom of the opening portion and the top surface of the insulator 640.

The insulator 641 and the insulator 642 preferably function as barrier insulating films, for example, which prevents diffusion of impurities such as water or hydrogen from the above of the transistor 500 and the capacitor 600 into the transistor 500 and the capacitor 600.

As a method for depositing the insulator 641, a sputtering method can be used, for example. For example, silicon nitride deposited by a sputtering method can be used as the insulator 641. The sputtering method does not need to use molecules including hydrogen for a deposition gas and accordingly enables the insulator 641 to have a low hydrogen concentration. With the low hydrogen concentration in the insulator 641, hydrogen diffusion from the insulator 641 to the conductor 610, the conductor 612, and the insulator 586 can be inhibited.

The insulator 642 is preferably deposited by an ALD method, further preferably by a PEALD method, for example. For example, silicon nitride deposited by a PEALD method can be used as the insulator 642. In this manner, the insulator 642 can be formed with good coverage. Even when a pinhole, disconnection, or the like is formed in the insulator 641 due to unevenness of the base, the insulator 642 covers such a defect, and accordingly diffusion of hydrogen to the conductor 610, the conductor 612, and the insulator 586 can be inhibited.

With use of the structure illustrated in FIG. 17, impurities such as water or hydrogen can be prevented from diffusing to the sides of the transistor 500 and the capacitor 600 through the insulator 512, the insulator 514, the insulator 641, the insulator 642, or the like. Furthermore, oxygen contained in the insulator 580 or the like can be prevented from diffusing to the outside through the insulator 574, the insulator 641, the insulator 642, or the like.

When a semiconductor device using a transistor including an oxide semiconductor has the structure described in this embodiment, a change in electrical characteristics of the transistor can be inhibited and the reliability can be improved.

When a stacked structure, miniaturization, high integration, or the like is achieved in the semiconductor device using a transistor including an oxide semiconductor, the area of circuits forming the semiconductor device can be reduced. Specifically, use of a ferroelectric capacitor as a capacitor included in the semiconductor device enables a value of capacitance of the capacitor to be increased, so that the miniaturization of the capacitor can be achieved. Therefore, the area of the circuit including the capacitor can be reduced. Moreover, as described in this embodiment, stacking the transistor and the capacitor can increase the circuit scale while an increase in the area of the circuits in the semiconductor device is inhibited.

This embodiment can be combined with the other embodiments described in this specification and the like as appropriate.

Embodiment 3

Described in this embodiment is a metal oxide (hereinafter also referred to as an oxide semiconductor) that can be used in an OS transistor described in the above embodiment.

The metal oxide preferably contains at least indium or zinc. In particular, indium and zinc are preferably contained. In addition to them, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structure>

First, the classification of crystal structures of an oxide semiconductor is described with reference to FIG. 18A. FIG. 18A is a diagram showing classification of crystal structures of an oxide semiconductor, typically IGZO (a metal oxide containing In, Ga, and Zn).

As shown in FIG. 18A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (Cloud-Aligned Composite). Note that "Crystalline" excludes single crystal, poly crystal, and completely amorphous. "Crystal" includes single crystal and poly crystal.

Note that the structures in the thick frame in FIG. 18A are in an intermediate state between "Amorphous" and "Crystal", and belong to a new crystalline phase. That is, these structures are completely different from "Amorphous", which is energetically unstable, and "Crystal".

A crystal structure of a film or a substrate can be analyzed with an X-ray diffraction (XRD) spectrum. FIG. 18B shows an XRD spectrum, which is obtained using GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 18B and obtained by GIXD measurement is hereinafter simply referred to as an XRD spectrum. The CAAC-IGZO film in FIG. 18B has a composition in the vicinity of In:Ga:Zn=4:2:3 [atomic ratio]. The CAAC-IGZO film in FIG. 18B has a thickness of 500 nm.

As shown in FIG. 18B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. As shown in FIG. 18B, the peak at 2θ of around 31θ is asymmetric with respect to the axis of the angle at which the peak intensity (Intensity) is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 18C shows a diffraction pattern of a CAAC-IGZO film. FIG. 18C shows a diffraction pattern obtained with the NBED method in which an electron beam is incident in the direction parallel to the substrate. The CAAC-IGZO film in FIG. 18C has a composition in the vicinity of In:Ga:Zn=4:2:3 [atomic ratio]. In the nanobeam electron diffraction method, electron diffraction is performed with a probe diameter of 1 nm.

As shown in FIG. 18C, a plurality of spots indicating c-axis alignment are observed in the diffraction pattern of the CAAC-IGZO film.

<<Structure of Oxide Semiconductor>>

Oxide semiconductors might be classified in a manner different from that in FIG. 18A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which layers containing indium (In) and oxygen (hereinafter In layers) and layers containing the element M, zinc (Zn), and oxygen (hereinafter (M,Zn) layers) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, or the like.

A crystal structure in which a clear crystal grain boundary is observed is what is called polycrystal. It is highly probable that the grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, reduction in electron mobility due to the crystal grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities, defects, and the like (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS and an amorphous oxide semiconductor by some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter greater than the diameter of a nanocrystal (e.g., greater than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or less than the diameter of a nanocrystal (e.g., greater than or equal to 1 nm and less than or equal to 30 nm).

[a-like OS]

The a-like OS is an oxide semiconductor having a structure between those of the nc-OS and the amorphous oxide semiconductor. The a-like OS includes avoid or a low-density region. That is, the a-like OS has low crystallinity as compared with the nc-OS and the CAAC-OS. Moreover, the a-like OS has a higher hydrogen concentration in the film than the nc-OS and the CAAC-OS.

<<Composition of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. As another example, the first region has higher [In] and lower [Ga] than the second region. Moreover, the second region has higher [Ga] than the first region and has lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current (Ion), high field-effect mobility (u), and an excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in the oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor with a low carrier concentration is preferably used for a transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration in an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2 \times 10^{18}$ atoms/cm³, preferably lower than or equal to $2 \times 10^{17}$ atoms/cm³.

When the oxide semiconductor contains an alkali metal or an alkaline earth metal, defect states are formed and carriers are generated in some cases. Thus, a transistor including an oxide semiconductor that contains an alkali metal or an alkaline earth metal is likely to have normally-on characteristics. Thus, the concentration of an alkali metal or an alkaline earth metal in the oxide semiconductor, which is obtained using SIMS, is set lower than or equal to $1 \times 10^{18}$ atoms/cm³, preferably lower than or equal to $2 \times 10^{16}$ atoms/cm³.

Furthermore, when the oxide semiconductor contains nitrogen, the oxide semiconductor easily becomes n-type by generation of electrons serving as carriers and an increase in carrier concentration. As a result, a transistor including an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained using SIMS, is set lower than $5 \times 10^{19}$ atoms/cm³, preferably lower than or equal to $5 \times 10^{18}$ atoms/cm³, further preferably lower than or equal to $1 \times 10^{18}$ atoms/cm³, still further preferably lower than or equal to $5 \times 10^{17}$ atoms/cm³.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained using SIMS, is set lower than $1 \times 10^{20}$ atoms/cm³, preferably lower than $1 \times 10^{19}$ atoms/cm³, further preferably lower than $5 \times 10^{18}$ atoms/cm³, still further preferably lower than $1 \times 10^{18}$ atoms/cm³.

When an oxide semiconductor with sufficiently reduced impurities is used for the channel formation region of the transistor, stable electrical characteristics can be given.

This embodiment can be combined with the other embodiments described in this specification and the like as appropriate.

Embodiment 4

This embodiment will show examples of a semiconductor wafer where the semiconductor device or the like described in the above embodiment is formed and electronic components incorporating the semiconductor device.

<Semiconductor Wafer>

First, an example of a semiconductor wafer where the semiconductor device or the like is formed is described with reference to FIG. 19A.

Figure 19A:
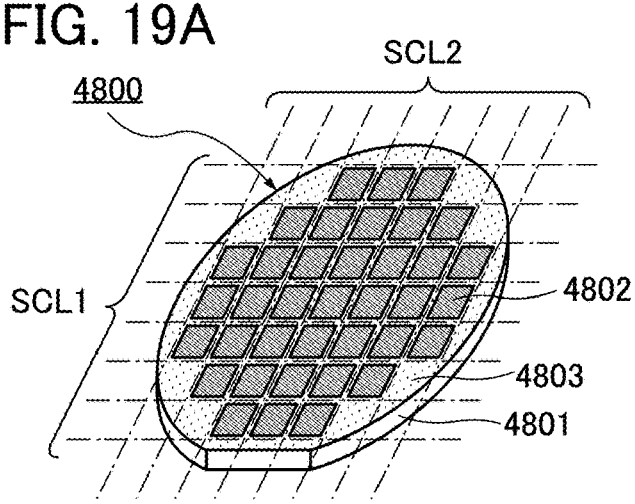
FIG. 19A is a perspective view illustrating an example of a semiconductor wafer.

A semiconductor wafer 4800 illustrated in FIG. 19A includes a wafer 4801 and a plurality of circuit portions 4802 provided on atop surface of the wafer 4801. Note that a portion without the circuit portion 4802 on the top surface of the wafer 4801 is a spacing 4803 that is a region for dicing.

The semiconductor wafer 4800 can be manufactured by forming the plurality of circuit portions 4802 on the surface of the wafer 4801 by a pre-process. After that, a surface of the wafer 4801 opposite to the surface provided with the plurality of circuit portions 4802 may be ground to thin the wafer 4801. Through this step, warpage or the like of the wafer 4801 is reduced and the size of the component can be reduced.

A dicing step is performed as a next step. The dicing is performed along scribe lines SCL1 and scribe lines SCL2 (referred to as dicing lines or cutting lines in some cases) indicated by dashed-dotted lines. Note that to perform the dicing step easily, it is preferable that the spacing 4803 be provided so that the plurality of scribe lines SCL1 are parallel to each other, the plurality of scribe lines SCL2 are parallel to each other, and the scribe lines SCL1 are perpendicular to the scribe lines SCL2.

Figure 19B:
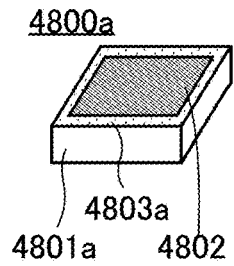
FIG. 19B is a perspective view illustrating an example of a chip.

With the dicing step, a chip 4800a as illustrated in FIG. 19B can be cut out from the semiconductor wafer 4800. The chip 4800a includes a wafer 4801a, the circuit portion 4802, and a spacing 4803a. Note that it is preferable to make the spacing 4803a small as much as possible. In this case, the width of the spacing 4803 between adjacent circuit portions 4802 is substantially the same as a cutting allowance of the scribe line SCL1 or a cutting allowance of the scribe line SCL2.

Note that the shape of the element substrate of one embodiment of the present invention is not limited to the shape of the semiconductor wafer 4800 illustrated in FIG. 19A. The element substrate may be a rectangular semiconductor wafer, for example. The shape of the element substrate can be changed as appropriate, depending on a manufacturing process of an element and an apparatus for manufacturing the element.

<Electronic Component>

Figure 19C:
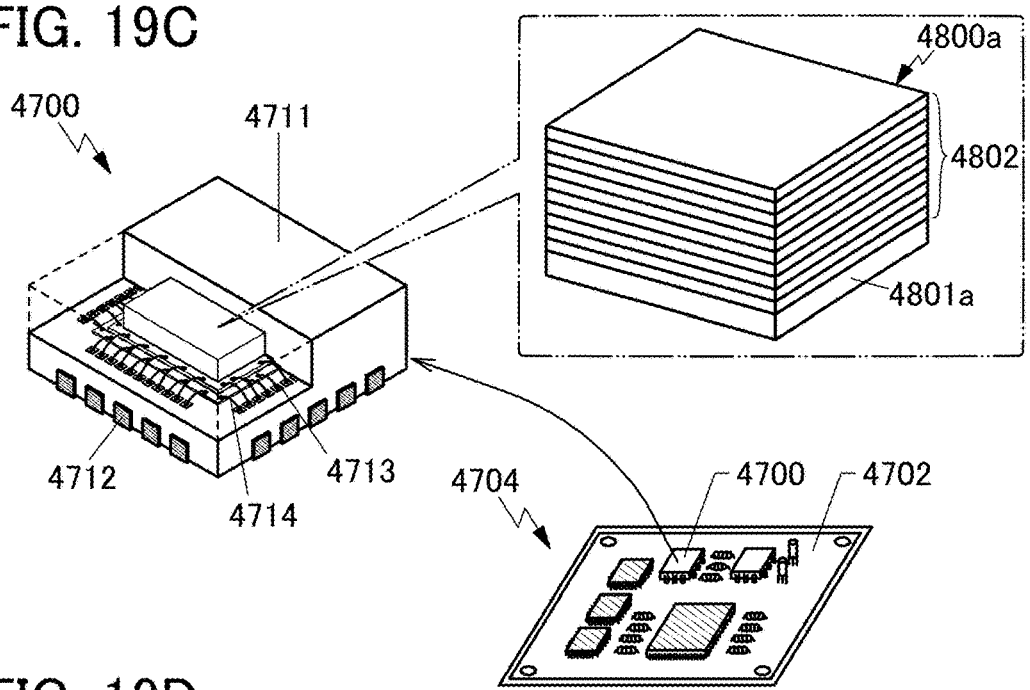
FIG. 19C and FIG. 19D are perspective views illustrating examples of electronic components.

FIG. 19C illustrates a perspective view of an electronic component 4700 and a substrate (a mounting board 4704) on which the electronic component 4700 is mounted. The electronic component 4700 illustrated in FIG. 19C includes the chip 4800a in a mold 4711. Note that the chip 4800a illustrated in FIG. 19C is shown to have a structure in which the circuit portions 4802 are stacked. That is, the semiconductor device described in the above embodiment can be used for the circuit portion 4802. To illustrate the inside of the electronic component 4700, some portions are omitted in FIG. 19C. The electronic component 4700 includes a land 4712 outside the mold 4711. The land 4712 is electrically connected to an electrode pad 4713, and the electrode pad 4713 is electrically connected to the chip 4800a through a wire 4714. The electronic component 4700 is mounted on a printed circuit board 4702, for example. A plurality of such electronic components are combined and electrically connected to each other on the printed circuit board 4702, so that the mounting board 4704 is completed.

Figure 19D:
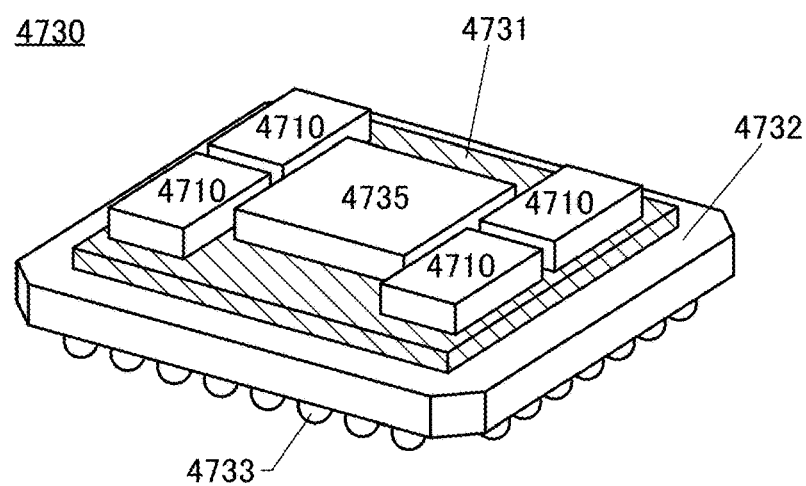

FIG. 19D illustrates a perspective view of an electronic component 4730. The electronic component 4730 is an example of a SiP (System in package) or an MCM (Multi Chip Module). In the electronic component 4730, an interposer 4731 is provided on a package substrate 4732 (a printed circuit board), and a semiconductor device 4735 and a plurality of semiconductor devices 4710 are provided on the interposer 4731.

The electronic component 4730 includes the semiconductor devices 4710. Examples of the semiconductor device 4710 include the semiconductor device described in the above embodiment and a high bandwidth memory (HBM). In addition, an integrated circuit (a semiconductor device) such as a CPU, a GPU, an FPGA, or a memory device can be used as the semiconductor device 4735.

As the package substrate 4732, a ceramic substrate, a plastic substrate, a glass epoxy substrate, or the like can be used. As the interposer 4731, a silicon interposer, a resin interposer, or the like can be used.

The interposer 4731 includes a plurality of wirings and has a function of electrically connecting a plurality of integrated circuits with different terminal pitches. The plurality of wirings are provided in a single layer or multiple layers. In addition, the interposer 4731 has a function of electrically connecting an integrated circuit provided on the interposer 4731 to an electrode provided on the package substrate 4732. Accordingly, the interposer is sometimes referred to as a "redistribution substrate" or an "intermediate substrate". Furthermore, a through electrode is provided in the interposer 4731 and the through electrode is used to electrically connect an integrated circuit and the package substrate 4732 in some cases. In the case of using a silicon interposer, a through-silicon via (TSV) can also be used as the through electrode.

A silicon interposer is preferably used as the interposer 4731. The silicon interposer can be manufactured at lower cost than an integrated circuit because it is not necessary to provide an active element. Moreover, since wirings of the silicon interposer can be formed through a semiconductor process, the formation of minute wirings, which is difficult for a resin interposer, is easily achieved.

An HBM needs to be connected to many wirings to achieve a wide memory bandwidth. Therefore, an interposer on which an HBM is mounted requires minute and densely formed wirings. For this reason, a silicon interposer is preferably used as the interposer on which an HBM is mounted.

In a SiP, an MCM, or the like using a silicon interposer, the decrease in reliability due to a difference in expansion coefficient between an integrated circuit and the interposer is less likely to occur. Furthermore, a surface of a silicon interposer has high planarity, and a poor connection between the silicon interposer and an integrated circuit provided on the silicon interposer is less likely to occur. It is particularly preferable to use a silicon interposer for a 2.5D package (2.5-dimensional mounting) in which a plurality of integrated circuits are arranged side by side on the interposer.

In addition, a heat sink (a radiator plate) may be provided to overlap with the electronic component 4730. In the case of providing a heat sink, the heights of integrated circuits provided on the interposer 4731 are preferably equal to each other. For example, in the electronic component 4730 described in this embodiment, the heights of the semiconductor devices 4710 and the semiconductor device 4735 are preferably equal to each other.

To mount the electronic component 4730 on another substrate, an electrode 4733 may be provided on a bottom portion of the package substrate 4732. FIG. 19D illustrates an example in which the electrode 4733 is formed of a solder ball. Solder balls are provided in a matrix on the bottom portion of the package substrate 4732, so that BGA (Ball Grid Array) mounting can be achieved. Alternatively, the electrode 4733 may be formed of a conductive pin. When conductive pins are provided in a matrix on the bottom portion of the package substrate 4732, PGA (Pin Grid Array) mounting can be achieved.

The electronic component 4730 can be mounted on another substrate by various mounting methods not limited to BGA and PGA. For example, a mounting method such as SPGA (Staggered Pin Grid Array), LGA (Land Grid Array), QFP (Quad Flat Package), QFJ (Quad Flat J-leaded package), or QFN (Quad Flat Non-leaded package) can be employed.

This embodiment can be combined with the other embodiments described in this specification and the like as appropriate.

Embodiment 5

In this embodiment, a CPU that can include the semiconductor device of the foregoing embodiment will be described.

Figure 20:
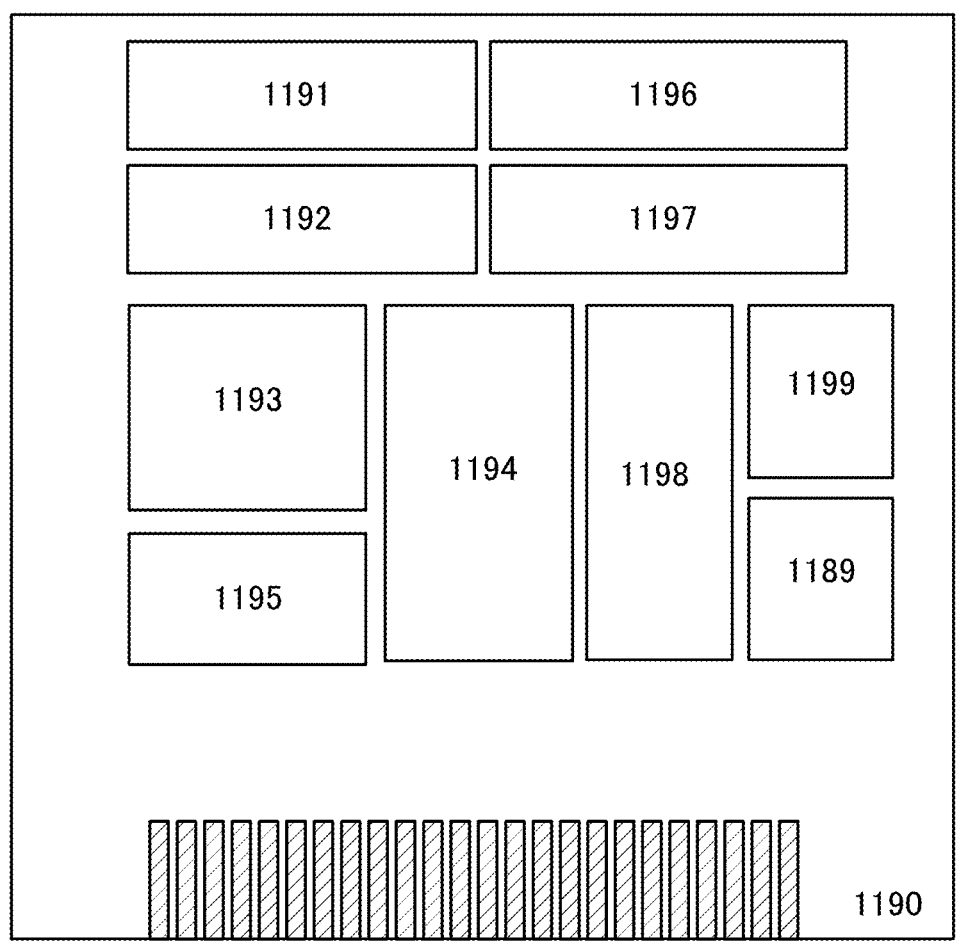
FIG. 20 is a block diagram illustrating a CPU.

FIG. 20 is a block diagram illustrating a configuration example of a CPU in part of which the semiconductor device described in the above embodiment is used.

The CPU illustrated in FIG. 20 includes an ALU 1191 (ALU: Arithmetic logic unit), an ALU controller 1192, an instruction decoder 1193, an interrupt controller 1194, a timing controller 1195, a register 1196, a register controller 1197, a bus interface 1198 (Bus I/F), a rewritable ROM 1199, and a ROM interface 1189 (ROM I/F) over a substrate 1190. A semiconductor substrate, an SOI substrate, a glass substrate, or the like is used as the substrate 1190. The ROM 1199 and the ROM interface 1189 may be provided over separate chips. Needless to say, the CPU in FIG. 20 is just an example of a simplified structure, and an actual CPU may have a variety of structures depending on the application. For example, the CPU may have a configuration in which a configuration including the CPU illustrated in FIG. 20 or an arithmetic circuit is considered as one core, a plurality of the cores are included, and the cores operate in parallel, namely a configuration like that of a GPU. The number of bits that the CPU can process in an internal arithmetic circuit or in a data bus can be 8, 16, 32, or 64, for example.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 judges an interrupt request from an external input/output device, a peripheral circuit, or the like on the basis of its priority or a mask state, and processes the request. The register controller 1197 generates an address of the register 1196, and reads/writes data from/to the register 1196 in accordance with the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator portion for generating an internal clock signal based on a reference clock signal, and supplies the internal clock signal to the above various circuits.

In the CPU illustrated in FIG. 20, a memory cell is provided in the register 1196. The semiconductor device described in any of the above embodiments or the like can be included in the register 1196, for example.

In the CPU illustrated in FIG. 20, the register controller 1197 selects operation of retaining data in the register 1196 in accordance with an instruction from the ALU 1191. That is, the register controller 1197 selects whether data retention by a flip-flop is performed or data retention by a capacitor is performed in the memory cell included in the register 1196. In the case where data retention by the flip-flop is selected, power supply voltage is supplied to the memory cell in the register 1196. In the case where data retention by the capacitor is selected, the data is rewritten into the capacitor, and supply of power supply voltage to the memory cell in the register 1196 can be stopped.

This embodiment can be combined with the other embodiments described in this specification and the like as appropriate.

Embodiment 6

In this embodiment, examples of electronic devices each including the semiconductor device described in the above embodiment will be described. FIG. 21A to FIG. 21J and FIG. 22A to FIG. 22E illustrate electronic devices each of which includes the electronic component 4700 including the semiconductor device.

[Mobile Phone]

Figure 21A:
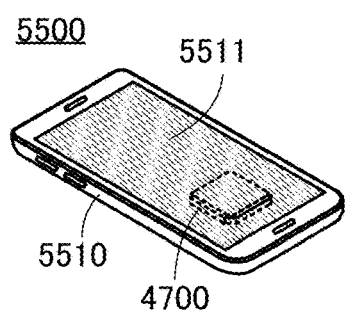
FIG. 21A to FIG. 21J are each a perspective view or a schematic view illustrating an example of a product.

An information terminal 5500 illustrated in FIG. 21A is a cellular phone (smartphone), which is a type of information terminal. The information terminal 5500 includes a housing 5510 and a display portion 5511, and as input interfaces, a touch panel is provided in the display portion 5511 and a button is provided in the housing 5510.

By using the semiconductor device described in the above embodiment, the information terminal 5500 can retain a temporary file generated at the time of executing an application (e.g., a web browser's cache).

The semiconductor device described in the above embodiment is employed for the information terminal 5500, whereby the information terminal 5500 can have high reliability.

[Wearable Terminal]

Figure 21B:
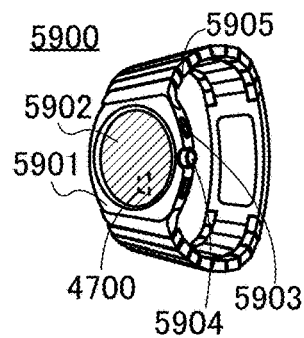

FIG. 21B illustrates an information terminal 5900 that is an example of a wearable terminal. The information terminal 5900 includes a housing 5901, a display portion 5902, an operation button 5903, an operator 5904, a band 5905, and the like.

Like the information terminal 5500 described above, the wearable terminal can retain a temporary file generated at the time of executing an application by using the semiconductor device described in the above embodiment.

The semiconductor device described in the above embodiment is employed for the information terminal 5900, whereby the information terminal 5900 can have high reliability.

[Information Terminal]

Figure 21C:
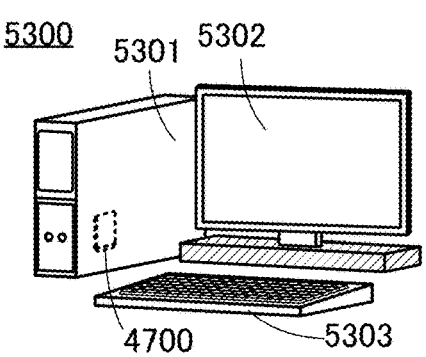

FIG. 21C illustrates a desktop information terminal 5300. The desktop information terminal 5300 includes a main body 5301 of the information terminal, a display 5302, and a keyboard 5303.

Like the information terminal 5500 described above, the desktop information terminal 5300 can retain a temporary file generated at the time of executing an application by using the semiconductor device described in the above embodiment.

Note that although the smartphone, the wearable terminal, and the desktop information terminal are respectively illustrated in FIG. 21A to FIG. 21C as examples of the electronic device, one embodiment of the present invention can be applied to an information terminal other than a smartphone, a wearable terminal, and a desktop information terminal. Examples of information terminals other than a smartphone, a wearable terminal, and a desktop information terminal include a PDA (Personal Digital Assistant), a laptop information terminal, and a workstation.

The semiconductor device described in the above embodiment is employed for the desktop information terminal 5300, whereby the desktop information terminal 5300 can have high reliability.

[Household Appliance]

Figure 21D:
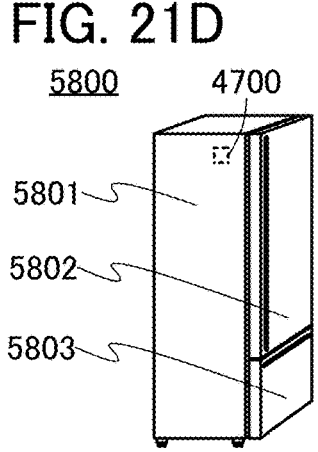

FIG. 21D illustrates an electric refrigerator-freezer 5800 as an example of a household appliance. The electric refrigerator-freezer 5800 includes a housing 5801, a refrigerator door 5802, a freezer door 5803, and the like.

When the semiconductor device described in the above embodiments is used in the electric refrigerator-freezer 5800, the electric refrigerator-freezer 5800 can be used for IoT (Internet of Things), for example. When used for IoT, the electric refrigerator-freezer 5800 can send and receive data on food stored in the electric refrigerator-freezer 5800, food expiration dates, and the like to/from the above-described information terminal and the like via the Internet or the like. When sending the data, the electric refrigerator-freezer 5800 can retain the data as a temporary file in the semiconductor device.

Although the electric refrigerator-freezer is described in this example as a household appliance, examples of other household appliances include a vacuum cleaner, a microwave oven, an electric oven, a rice cooker, a water heater, an IH cooker, a water server, a heating-cooling combination appliance such as an air conditioner, a washing machine, a drying machine, an audiovisual appliance, and the like.

The semiconductor device described in the above embodiment is employed for the electric refrigerator-freezer 5800, whereby the electric refrigerator-freezer 5800 can have high reliability.

[Game Machines]

Figure 21E:
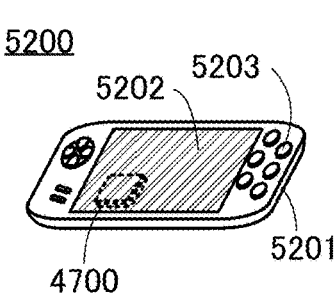

FIG. 21E illustrates a portable game machine 5200 that is an example of a game machine. The portable game machine 5200 includes a housing 5201, a display portion 5202, a button 5203, and the like.

Figure 21F:
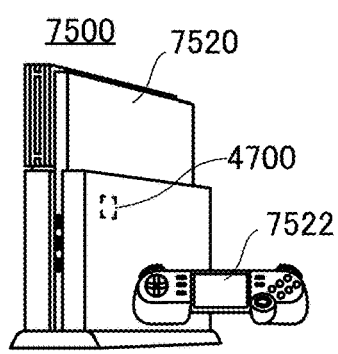

FIG. 21F illustrates a stationary game machine 7500 that is another example of a game machine. The stationary game machine 7500 includes a main body 7520 and a controller 7522. Note that the controller 7522 can be connected to the main body 7520 with or without a wire. Furthermore, although not illustrated in FIG. 21F, the controller 7522 can include a display portion that displays a game image, and an input interface besides a button, such as a touch panel, a stick, a rotating knob, and a sliding knob, for example. The shape of the controller 7522 is not limited to that illustrated in FIG. 21F, and can be changed variously in accordance with the genres of games. For example, for a shooting game such as an FPS (First Person Shooter) game, a gun-shaped controller having a trigger button can be used. As another example, for a music game or the like, a controller having a shape of a musical instrument, audio equipment, or the like can be used. Furthermore, the stationary game machine may include a camera, a depth sensor, a microphone, and the like so that the game player can play a game using a gesture and/or a voice instead of a controller.

In addition, videos displayed on the game machine can be output with a display device such as a television device, a personal computer display, a game display, or a head-mounted display.

When the semiconductor device described in the above embodiment is used in the portable game machine 5200 and the stationary game machine 7500, the portable game machine 5200 with high reliability can be achieved.

Moreover, the semiconductor device described in the above embodiment is employed for the portable game machine 5200 or the stationary game machine 7500, so that it is possible to retain a temporary file necessary for arithmetic operation that occurs during game play.

Although FIG. 21E and FIG. 21F illustrate the portable game machine and the stationary game machine as examples of game machines, the electronic device of one embodiment of the present invention is not limited thereto. Examples of the electronic device of one embodiment of the present invention include an arcade game machine installed in entertainment facilities (a game center, an amusement park, and the like), a throwing machine for batting practice installed in sports facilities, and the like.

[Moving Vehicle]

The semiconductor device described in the above embodiment can be used for an automobile, which is a moving vehicle, and around the driver's seat in an automobile.

Figure 21G:
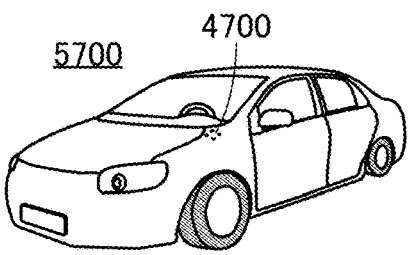

FIG. 21G illustrates an automobile 5700 that is an example of a moving vehicle.

An instrument panel that provides various kinds of information by displaying a speedometer, a tachometer, a mileage, a fuel meter, a gearshift state, air-conditioning settings, and the like is provided around the driver's seat in the automobile 5700. In addition, a display device showing the above information may be provided around the driver's seat.

In particular, the display device can compensate for the view obstructed by a pillar or the like, blind areas for the driver's seat, and the like by displaying a video from an imaging device (not illustrated) provided for the automobile 5700, which can increase safety.

The semiconductor device described in the above embodiment can temporarily hold data; thus, the computer can be used to hold temporary data necessary in an automatic driving system for the automobile 5700 and a system for navigation and risk prediction, for example. The display device may be configured to display temporary information regarding navigation, risk prediction, or the like. Moreover, the semiconductor device may be configured to hold a video of a driving recorder provided in the automobile 5700.

Note that although an automobile is described above as an example of a moving vehicle, the moving vehicle is not limited to an automobile. Examples of moving vehicles include a train, a monorail train, a ship, a flying object (a helicopter, an unmanned aircraft (a drone), an airplane, and a rocket), and the like.

The semiconductor device described in the above embodiment is employed for the automobile 5700, whereby the automobile 5700 can have high reliability.

[Camera]

The semiconductor device described in the above embodiment can be employed for a camera.

Figure 21H:
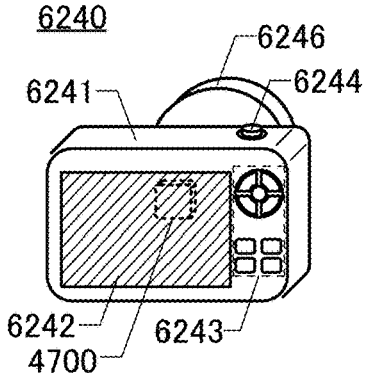

FIG. 21H illustrates a digital camera 6240 that is an example of an imaging device. The digital camera 6240 includes a housing 6241, a display portion 6242, operation buttons 6243, a shutter button 6244, and the like, and a detachable lens 6246 is attached to the digital camera 6240. Note that here, although the camera 6240 is configured such that the lens 6246 is detachable from the housing 6241 for replacement, the lens 6246 may be integrated with the housing 6241. Moreover, the digital camera 6240 can be additionally equipped with a stroboscope, a viewfinder, or the like.

The semiconductor device described in the above embodiment is employed for the digital camera 6240, the digital camera 6240 with high reliability can be achieved.

[Video Camera]

The semiconductor device described in the above embodiment can be employed for a video camera.

Figure 21I:
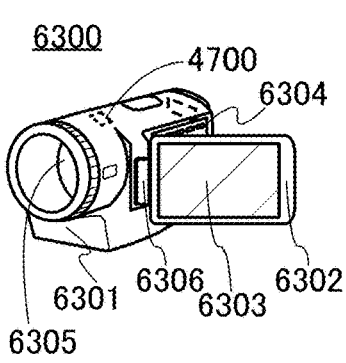

FIG. 21I illustrates a video camera 6300 that is an example of an imaging device. The video camera 6300 includes a first housing 6301, a second housing 6302, a display portion 6303, operation keys 6304, a lens 6305, a joint 6306, and the like. The operation keys 6304 and the lens 6305 are provided in the first housing 6301, and the display portion 6303 is provided in the second housing 6302. The first housing 6301 and the second housing 6302 are connected to each other with the joint 6306, and the angle between the first housing 6301 and the second housing 6302 can be changed with the joint 6306. Videos displayed on the display portion 6303 may be switched in accordance with the angle at the joint 6306 between the first housing 6301 and the second housing 6302.

When images taken by the video camera 6300 are recorded, the images need to be encoded in accordance with a data recording format. With use of the above semiconductor device, the video camera 6300 can retain a temporary file generated in encoding.

The semiconductor device described in the above embodiment is employed for the video camera 6300, whereby the video camera 6300 can have high reliability.

[ICD]

The semiconductor device described in the above embodiment can be employed for an implantable cardioverter-defibrillator (ICD).

Figure 21J:
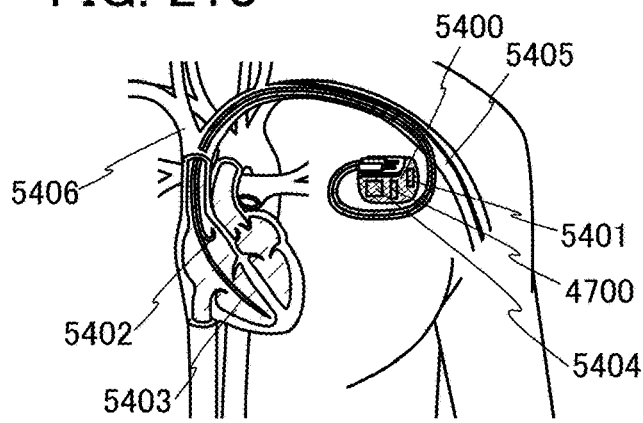

FIG. 21J is a schematic cross-sectional view illustrating an example of an ICD. An ICD main unit 5400 includes at least a battery 5401, the electronic component 4700, a regulator, a control circuit, an antenna 5404, a wire 5402 reaching a right atrium, and a wire 5403 reaching a right ventricle.

The ICD main unit 5400 is implanted in the body by surgery, and the two wires pass through a subclavian vein 5405 and a superior vena cava 5406 of the human body, with an end of one of the wires placed in the right ventricle and an end of the other wire placed in the right atrium.

The ICD main unit 5400 functions as a pacemaker and paces the heart when the heart rate is not within a predetermined range. When the heart rate is not recovered by pacing (e.g., when ventricular tachycardia or ventricular fibrillation occurs), treatment with an electrical shock is performed.

The ICD main unit 5400 needs to monitor the heart rate all the time in order to perform pacing and deliver electrical shocks as appropriate. For that reason, the ICD main unit 5400 includes a sensor for measuring the heart rate. In addition, in the ICD main unit 5400, data on the heart rate obtained by the sensor or the like, the number of times the treatment with pacing is performed, and the time taken for the treatment, for example, can be stored in the electronic component 4700.

In addition, the antenna 5404 can receive power, and the battery 5401 is charged with the power. Furthermore, when the ICD main unit 5400 includes a plurality of batteries, safety can be increased. Specifically, even when one of the batteries in the ICD main unit 5400 is dead, the other batteries can function properly; thus, the batteries also function as an auxiliary power source.

In addition to the antenna 5404 capable of receiving power, an antenna that can transmit physiological signals may be included to construct, for example, a system that monitors cardiac activity by checking physiological signals such as a pulse, a respiratory rate, a heart rate, and body temperature with an external monitoring device.

The semiconductor device described in the above embodiment is employed for the ICD main unit 5400, whereby the ICD main unit 5400 can have high reliability.

[Expansion Device for PC]

The semiconductor device described in the above embodiment can be employed for a calculator such as a PC (Personal Computer) and an expansion device for an information terminal.

Figure 22A:
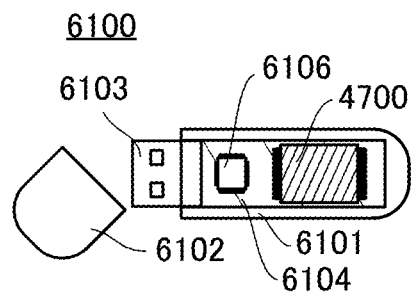
FIG. 22A to FIG. 22E are each a perspective view or a schematic view illustrating an example of a product.

FIG. 22A illustrates, as an example of the extension device, a portable extension device 6100 that includes a chip capable of retaining data and is externally provided on a PC. The expansion device 6100 can store information using the chip when connected to a PC with a USB (Universal Serial Bus) or the like, for example. Note that FIG. 22A illustrates the portable expansion device 6100; however, the expansion device of one embodiment of the present invention is not limited thereto and may be a comparatively large expansion device including a cooling fan or the like, for example.

The expansion device 6100 includes a housing 6101, a cap 6102, a USB connector 6103, and a substrate 6104. The substrate 6104 is held in the housing 6101. The substrate 6104 is provided with a circuit for driving the semiconductor device or the like described in the above embodiment. For example, the substrate 6104 is provided with the electronic component 4700 and a controller chip 6106. The USB connector 6103 functions as an interface for connection to an external device.

The semiconductor device described in the above embodiment is employed for the expansion device 6100, whereby the expansion device 6100 can have high reliability.

[SD Card]

The semiconductor device described in the above embodiment can be employed for an SD card that can be attached to an electronic device such as an information terminal or a digital camera.

Figure 22B:
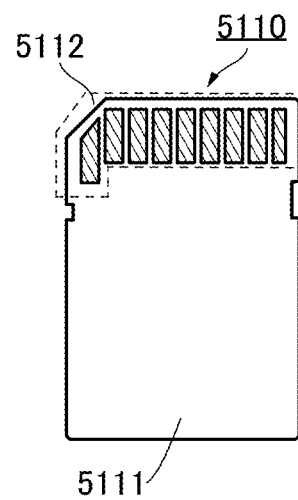
Figure 22C:
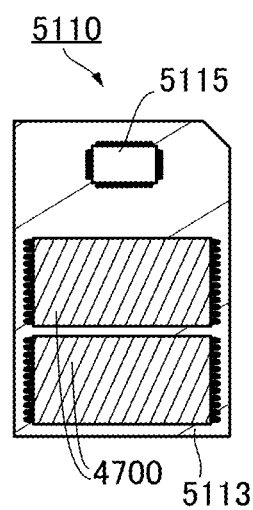

FIG. 22B is a schematic external view of an SD card, and FIG. 22C is a schematic view of the internal structure of the SD card. An SD card 5110 includes a housing 5111, a connector 5112, and a substrate 5113. The connector 5112 functions as an interface for connection to an external device. The substrate 5113 is held in the housing 5111. The substrate 5113 is provided with a semiconductor device and a circuit for driving the semiconductor device. For example, the electronic component 4700 and a controller chip 5115 are attached to the substrate 5113. Note that the circuit structures of the electronic components 4700 and the controller chip 5115 are not limited to those described above, and can be changed as appropriate according to circumstances. For example, a write circuit, a row driver, a read circuit, and the like that are provided in an electronic component may be incorporated into the controller chip 5115 instead of the electronic component 4700.

When the electronic components 4700 are provided also on a rear surface side of the substrate 5113, the capacitance of the SD card 5110 can be increased. In addition, a wireless chip with a wireless communication function may be provided on the substrate 5113. This allows wireless communication between an external device and the SD card 5110 and enables data reading and writing from and to the electronic components 4700.

The semiconductor device described in the above embodiment is employed for the SD card 5110, whereby the SD card 5110 can have high reliability.

[SSD]

The semiconductor device described in the above embodiment can be employed for an SSD (Solid State Drive) that can be attached to an electronic device such as an information terminal.

Figure 22D:
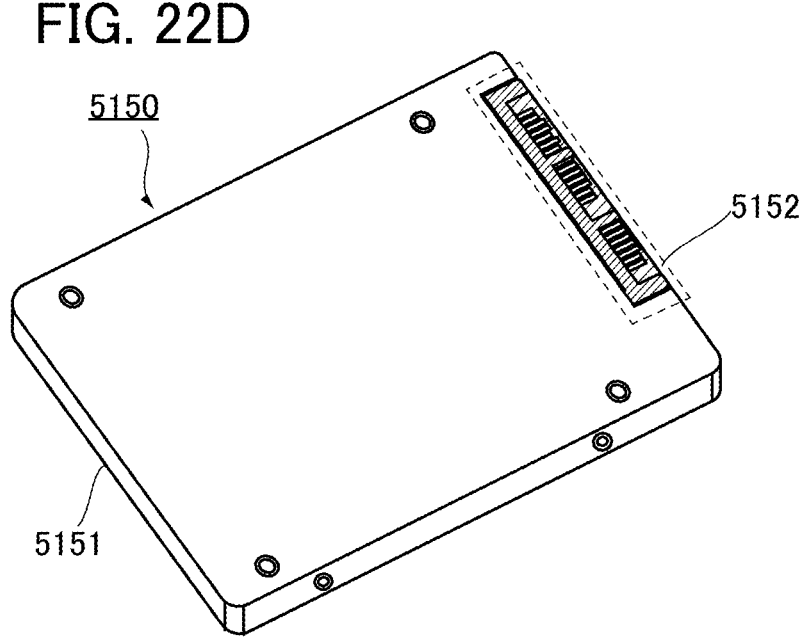
Figure 22E:
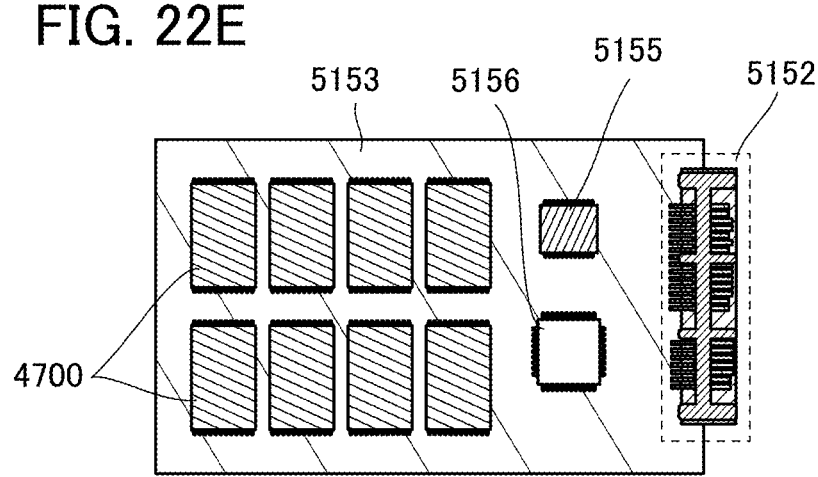

FIG. 22D is a schematic external view of an SSD, and FIG. 22E is a schematic view of the internal structure of the SSD. An SSD 5150 includes a housing 5151, a connector 5152, and a substrate 5153. The connector 5152 functions as an interface for connection to an external device. The substrate 5153 is held in the housing 5151. The substrate 5153 is provided with a semiconductor device and a circuit for driving the semiconductor device. For example, the electronic components 4700, a memory chip 5155, and a controller chip 5156 are attached to the substrate 5153. When the electronic components 4700 are also provided on a rear surface side of the substrate 5153, the capacity of the SSD 5150 can be increased. A work memory is incorporated in the memory chip 5155. For example, a DRAM chip is used as the memory chip 5155. A processor, an ECC circuit, and the like are incorporated in the controller chip 5156. Note that the circuit structures of the electronic components 4700, the memory chip 5155, and the controller chip 5115 are not limited to those described above, and the circuit structures can be changed as appropriate according to circumstances. For example, a memory functioning as a work memory may also be provided in the controller chip 5156.

The semiconductor device described in the above embodiment is employed for the SSD 5150, whereby the SSD 5150 can have high reliability.

The semiconductor device described in the above embodiment is used for semiconductor devices included in the above electronic devices, whereby novel electronic devices can be provided.

This embodiment can be combined with the other embodiments described in this specification and the like as appropriate.

REFERENCE NUMERALS

10: semiconductor device, 11: curve, 12: curve, 300: transistor, 310: substrate, 310A: substrate, 312: element isolation layer, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 411: insulator, 412: insulator, 413: insulator, 414: insulator, 416: conductor, 500: transistor, 503: conductor, 503a: conductor, 503A: conductor, 503b: conductor, 510: insulator, 512: insulator, 514: insulator, 516: insulator, 517: insulator, 518: conductor, 519: conductor, 520: insulator, 520a: insulator, 520b: insulator, 520c: insulator, 522: insulator, 524: insulator, 530: oxide, 530a: oxide, 530b: oxide, 530ba: region, 530bb: region, 530bc: region, 540: conductor, 540a: conductor, 540b: conductor, 540c: conductor, 540d: conductor, 540e: conductor, 541: insulator, 541a: insulator, 541b: insulator, 541c: insulator, 541d: insulator, 541e: insulator, 542: conductor, 542a: conductor, 542b: conductor, 543: oxide, 543a: oxide, 543b: oxide, 544: insulator, 546: conductor, 550: insulator, 550a: insulator, 550b: insulator, 552: insulator, 553: insulator, 554: insulator, 560: conductor, 560a: conductor, 560b: conductor, 561: insulator, 562: conductor, 571: insulator, 571a: insulator, 571b: insulator, 574: insulator, 576: insulator, 580: insulator, 581: insulator, 582: insulator, 586: insulator, 600: capacitor, 601: insulator, 602: insulator, 610: conductor, 611: conductor, 612: conductor, 613: conductor, 620: conductor, 630: insulator, 631: insulator, 640: insulator, 641: insulator, 642: insulator, 650: insulator, 660: conductor, 1189: ROM interface, 1190: substrate, 1191: ALU, 1192: ALU controller, 1193: instruction decoder, 1194: interrupt controller, 1195: timing controller, 1196: register, 1197: register controller, 1198: bus interface, 1199: ROM, 4700: electronic component, 4702: printed circuit board, 4704: mounting board, 4710: semiconductor device, 4711: mold, 4712: land, 4713: electrode pad, 4714: wire, 4730: electronic component, 4731: interposer, 4732: package substrate, 4733: electrode, 4735: semiconductor device, 4800: semiconductor wafer, 4800a: chip, 4801: wafer, 4801a: wafer, 4802: circuit portion, 4803: spacing, 4803a: spacing, 5110: SD card, 5111: housing, 5112: connector, 5113: substrate, 5115: controller chip, 5150: SSD, 5151: housing, 5152: connector, 5153: substrate, 5155: memory chip, 5156: controller chip, 5200: portable game machine, 5201: housing, 5202: display portion, 5203: button, 5300: desktop information terminal, 5301: main body, 5302: display, 5303: keyboard, 5400: ICD main unit, 5401: battery, 5402: wire, 5403: wire, 5404: antenna, 5405: subclavian vein, 5406: superior vena cava, 5500: information terminal, 5510: housing, 5511: display portion, 5700: automobile, 5800: electric refrigerator-freezer, 5801: housing, 5802: refrigerator door, 5803: freezer door, 5900: information terminal, 5901: housing, 5902: display portion, 5903: operation button, 5904: operator, 5905: band, 6100: extension device, 6101: housing, 6102: cap, 6103: USB connector, 6104: substrate, 6106: controller chip, 6240: digital camera, 6241: housing, 6242: display portion, 6243: operation button, 6244: shutter button, 6246: lens, 6300: video camera, 6301: housing, 6302: housing, 6303: display portion, 6304: operation key, 6305: lens, 6306: joint, 7500: stationary game machine, 7520: main body, 7522: controller

The invention claimed is:

1. A method for driving a semiconductor device comprising a memory cell comprising a ferroelectric capacitor, comprising:
    writing binary data to the memory cell in a first period;
    reading the binary data from the memory cell in a second period; and
    generating a polarization reversal in the ferroelectric capacitor in a third period, so that the binary data is returned to the memory cell,
    wherein the memory cell comprises a first transistor, a second transistor, and a third transistor,
    wherein one of a source and a drain of the first transistor is electrically connected to a gate of the second transistor and one electrode of the ferroelectric capacitor,
    wherein one of a source and a drain of the second transistor is electrically connected to one of a source and a drain of the third transistor,
    wherein the other of the source and the drain of the third transistor is electrically connected to the other of the source and the drain of the first transistor,
    wherein in the first period and the third period, the first transistor is in an on state and the third transistor is in an off state, and
    wherein in the second period, the first transistor is in an off state and the third transistor is in an on state.

2. The method for driving a semiconductor device according to claim 1, wherein in the third period, the polarization reversal is generated in the ferroelectric capacitor regardless of a value of the binary data.

3. The method for driving a semiconductor device according to claim 2,
    wherein the ferroelectric capacitor comprises a dielectric, and
    wherein the dielectric comprises at least one of hafnium oxide and zirconium oxide.

4. The method for driving a semiconductor device according to claim 1,
    wherein the semiconductor device further comprises a reference memory cell,
    wherein reference binary data is written to the reference memory cell in the first period,
    wherein the reference binary data is read from the reference memory cell in the second period, and
    wherein logic operation of the binary data read from the memory cell and the reference binary data read from the reference memory cell is performed in the second period.

5. The method for driving a semiconductor device according to claim 4, wherein the logic operation is exclusive disjunction.

6. The method for driving a semiconductor device according to claim 5,
    wherein the ferroelectric capacitor comprises a dielectric, and
    wherein the dielectric comprises at least one of hafnium oxide and zirconium oxide.

7. The method for driving a semiconductor device according to claim 4,
wherein the ferroelectric capacitor comprises a dielectric, and
wherein the dielectric comprises at least one of hafnium oxide and zirconium oxide.

8. The method for driving a semiconductor device according to claim 1,
wherein the ferroelectric capacitor comprises a dielectric, and
wherein the dielectric comprises hafnium oxide and/or zirconium oxide.

9. A method for driving a semiconductor device comprising a memory cell comprising a first ferroelectric capacitor and a reference memory cell comprising a second ferroelectric capacitor, comprising:
writing first binary data to the memory cell and writing first reference binary data to the reference memory cell in a first period;
reading the first binary data from the memory cell and reading the first reference binary data from the reference memory cell in a second period;
performing logic operation of the first binary data and the first reference binary data in a third period; and
writing second binary data to the memory cell and writing second reference binary data to the reference memory cell in a fourth period,
wherein a value of the first binary data and a value of the second binary data are different from each other, and
wherein a value of the first reference binary data and a value of the second reference binary data are different from each other.

10. The method for driving a semiconductor device according to claim 9,
wherein the semiconductor device comprises a first sense amplifier circuit and a second sense amplifier circuit,
wherein the first sense amplifier circuit is electrically connected to the memory cell,
wherein the second sense amplifier circuit is electrically connected to the reference memory cell, and
wherein in the third period, the first sense amplifier circuit and the second sense amplifier circuit are each in an activation state.

11. The method for driving a semiconductor device according to claim 10,
wherein the memory cell comprises a first transistor, a second transistor, and a third transistor,
wherein one of a source and a drain of the first transistor is electrically connected to a gate of the second transistor and one electrode of the first ferroelectric capacitor,
wherein one of a source and a drain of the second transistor is electrically connected to one of a source and a drain of the third transistor,
wherein the other of the source and the drain of the first transistor and the other of the source and the drain of the third transistor are electrically connected to the first sense amplifier circuit,
wherein in the first period and the fourth period, the first transistor is in an on state and the third transistor is in an off state, and
wherein in the second period and the third period, the first transistor is in an off state and the third transistor is in an on state.

12. The method for driving a semiconductor device according to claim 11,
wherein the first ferroelectric capacitor comprises a first dielectric,
wherein the second ferroelectric capacitor comprises a second dielectric, and
wherein the first dielectric and the second dielectric each comprise at least one of hafnium oxide and zirconium oxide.

13. The method for driving a semiconductor device according to claim 11, wherein the logic operation is exclusive disjunction.

14. The method for driving a semiconductor device according to claim 10,
wherein the first ferroelectric capacitor comprises a first dielectric,
wherein the second ferroelectric capacitor comprises a second dielectric, and
wherein the first dielectric and the second dielectric each comprise at least one of hafnium oxide and zirconium oxide.

15. The method for driving a semiconductor device according to claim 10, wherein the logic operation is exclusive disjunction.

16. The method for driving a semiconductor device according to claim 9,
wherein the first ferroelectric capacitor comprises a first dielectric,
wherein the second ferroelectric capacitor comprises a second dielectric, and
wherein the first dielectric and the second dielectric each comprise hafnium oxide and/or zirconium oxide.

17. The method for driving a semiconductor device according to claim 16, wherein the logic operation is exclusive disjunction.

18. The method for driving a semiconductor device according to claim 9, wherein the logic operation is exclusive disjunction.

* * * * *